United States Patent [19]

Walch et al.

[11] Patent Number: 5,267,332

[45] Date of Patent: Nov. 30, 1993

[54] IMAGE RECOGNITION SYSTEM

[75] Inventors: Mark A. Walch, Princeton, N.J.; John A. Pawlicki, Warren, Mich.

[73] Assignee: Technibuild Inc.

[21] Appl. No.: 49,658

[22] Filed: Apr. 20, 1993

Related U.S. Application Data

[63] Continuation of Ser. No. 717,430, Jun. 19, 1991, abandoned.

[51] Int. Cl.$^5$ ............................................. G06K 9/44
[52] U.S. Cl. ......................................... 382/55; 382/21; 382/24; 382/26; 382/13
[58] Field of Search ..................... 382/21, 24, 26, 16, 382/37, 55, 25, 13

[56] References Cited

U.S. PATENT DOCUMENTS

| | | | |
|---|---|---|---|
| 3,629,849 | 12/1971 | Sauvan | 340/172.5 |
| 3,942,169 | 3/1976 | Fujimoto et al. | 382/21 |
| 4,005,385 | 1/1977 | Joynsen et al. | 340/146.3 |
| 4,015,239 | 3/1977 | Fujimoto et al. | 382/24 |
| 4,040,009 | 8/1977 | Kadota et al. | 340/146.3 |
| 4,087,788 | 5/1978 | Johannesson | 382/21 |
| 4,375,654 | 3/1983 | Evans et al. | 382/21 |
| 4,468,807 | 8/1984 | Moulton | 382/2 |
| 4,700,402 | 10/1987 | Okai et al. | 382/56 |
| 4,701,960 | 10/1987 | Scott | 382/21 |
| 4,718,103 | 1/1988 | Shojima et al. | 382/13 |
| 4,729,127 | 3/1988 | Chan et al. | 382/56 |
| 4,757,551 | 6/1988 | Kobayashi et al. | 382/18 |
| 4,773,098 | 9/1988 | Scott | 382/21 |
| 4,777,651 | 10/1988 | McCann et al. | 382/21 |
| 4,783,828 | 11/1988 | Sadjadi | 382/21 |
| 4,807,298 | 2/1989 | Conte et al. | 382/56 |
| 4,903,313 | 2/1990 | Tichikawa | 382/27 |
| 5,119,445 | 6/1992 | Suzuki et al. | 382/55 |

Primary Examiner—Yon J. Couso
Attorney, Agent, or Firm—Allan Jacobson

[57] ABSTRACT

An image recognition system includes a method and apparatus in which images are characterized and compared on the basis of internal structure, which is independent of image size and image orientation. A library of reference images is first generated and stored, then each input image, or test image, is compared to the images stored in the library until a match is found. The image is represented in memory as nodes, lines, and curves. A plurality of descriptors, called reference keys and reference series, are generated for both the reference images and the test image. The reference library is screened for likely matches by comparing the descriptors for the test image to the descriptors in the reference images in the library. Inclusionary and exclusionary tests are performed. After screening, the each of candidate reference images is searched by comparing the pathway thorough the reference image and the pathway through the test image, and by the degree of correlation between the reference and test images. In addition, the link ratio, a measure of the portion of the test image actually matched to the reference image is computed. Searching criteria, like the screening criteria are based on internal image structure, so that the recognition process is independent of image size and image orientation.

30 Claims, 43 Drawing Sheets

RECOGNITION PROCESS

FIGURE 1
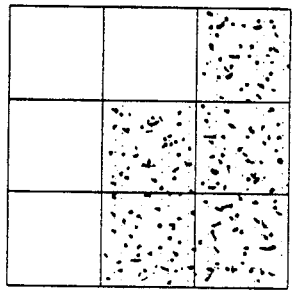 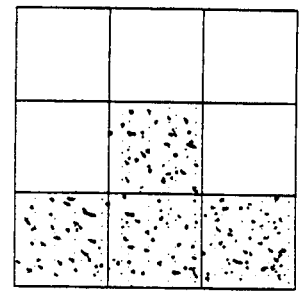
EXAMPLES OF CONVEX CENTER PIXELS
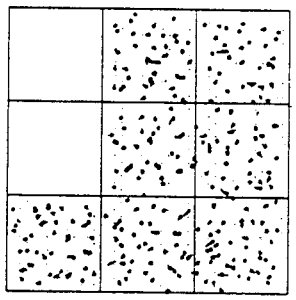 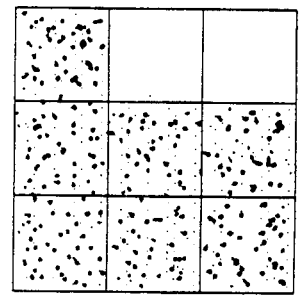
EXAMPLES OF CONCAVE CENTER PIXELS
 = NON-LIGHTED (BACKGROUND) PIXEL
 = LIGHTED (FOREGROUND) PIXEL Proximity Gaps Root of spurious hair skeletonization artifact. (Note it also will be a Primary Node if not handled properly).

Hair end also improperly forms a Primary Node if not removed.

Four node are created where only one should be.

Node configurations such as this form four Primary Nodes where only one should exist. Though this is a valid WMLI, it may require merging areas such as this after the data structure has been initially established.

Figure 7
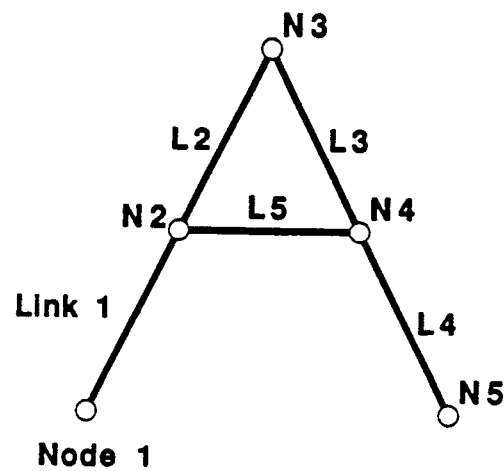
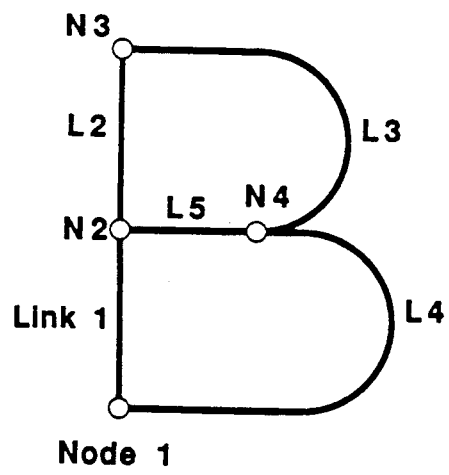 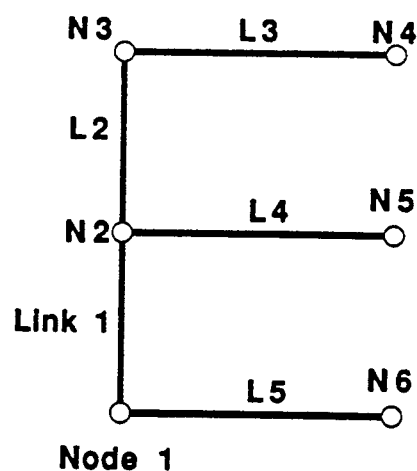
Link/node structure for characters "A", "B" and "E"

Illustration of data structure

FIGURE 10
LINKS CONNECTING NODES
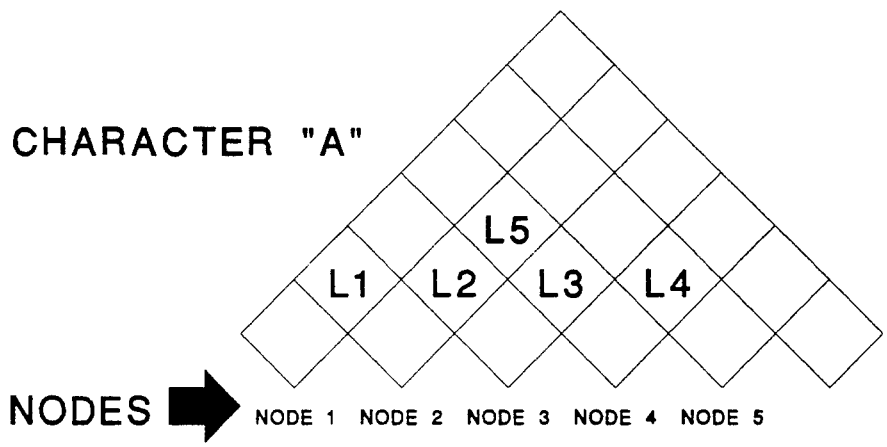
LINKS CONNECTING NODES
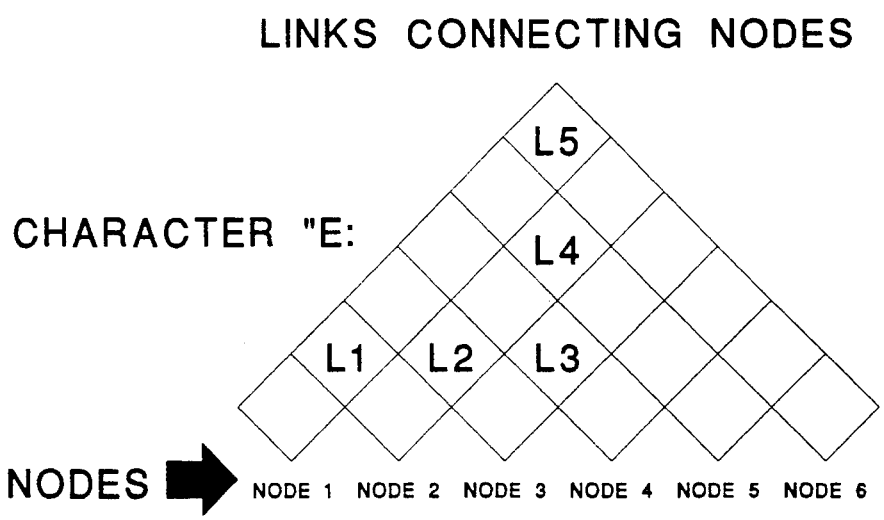
SAMPLE MATRICES FOR CHARACTERS "A" AND "E"

FIGURE 11
LINKS CONNECTING NODES
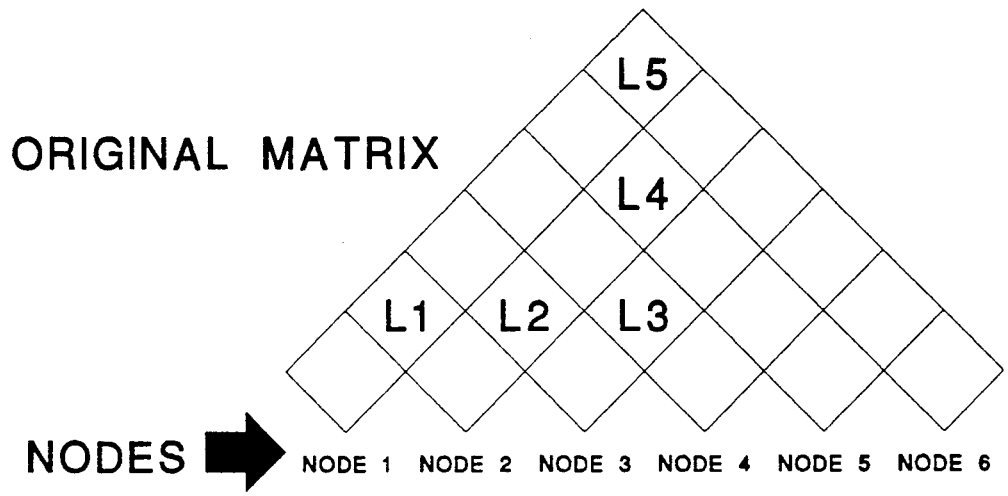
LINKS CONNECTING NODES
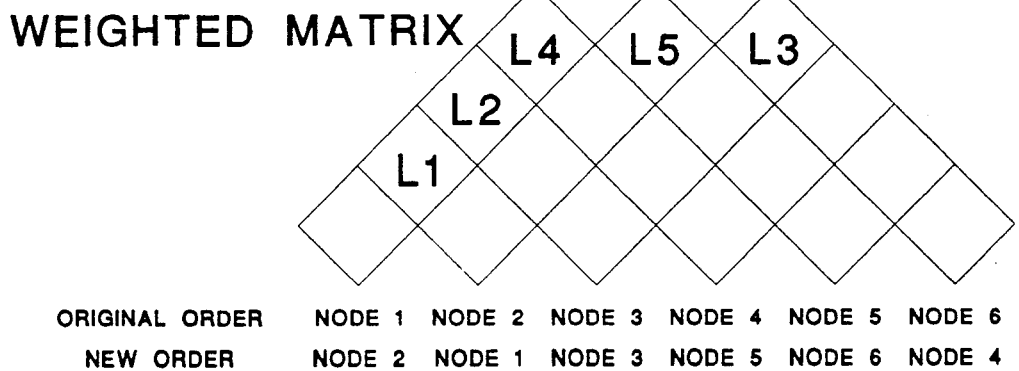
GRAPHIC COMPARISON OF ORIGINAL AND
WEIGHTED MATRICES FOR CHARACTER "E"

Figure 12
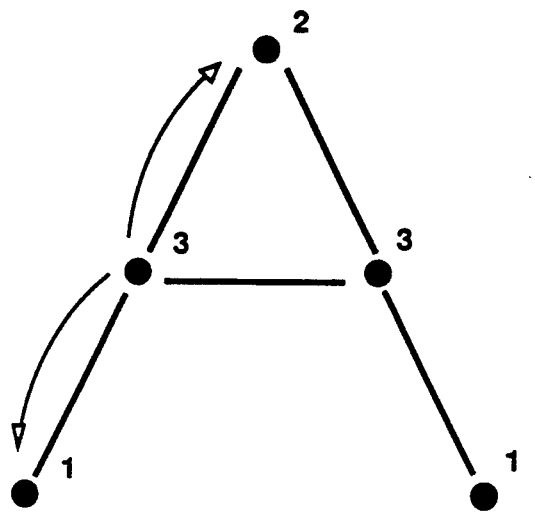
Reference series for sample node  3 2 1 0
                                  1 1 1 0
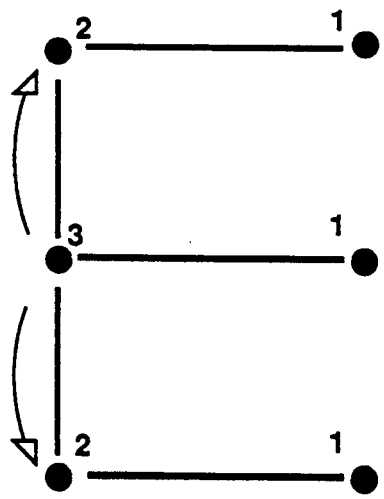
Reference series for sample node  3 2 1 0
                                  1 2 1 0
Illustration of Reference Series concept Figure 13
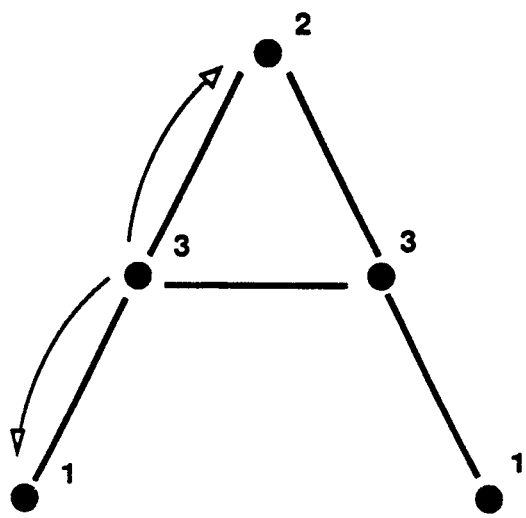
Reference series for sample node    3 2 1 0
                                                               1 1 1 0
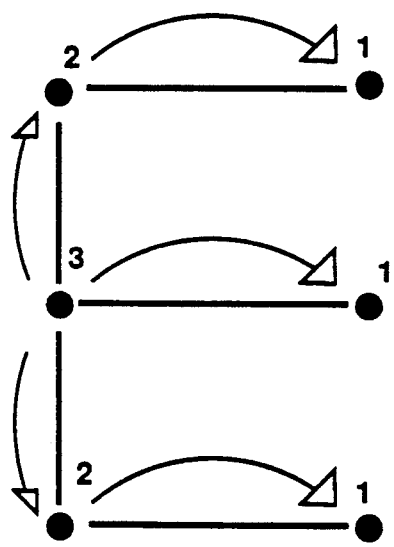
Reference series for sample node    3 2 1 0
                                                               1 2 3 0
Illustration of cumulative Reference Series concept

LINKS CONNECTING NODES

ILLUSTRATION OF BIT MAPPING MATRIX DATA INTO MEMORY LOCATIONS

Figure 15
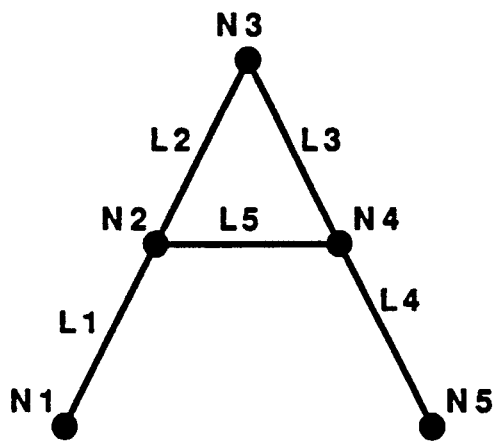
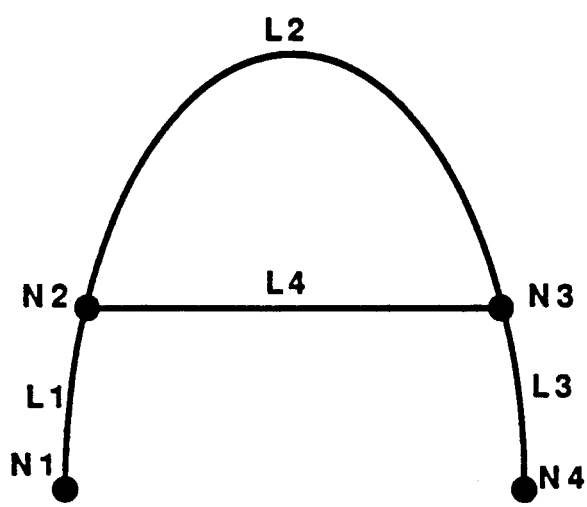
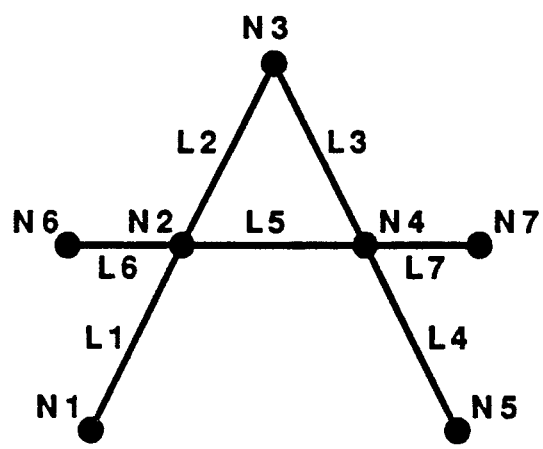
Alternate forms of the character "A"

Extended form of the character "A"

Example of search path through character "E"

Illustration of 2 simple image structures for search discussion

Step-by-step presentation of a simple image search

Figure 20
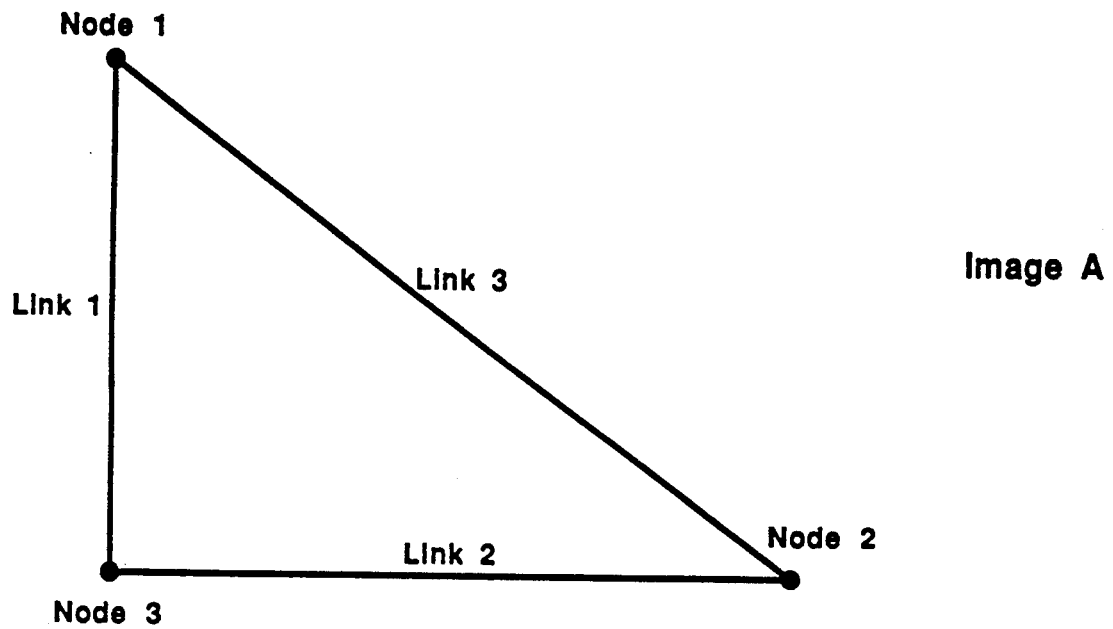
Image A
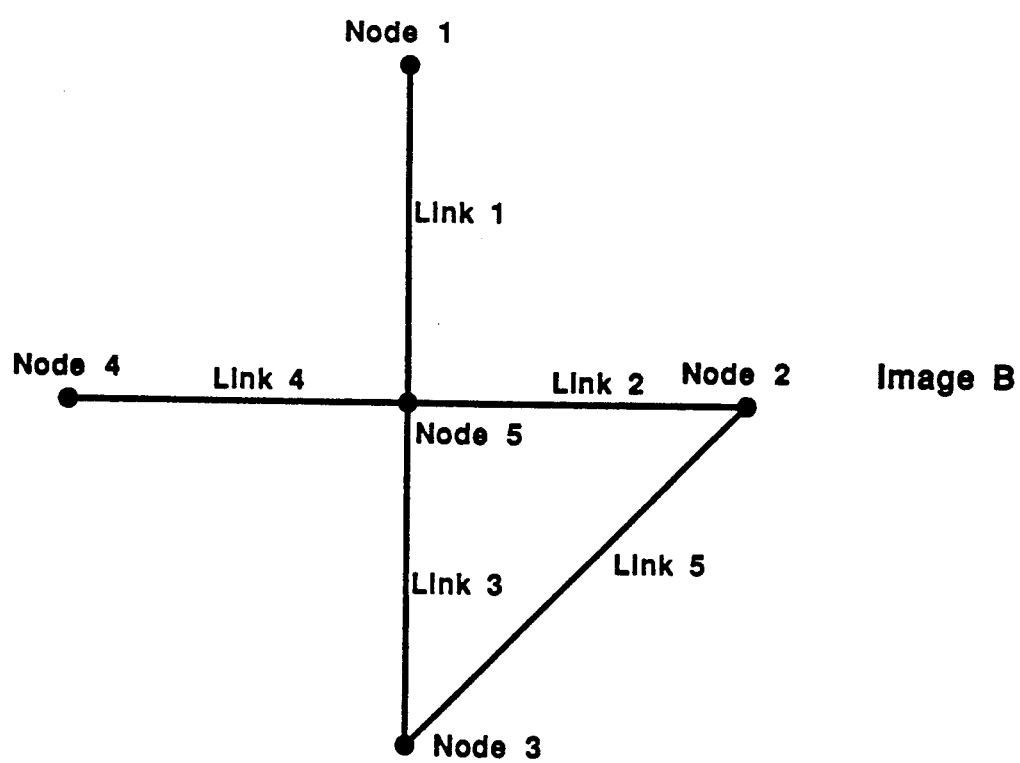
Image B
Illustration of 2 simple image structures for search discussion Step-by-step presentation of simple image search

Figure 22
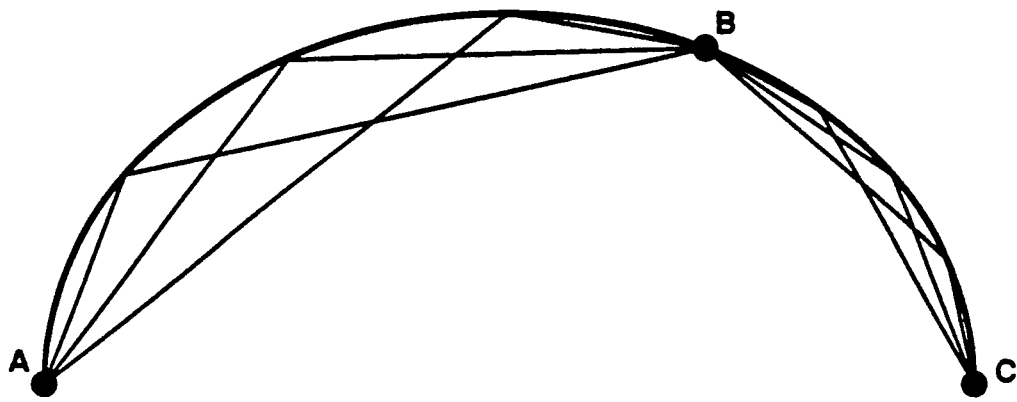
Links AB and BC
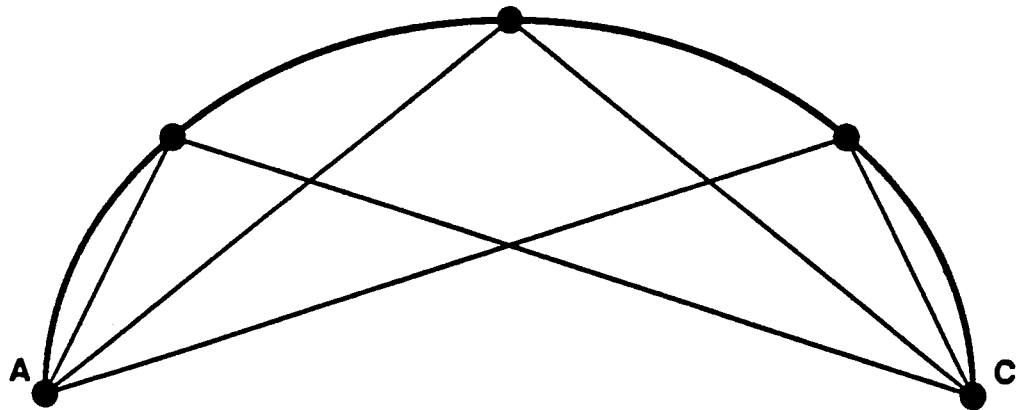
Link AC
Example of link combination

CHART 11

CREATION OF IMAGE LIBRARY

CHART 12

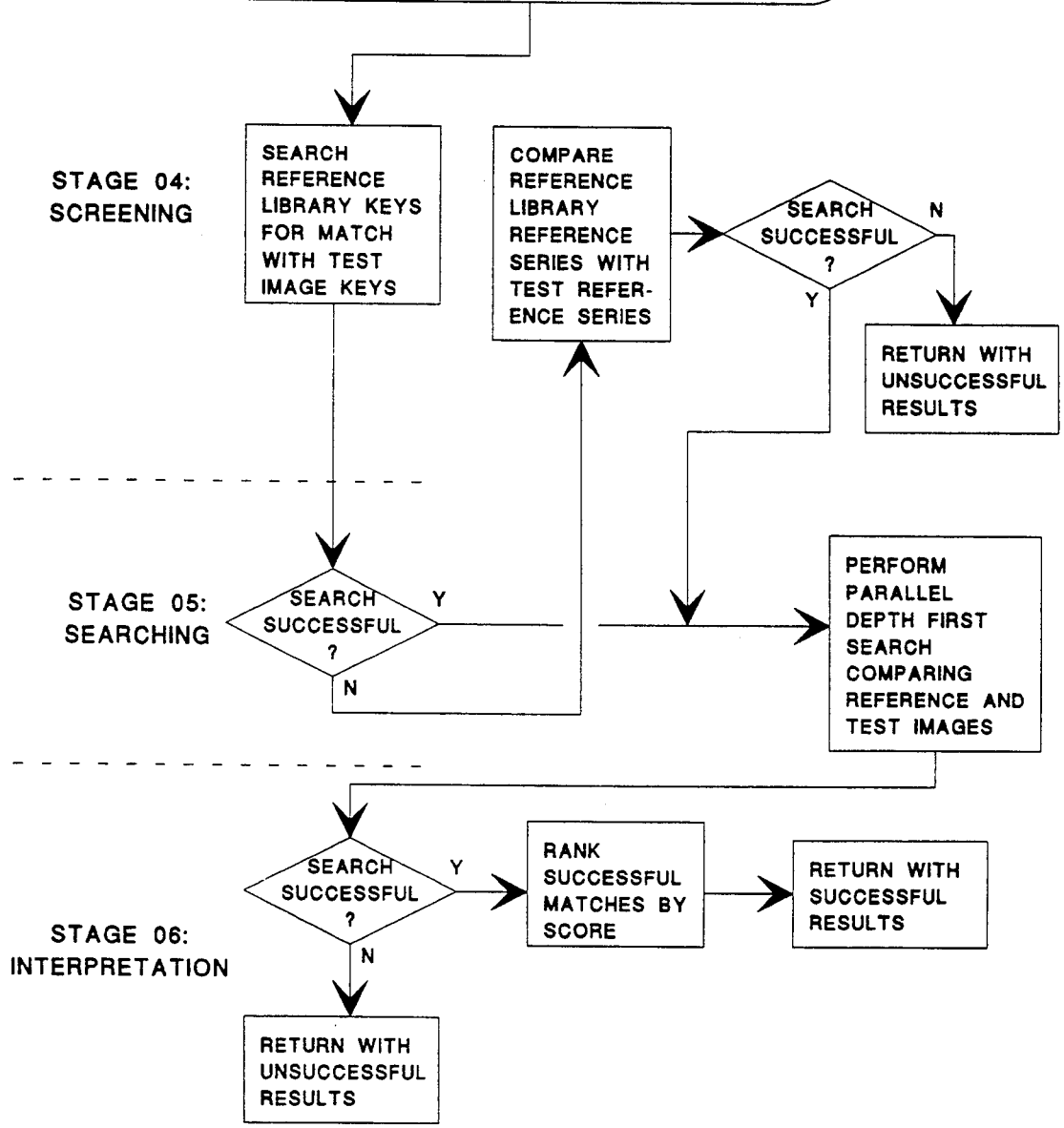
RECOGNITION PROCESS

CHART 13

CHART 14**

ESTABLISH CUMULATIVE REFERENCE SERIES

CHART 15

CHART 17

DEPTH FIRST SEARCH

CHART 18

LINK BYPASS ROUTINE

CHART 19

CHART 2

CHART 3

CHART 4

CHART 5

CHART 6

CHART 6 (CONTINUED)

CHART 7

CHART 8

CHART 9

CHART 10

IMAGE RECOGNITION SYSTEM

This is a continuation of co-pending application Ser. No. 717,430, filed on Jun. 19, 1991, abandoned.

FIELD OF THE INVENTION

The present invention relates to the field of machine recognition of visual images.

BACKGROUND OF THE INVENTION

There have been many attempts at image recognition systems, particularly directed towards recognizing written and printed characters. Optical character recognition systems, which recognize printed alphanumeric characters based upon expected character features and/or expected character size are well known. Recognition of handwritten characters, has proven to be more difficult.

Prior art systems include the use of matrix matching, neural networks, chaining, as well as conventional feature extraction. In a typical image recognition system, a library of reference images is first generated and stored, then each input image, or test image, is compared to the images stored in the library until a match is found. The difficulty lies in the amount of memory needed to store a library of all expected images, as well as the amount of processing time and power needed to detect a match. Handwritten characters are especially difficult because of variations in size, orientation and general distortions. Not only are the resulting prior art systems expensive, memory intensive and slow, but often fail to detect a match.

SUMMARY OF THE INVENTION

The present invention is embodied in an image recognition system in which images are characterized and compared on the basis of internal structure which is independent of image size and image orientation.

In order to abstract the essence of structure, the image is reduced to a skeleton which is represented in memory as idealized nodes, lines, and curves. A unique representation of the skeletonized image is created in the form of a linked list having a data representation which parallels the visual arrangement of the image.

A plurality of descriptors, called reference keys and reference series, are generated for both the reference images and the test image. The reference library is screened for likely matches by comparing the descriptors for the test image to the descriptors in the reference images in the library. Inclusionary and exclusionary tests are performed.

For example, reference key used for inclusionary screening, is generated and is unique for a given number of nodes connected in a specific manner. A reference series used for exclusionary screening, is generated which broadly describes the internal structure as the number of nodes and the number of links connected to respective nodes.

Specifically, the reference key for the ideal letter "E" is unique to a structure consisting of 6 nodes, with 5 links connecting the 6 nodes in a specific order. A smaller "E" and a larger upside down "E" will both have the same reference key because both have the same node/link structure. A reference image having the same reference key as the test image passes the inclusionary screening, and is a potential match. Different forms of the letter "E", which have different node/link structures, are accommodated by having additional reference images with additional reference keys. Anticipated distortions or inexact forms, of an ideal "E" may be accommodated with additional reference keys without maintaining an actual image structure.

In addition to inclusionary screening by reference keys, exclusionary screening is performed using the reference series.

For example, it is noted that the image "A" has an internal structure of 5 nodes: 2 nodes have 1 link each (at the bottom of each leg), and the other 3 nodes have 2 links each (at the top and sides). The reference image of an "H" has an internal structure of 6 nodes: 4 nodes have 1 link each, and 2 nodes have 3 links each. The letter "A" can never be an "H" because "H" has 4 nodes with 1 link attached and "A" only has 2 nodes with one link attached. However, when the distortions of a handwritten "A" leave a large enough gap at the top, then the internal structure of the image indicates that the letter could be an "H".

The reference series can be used to screen images where one image is contained in another. For example, reference series screening will indicate that an "X" in a box could be an "X", or that a "P" or a "b" could be found within an "B". However, a "B" cannot be found within a "P" or a "b" and therefore both can be excluded from the search.

The foregoing reference key and reference series screening is based on internal structure and is not effected by size or orientation of the images screened.

After screening, the each of candidate reference images is searched two ways: by comparison of the pathway thorough the reference image and the pathway through the test image, and during pathway comparison, by the degree of correlation between the reference and test images. Correlation score is sensitive to relative differences and as such is not dependent on size or orientation or the two compared images. Characters such a "b" and "d" have identical pathways and can only be differentiated by correlation score.

In addition, the link ratio i.e. the ratio of the number of links in the reference image to the number of links in the test image (a measure of the portion of the test image actually matched to the reference image) is computed. It is see that the link ratio is another measure of similarity based on internal structure of an image.

After searching all the candidate images, the data is interpreted to determine the most probable match on the basis of the test results. Preferably, pathway comparison is the highest test, with all passing results sorted by correlation score and link ratio. If all candidate reference images fail the pathway comparison test, results are sorted first by correlation score, then by link ratio. Matches with a very low link ratio can be ruled out because these likely reflect the presence of simple reference images in a complex test image. If no match can be made, the new node/link structure along with the computed reference keys and reference series may be added to the internal image memory so that the image structure will be recognized the next time it is encountered.

The present system is memory efficient because the reference images are stored in the form of nodes and connections between nodes. The present system is also fast because the use of reference keys and reference series permits rapid screening of the reference library.

Finally, it is noted that the foregoing tests for matching images, i.e. pathway comparison, correlation score and link ratio, are unaffected by scale or orientation.

Therefore, the recognition process, for both screening and searching is scale and orientation independent, with variations and anticipated distortions accommodated by additional reference images and reference keys for inexact forms.

DESCRIPTION OF THE DRAWING

FIG. 1 illustrates convex and concave center pixels used in the skeletonization process in accordance with the present invention.

FIG. 7 shows the link and node structures for the characters "A", "B" and "E" in accordance with the present invention.

FIG. 10 illustrates the matrices for the characters "A" and "E" used for generating a reference key.

FIG. 11 illustrates two matrices for the letter "E", one with links distributed randomly and the other with links weighted to one side of the matrix, in accordance with the present invention.

FIG. 12 illustrates the concept of the reference series for a node used for measuring the level of affinity, for generating keys in accordance with the present invention.

FIG. 13 illustrates the concept of building the cumulative reference series for generating keys in accordance with the present invention.

FIG. 15 shows valid alternative representations of the character "A" which may be used in conjunction with the present invention.

FIG. 20 shows the images of FIG. 18 modified somewhat to contain a triangle at different orientations.

FIG. 22 shows the fusion of 2 curves in accordance with the present invention.

DESCRIPTION OF INVENTION

Introduction

The ensuing pages present a description of a software system designed to provide a rapid and accurate means of recognizing characters, numbers, symbols and other items within electronically scanned images. The system employs unique image analysis and storage techniques which enable it to recognize hand drawn as well as printed characters and images. The system's dynamic learning capability enables it to interpret the information contained within scanned images, extract key graphic relationships then to generalize this knowledge in such a manner that it can identify the same or similar images. The system is revolutionary in that it can reliably interpret both handwritten and printed characters and symbols while not requiring any specialized hardware. Also, its capabilities are not limited by individual handwriting styles or stylistic features of printed fonts.

UNIQUE CHARACTERISTICS OF INVENTION

Figure 41:
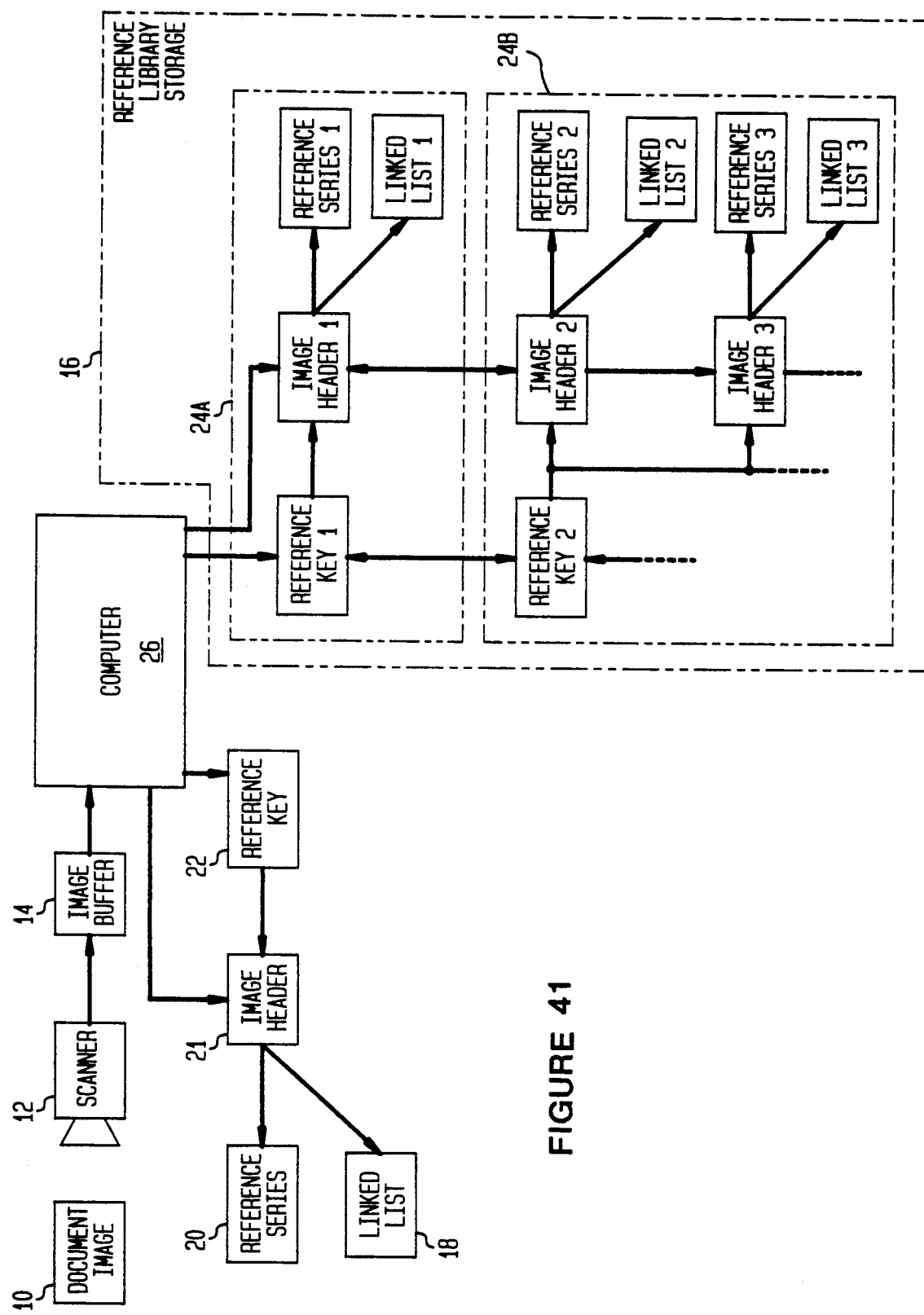
FIG. 41 shows a system for recognizing images such as handwriting, in accordance with the present invention.

The system of FIG. 41 distinguishes itself from other software and hardware based methods of image recognition by its ability to identify images regardless of orientation, image size, image distortions, incomplete images, or images embedded within larger forms. Furthermore, the system can operate at commercially acceptable speeds on commonly available hardware such as personal computers or workstations 26. Finally, the system is quite adaptable in "learning" to recognize new images without explicit direction.

To achieve its high degree of robustness and performance, the system draws upon several unique techniques.

Font format construction

The system converts its input which it receives as bit-mapped data into a reduced "font-like" format. That is, the data is reduced into mathematical expressions which occupy significantly less storage 18 space than the original data 14 and can be used to re-create the original image at any scale with high degree of precision.

Multi-dimensional data format

The system stores 18 the image data in a format which uses computer memory locations as markers for key points in the original image.

Key referencing

For each image that it attempts to store or to identify, the system generates an alphanumeric key 20,22 which can be used to facilitate a very rapid identification of matching images.

Parallel searching

The system employs a parallel depth-first search strategy in comparing two images. This search is modified to reject unlikely matches to calculate a score of the "goodness of fit" between two images and to ignore superfluous information.

DISCUSSION OF PROCESS

Image recognition is performed by recording and matching image characteristics. See FIG. 41.

Both recording of an image and its subsequent matching with other images is performed through a 6 stage process. The purpose of the process is to translate an image's graphic form into a format that is as accessible and retrievable as a conventional database and yet retains all information necessary to describe the image's salient characteristics. The 6 stages comprising the image recognition process are:

Stage 01: Image Creation
Stage 02: Image Reduction
Stage 03: Data Storage
Stage 04: Screening
Stage 05: Searching
Stage 06: Interpretation It should be noted that actual image recognition takes place by comparing an unknown image 14 (the test image) against a library 16 of known images (the reference images) until an accurate match is found. Thus, prior to attempting recognition, it is necessary to compile a comprehensive library 16 of reference images 24A,24B. The reference library 16 is created by processing numerous known images, such as the letters of the alphabet or numerals, using Stages 01 through 03—Image Creation, Image Reduction and Data Storage. At the end of Stage 03, the image library is stored in a reduced mathematical format 18, which can be used to regenerate the library images at any time. At this time it may either be stored or used in the recognition process. The steps involved in setting up the reference library 16 are illustrated in Chart 11. The recognition process initially follows the same course. As a test image 14 is analyzed, it too is processed through Stages 01 through 03 into a reduced format. Then using Stages 04 through 06, the test image is compared to the images in the reference library until an accurate match is found. Chart 12 shows the full image recognition process appending the recognition stages to the image reduction and storage steps.

Input to the system takes the form of scanned images 12 of original documents 10. The images may be stored in TIFF or other standard formats. Once the image has been received by the system, recognition is accomplished by a methodical multi-step process. As stated, Charts 11 and 12 present an overview of the sequential flow of these steps. An indepth discussion is contained on the following pages.

STAGE 01: IMAGE CREATION

Image creation is achieved by electronically scanning 12 original documents 10 in FIG. 41. Scanning technology is an accepted and widely available means of converting "paper-bound" information into electronic form. During this process, the scanner 12 creates an "electronic image" of the document by interpreting the it as a dot pattern and then storing it in a prescribed graphics format such as TIFF. Typical resolution quality of the image may range from less than 100 up to 600 "dots per inch". That is, a 1 inch segment of the source document can be stored as 600 discrete bits of information. One square inch could contain up to 360,000 bits of information (600 × 600). Once in this form, the image is ready for interpretation.

PROCESS OVERVIEW

Image dimensions are checked at this point in an effort to obtain approximate sizes of significance. The image is then placed in a buffer 14 large enough that the image analyses are allowed to "slop" over the edges of the image.

It is important to note, that the methods herein discussed are designed to process information in typical "scanner output" format. That is the information is recorded as a dot pattern of the original image. The techniques necessary for processing this information are different from those which require information from an electronic digitizer or other forms of "stylus" driven devices where original information is inputted directly in some form of vector format or as a series of coordinates. To process digitizer generated information, the first part of Stage 02, image thinning, would be bypassed since the digitizer's output, as a stream of coordinate values, is equivalent to a single line form.

STAGE 02: IMAGE REDUCTION

This stage entails "disassembling" the image into simple forms. Specifically, the image is broken into individual "links and nodes"—where nodes are intersection or termination points of lines within the image with links representing the actual lines. During this analysis, the system extracts and stores detailed information of the link and node connections; including

- length of link
- type of link (i.e.: line, curve, etc.)
- direction of curvature (clockwise, counter clockwise)
- mathematical descriptor of curves
- coordinates of nodes.

The links become connecting vectors whose intersections or termination occur at nodes.

Figure 8:
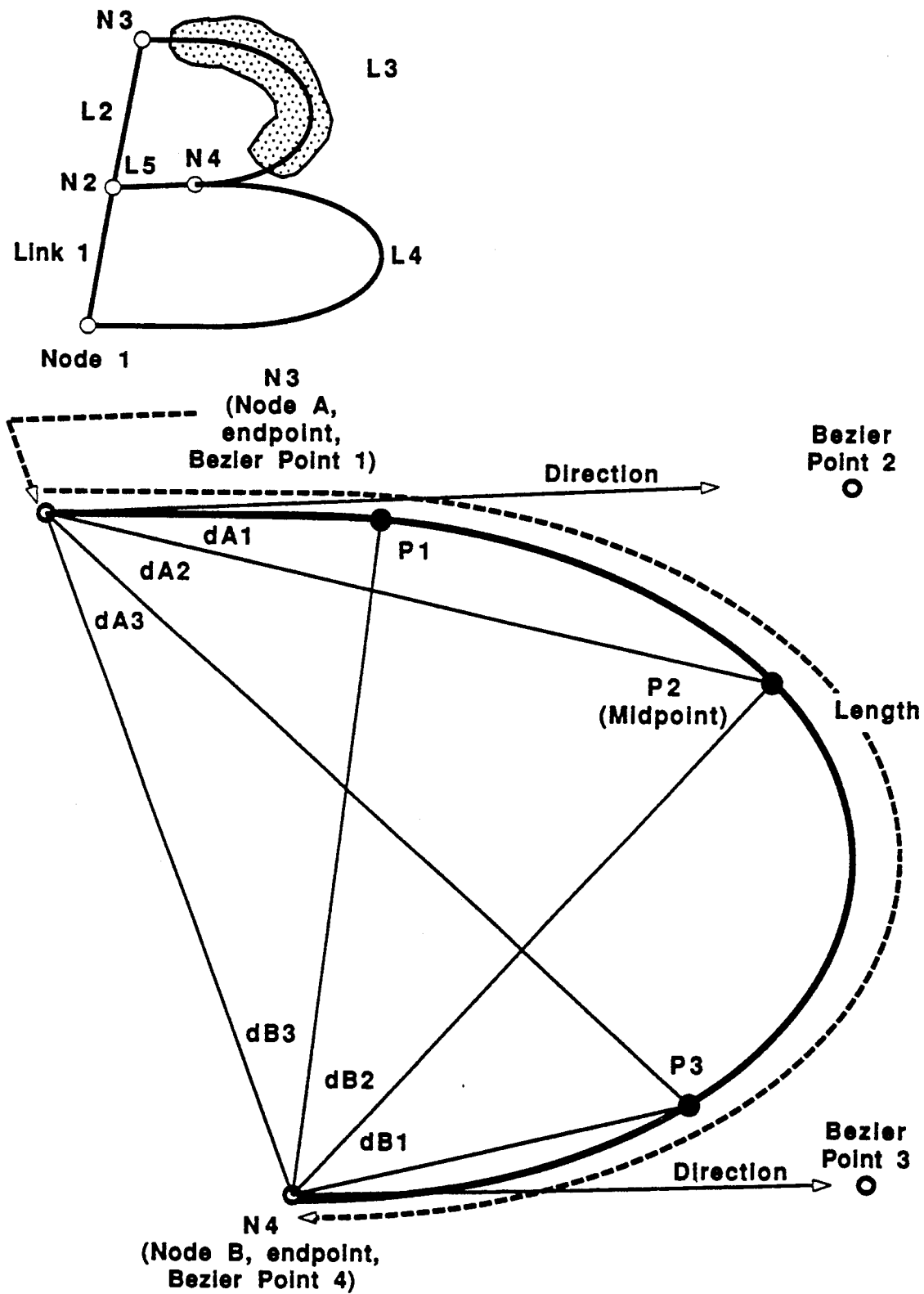
FIG. 8 basic data extracted for each link (using a curved link as an example) including its exit direction from the connecting nodes, length, endpoints, midpoint and Bezier points.

Whereas much information about an image is contained in its link/node structure, the final determination of whether two images match will often result from a detailed comparison of links. Thus, it is necessary to store sufficient information on the curve to permit a "goodness of fit" test to be performed during the matching process. Curve information is stored as a series of seven points as follows:

- Two curve end points
- One curve midpoint
- 4 Bezier descriptors for each half of the curve
- length of curve FIG. 8 shows basic data extracted for each link (using a curved link as an example) including its exit direction from the connecting nodes, length, endpoints, midpoint and Bezier points. These values can be used both to regenerate the image as well as to gain key information such as point coordinates or direction and skew of curve links. All links in an image are reduced to this format.

At the end of Stage 02, Image Reduction, the original image has been "reversed engineered" into a set of points linked with mathematical expressions. In effect, the image has been reduced to an electronic "font" which can be used to regenerate the image with a very high degree of precision at any scale. The ensuing paragraphs provide a step-by-step discussion of the image reduction process.

IMAGE THINNING

Printed or handwritten characters must be "skeletonized" to obtain a Working Minimum Line Image (WMLI). See chart 2. Care must be taken as most skeletonization processes severely distort the image. We used a combination of skeletonization and clean-up techniques to accomplish the desired degree of skeletonization while minimizing distortion. The WMLI is a image with all pixels removed but those absolutely required to maintain image integrity.

If the WMLI has properly been obtained the Primary Nodes must be found next. These node pixels are on the WMLI and constitute pixels that are at the ends of paths o at path junctions.

Secondary Nodes must be found next. These are pixels on the WMLI which are at Significant Zero Crossings on paths between Primary Nodes. A significant zero crossing must not be significantly close to a primary node along a path. They are found by following the path from one primary node to another. If the distance between the path and a line connecting the nodes becomes significant it may possess a secondary node. If the path return to the line occurs significantly away from either end node along the path, a secondary node is placed on the path at that point.

Tertiary Nodes are found last. These nodes are found at sharp corners on paths between nodes. These nodes are found by measuring the "bend" in the path and placing Tertiary Nodes at local maximum bends.

Extra Tertiary Nodes are frequently found for various reasons. These reasons include pixel coarseness of the image, unsteady handwriting or unsteady scanning with a hand scanner to name a few. These may be undesirable when using scanned images to produce a reference library. If a library image is being created at this point an editor is employed to allow removal of unwanted Tertiary Nodes.

Node finalization places the node and path analysis information within data structures. Image adjustment at the data level is accomplished at this point then the data is merged into the process structures. All buffer space is returned at this point and control is passed back to the calling program.

THE WMLI

The Working Minimum Line Image is a special image produced by skeletonizing an image to the greatest level possible. The resulting image has some logical features that no other form of the image possesses. Many of these features can be utilized via Nearest Neighbor Pixel analyses.

SKELETONIZATION

Commonly used skeletonization routines such as those referred to here are so severe in implementation that they distort the skeleton of the image. In our implementation we have used three different algorithms one of which has been modified to produce less severe action. In addition some clean-up routines remove insignificant artifacts left by the skeletonization processes.

The first algorithm is one developed by us. It is optional but can be used to skeletonize wide lined images. See Chart 3. If speed is more important this algorithm can be skipped. The algorithm uses a nine pixel neighborhood (nine because of the rectilinear nature of common raster scanned images used in computer image handling and display) to determine if a pixel should be removed. Unlike the other processes, it allows corner and even path end pixels to be removed if both of the adjacent surface pixels are also to be removed.

First all edge pixels which meet the following criteria are flagged:

- only one surface exists within the 9 pixel neighborhood. This means only two surface transitions are found when testing pixels around the pixel in question.
- the pixel is not convex (See FIG. 1). This means there must be no fewer than six lighted pixels in the group of nine.

Next all convex pixels must be checked. These must meet criteria 1) above. Additionally these pixels must be convex pixels. This means there must be fewer than six lighted pixels within the 9 pixel neighborhood. If both surface pixels adjacent to the pixel in question are marked by the first two criteria, the pixel is also then marked separately for removal.

The next skeletonization process applied is based on an algorithm by Sherman outlined in *Computer Vision for Robotic Systems An Introduction,* Michael C. Fairhurst 1988, pp. 48–51. See Chart 4. Initially the routine is modified to darken an edge pixel only if certain criteria are met (not only those suggested in the above reference). Those criteria are:

Darkening will not cause a gap in the image.
Darkening will not remove a single pixel from the end of a path or a protruded corner.
Darkening will not cause a concave hole to be produced.

These additional criteria cause significantly less image distortion than the described process. Analysis to determine the above criteria is done on each edge pixel as the center of a nine pixel neighborhood as mentioned above.

It has been found that using different squeezing algorithms produces much less distortion of the image than using a more severe version of the previous method. As the second method we employed the process devised by Zhang and Suen as described in *Industrial Robotics Machine Vision, and Artificial Intelligence,* R. C. Gonzalez and D. Brzakovic 1989, pp. 77–79.

Figure 2:
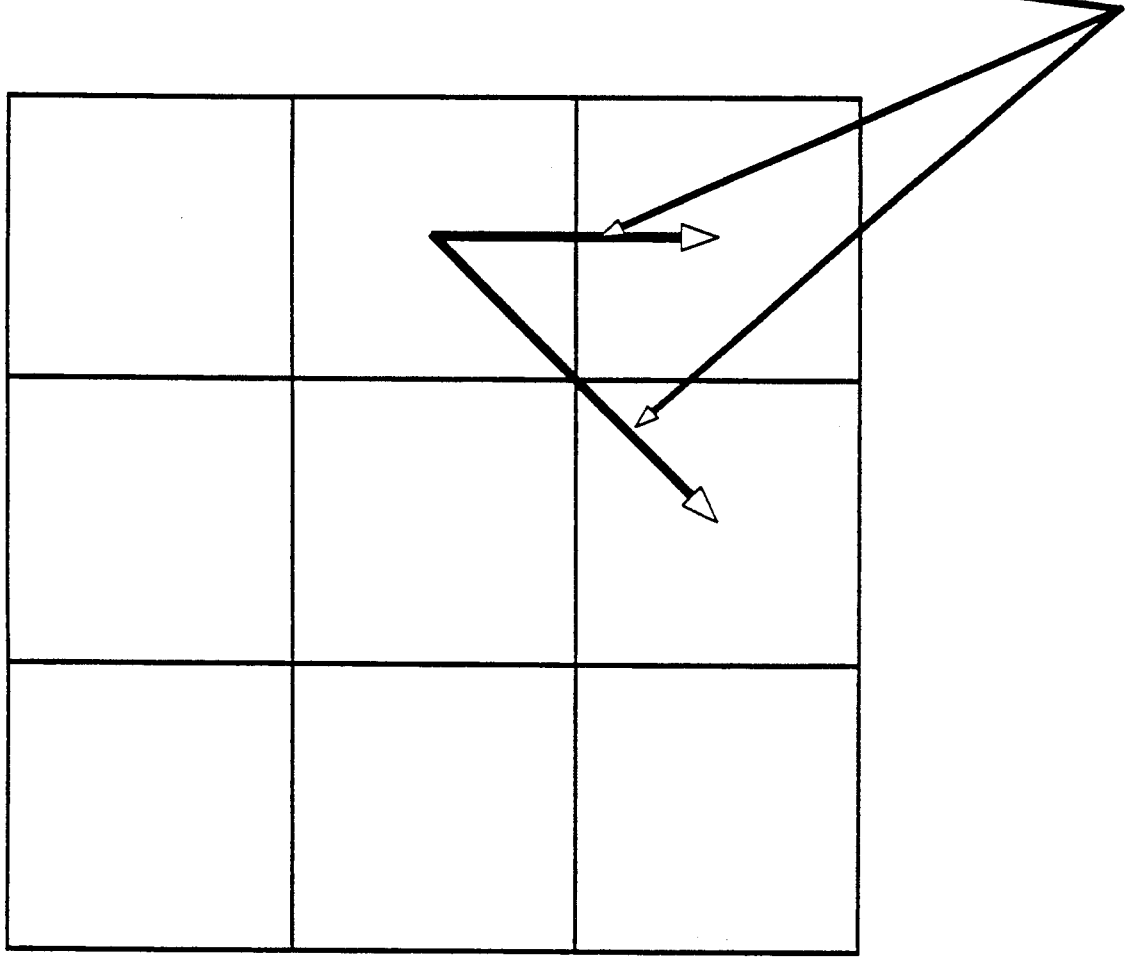
FIG. 2 illustrates the valid paths used in skeletonization allowing a lighted pixel to be removed for squeezing to the minimum line image in accordance with the present invention.

The final squeeze method produces the "minimum line image" MLI. See Chart 5. The Sherman method mentioned above is again used, however with less criteria being required for darkening the pixel. It was decided to use a table driven approach to simplify and speed the process. The only criteria to darken a lighted edge pixel is that the removal does not break a pathway of lighted pixels or whittle down the end of a significant path. It is important to note that diagonally touching pixels produce a valid path and can allow the lighted pixel to be removed (see FIG. 2). This final squeeze is employed other places throughout the analysis whenever the working image is possibly altered by addition of lighted pixels etc. This ensures a mathematically sound representation of the image.

The image that results from application of the above processes referred to as a Working Minimum Line Image. It has some important characteristics necessary to carry out the remaining analysis.

At this point we can do some "intelligent" clean-up of the skeletonized image. Reference or important points in a skeleton can be keys to clean-up of the image. These points fall into three categories: pixels with one emanating pathway, pixels with two emanating pathways and pixels with more than two emanating pathways. Pixels with one emanating pathway occur at the end of MLI paths. Pixels with more than two emanating paths are path junctions. These two groups of pixel types are grouped together and referred to as Primary Nodes (P Nodes). Pixels with two emanating paths may or may not be nodes. If they occur in a sharp bend or corner they are called Tertiary Nodes (T Nodes). Secondary Nodes (S Nodes) deal with Significant Path Zero Crossing and will be discussed later.

FINDING PRIMARY NODES

Primary Nodes and Tertiary Nodes frequently occur near errors in a handwritten image. See Chart 6. They also frequently occur near bit drop-outs. By analyzing the area surrounding these nodes we can intelligently determine the proper way to modify the image for clean-up.

P Nodes are found as follows (Chart 7):

Find all nodes with 1, or more than 2 emanating paths. These can be found by counting the pixels surrounding a pixel on the MLI. The are then marked on a cleared duplicate image. If one or more P Nodes have been found a success indicator is returned to the calling program.

Since analyses need at least one node, if none are found above, we must find sharp curves or corners (Similar to finding T Nodes below). If one or more are found a success indicator is returned to the calling program.

Pick a random pixel. If found a success indicator is returned to the calling program.

Return a no success indicator to the calling program. (No success indicates a blank image).

FINDING TERTIARY NODES

T Nodes are found as follows (Chart 8 and Chart 10):

For each path from each node established by previously applied techniques determine the path size (pixel count).

Next calculate segment size. If path is too short to analyze a corner would be insignificant. This size is determined by the following criteria:

must be $>=4$ pixels
allow $>2$ segments per curve.
must be determined by maximum number of pixels/segment with no more than 4 segments.

Starting at one segment distance along the path, compare the direction change at each pixel between the path segment entering the pixel, and the path segment leaving the pixel. Where significant maximums of this parameter are encountered, a T Node is established.

Figure 3:
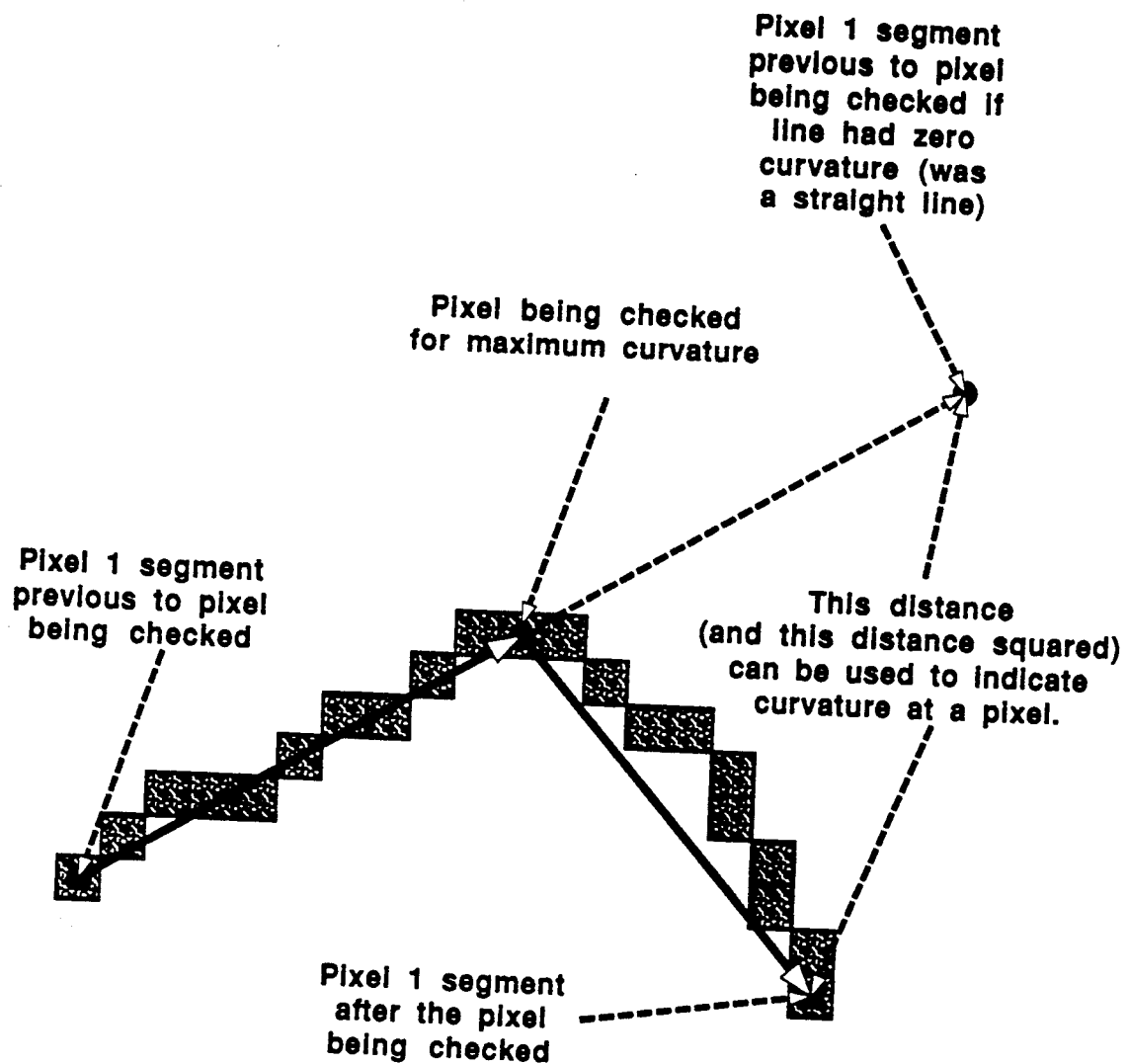
FIG. 3 illustrates the method for finding tertiary nodes caused by a change in direction of a line in accordance with the present invention.

Using the direction change is also finding the deviation from a straight line since a straight line does not change direction. The distance between the endpoint of a line segment continuing from a point and the actual path distance is related to the change in direction. Generally it is found that the relationship, though not linear, is a function and so comparative values can be used to determine the greatest and least path curvature (See FIG. 3).

FINDING AND CORRECTING IMAGE INCOMPLETIONS

The next function performed is the finding and repair of incompletions in the image either caused by bit drop-outs or careless image creation. There are two types of image gaps which commonly occur, line gaps and proximity gaps.

Figure 4:
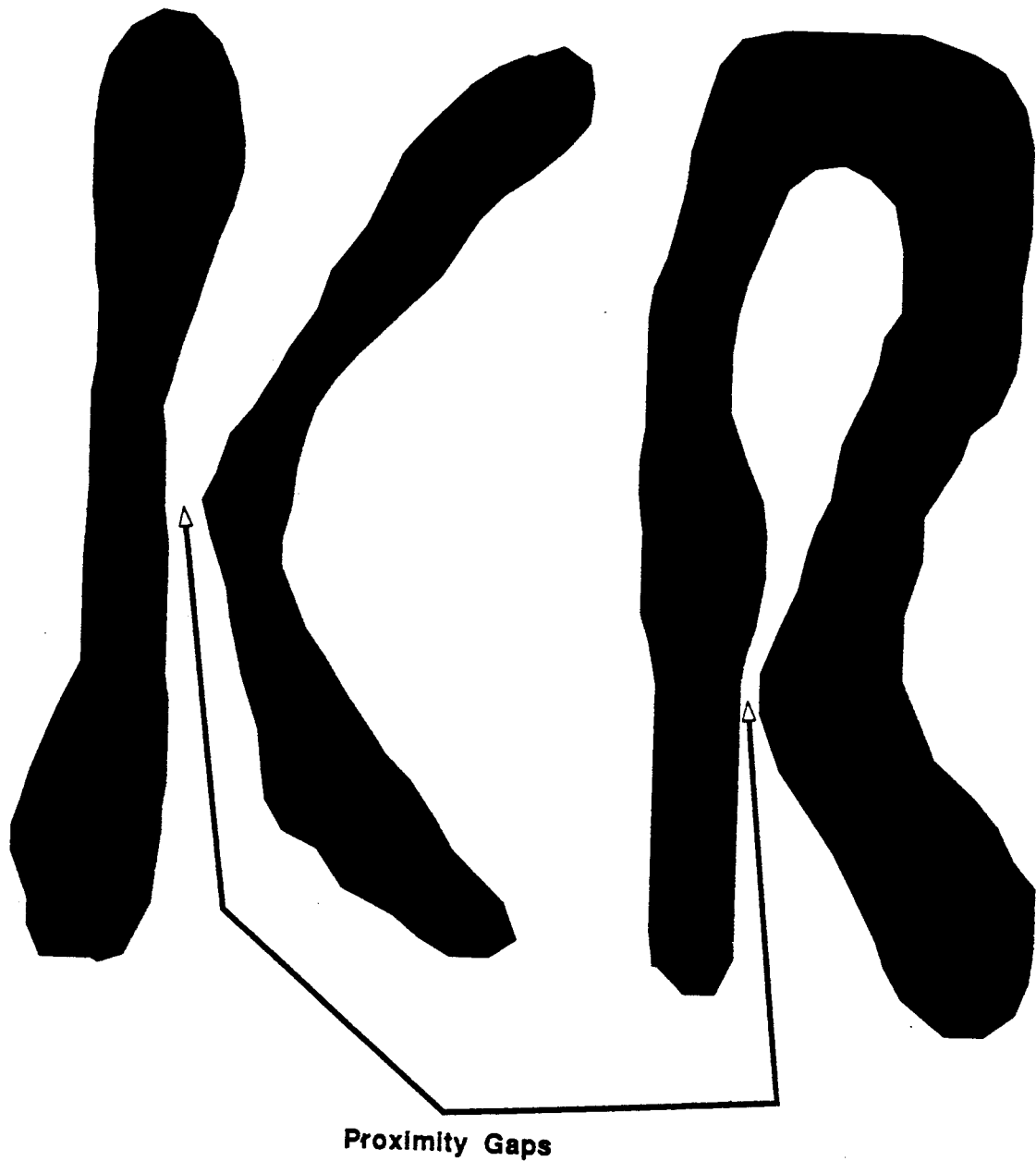
FIG. 4 show proximity gaps in handwritten characters caused by careless image creation which may be read by the method and apparatus of the present invention.

Line gaps are caused by bit drop-outs, weak line width on scanned image etc. Careless image creation frequently causes proximity gaps (See FIG. 4). Capital K and Capital R seem particularly susceptible to this problem at the character center. The finish routine deals with these by extracting a section of a drawing about each pixel with a square of 2 significant distance units on a side surrounding the pixel. It then finds the closest point on each land (not including the land which contains the node). If the gap in the original image between the lands along the line from the node to the other lands is smaller than a significance unit a line is drawn on the skeletonized image.

At this point the image has possibly been modified so we must squeeze the image again to obtain the MLI.

The P Node image is cleared and the P Node search is again conducted.

Figure 5:
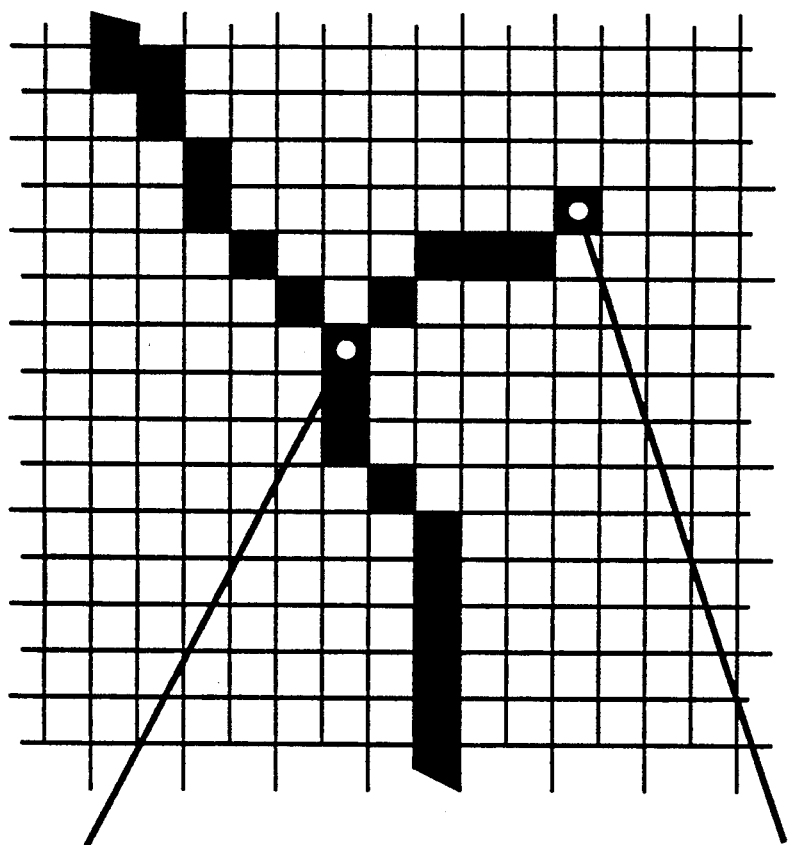
FIG. 5 illustrates spurious nodes created from hair-like paths of insignificant size caused by skeletonization which must be removed from the image to allow most efficient processing in accordance with the present invention.

Skeletonization frequently creates hair like paths of insignificant size which must be "shaved" off of the image to allow most efficient processing. Each of these hairs cause two different spurious P Nodes to be created as shown in FIG. 5. The "hairs" ar shaved off in three steps. First each P Node with 3 or more emanating paths is found. Each path is followed to determine it's pixel length and the type of end pixel. If the length is insignificant and the end pixel has only one path then a similar routine can follow the line again removing pixels as it goes.

Since the shaving process, shown in Chart 9, adds no lighted pixels, the MLI process is not needed to ensure a mathematically clean image. This means that the resulting image is the WMLI and can be conveniently be analyzed.

LINK AND NODE IDENTIFICATION

Figure 6:
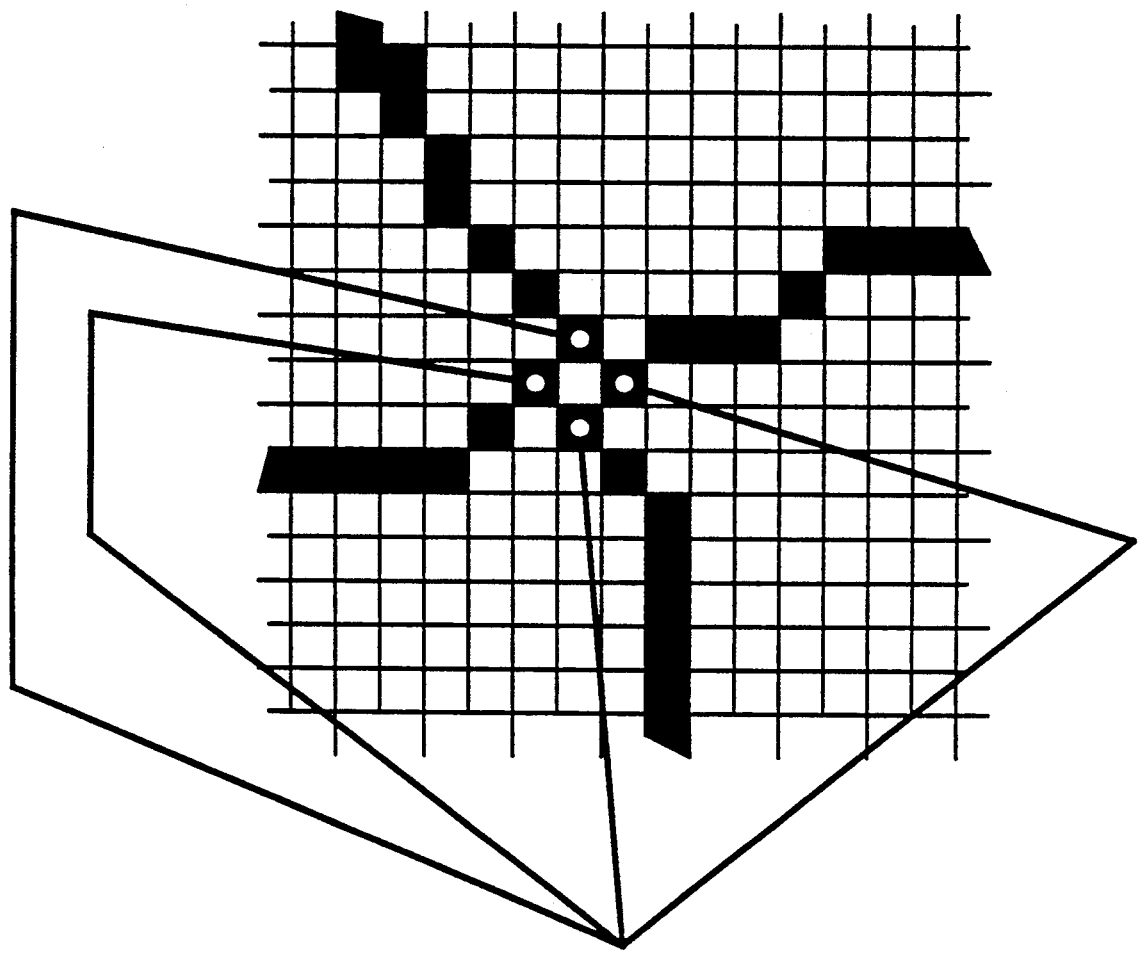
FIG. 6 illustrates a case where multiple nodes are created which may require merging areas after the data structure has been initially established, in accordance with the present invention.

As stated, the skeleton figure shows the entire image as a single line sketch with each line only 1 bit in width. Using each line in the skeleton figure as a pathway, the system evaluates the entire image following each line until it branches or terminates while recording both distance and direction. Since the skeleton figure actually consists of memory bits with assigned values of "1" against a background with an assignment value of "0", the system traces the skeleton figure by testing adjacent bits for a value of "1", then proceeding in the direction indicated by that bit. Throughout this process, the system continually test for three conditions:

Termination of the line
    A sharp change in the line direction
    The crossing or forking of lines If any of these is encountered, the system establishes a node at that point. In some cases multiple nodes are created which may require merging areas after the data structure has been initially established, as shown in FIG. 6.

The distance, direction and nature of the pathway between two nodes is recorded as a "link" between the nodes. Whenever a node is discovered by the intersection of two or more lines, the system follows each pathway until all lines in the skeleton figure have been covered. At the end of this process, the system will have extracted sufficient information to describe the figure in terms of links and nodes, with nodes designating critical junctures in the image and links representing the connections between them. Detailed information is captured for each link including its length, exit direction to its connecting nodes and distance from each node to key points on the link—whether a line or curve. A sample link and node structures for the characters "A","B" and "E" are shown in FIG. 7. In the case where a link originates and terminates at the same node, such as a loop, the system records information in the manner as it would from two nodes. Once the graphic image has been translated into this form, it is stored in a unique data format.

STAGE 03: DATA STORAGE

Rather than drawing upon the common practice of storing information in the form of data elements, image information is stored as a series of relationships. That is, rather than storing information as a series of characters, information is stored as a series of memory locations with each location containing both data and "pointers" to other locations. Pointers are variables which contain addresses of memory locations. Given this property to "point" to specific locations, each pointer exactly replicates the vector nature of links and nodes in image construction.

Thus, in this form, nodes are memory locations which both hold stored information and act as pointers to other memory locations. Equating this concept to a link/node structure, each memory location represents a node, each pointer to another location represents a link. Stored at each node is complete descriptive information o all links which are connected to it. This information includes all the salient information captured during the image reduction stage such as exit direction of the link from the node, the length of the link, direction and Bezier descriptors of the link. The data structure is designed to hold large libraries of images while providing efficient and rapid access to them for the matching process.

The structure of stored data can best be illustrated diagrammatically. Each image is stored as a complex data type consisting of two parts: a header (21 in FIG. 41) and a relational network.

Header: A data record containing information which pertains to an image as a whole such as its ASCII representation, referencing key paths, number of links, number of nodes and a pointer to a single node in the relational network designated as the "head node".

Relational Network: The actual reduced image data in "font" format stored as a two-dimensional structure in computer memory.

The headers are chained together in a linked list (18, in FIG. 41) of information. The relational network for any particular image can only be accessed through its header.

DISCUSSION OF THE IMAGE HEADER

The image header contains the following information:

COMPONENTS OF IMAGE HEADER

ASCII representation of image
Reference key
Reference series
Node count
Link Count
Pointer to head node
Pathway pointer by ASCII representation
Pathway pointer by 3 reference keys
    Pathway pointer by reference series
    Location of baseline The ASCII representation of the image is a single character, word or group of words which assign a name to the image.

Samples include "A", "Rectangle", etc. The reference keys and reference series are items used for quick reference and screening of images prior to the searching process and will be addressed in detail in the discussion of searching (Stage 04). The node and link counts represent the total number of links and nodes in the image. The pointer to the head node identifies a location in memory where information on the head node is stored. The head node is selected as the node in an image's relational network with the greatest number of links. While this criteria is used to facilitate efficient matching during the recognition process in point of fact any node could be designated as the head node. Its purpose is to serve as a port of entry into the relational network. The pathway pointers represent sequential paths through a library of several image data structures which are connected like links in a chain. There are 3 sequential paths: the ASCII representation, the reference keys and the reference series. All paths permit passage in ascending order through the chain of image structures.

Figure 9:
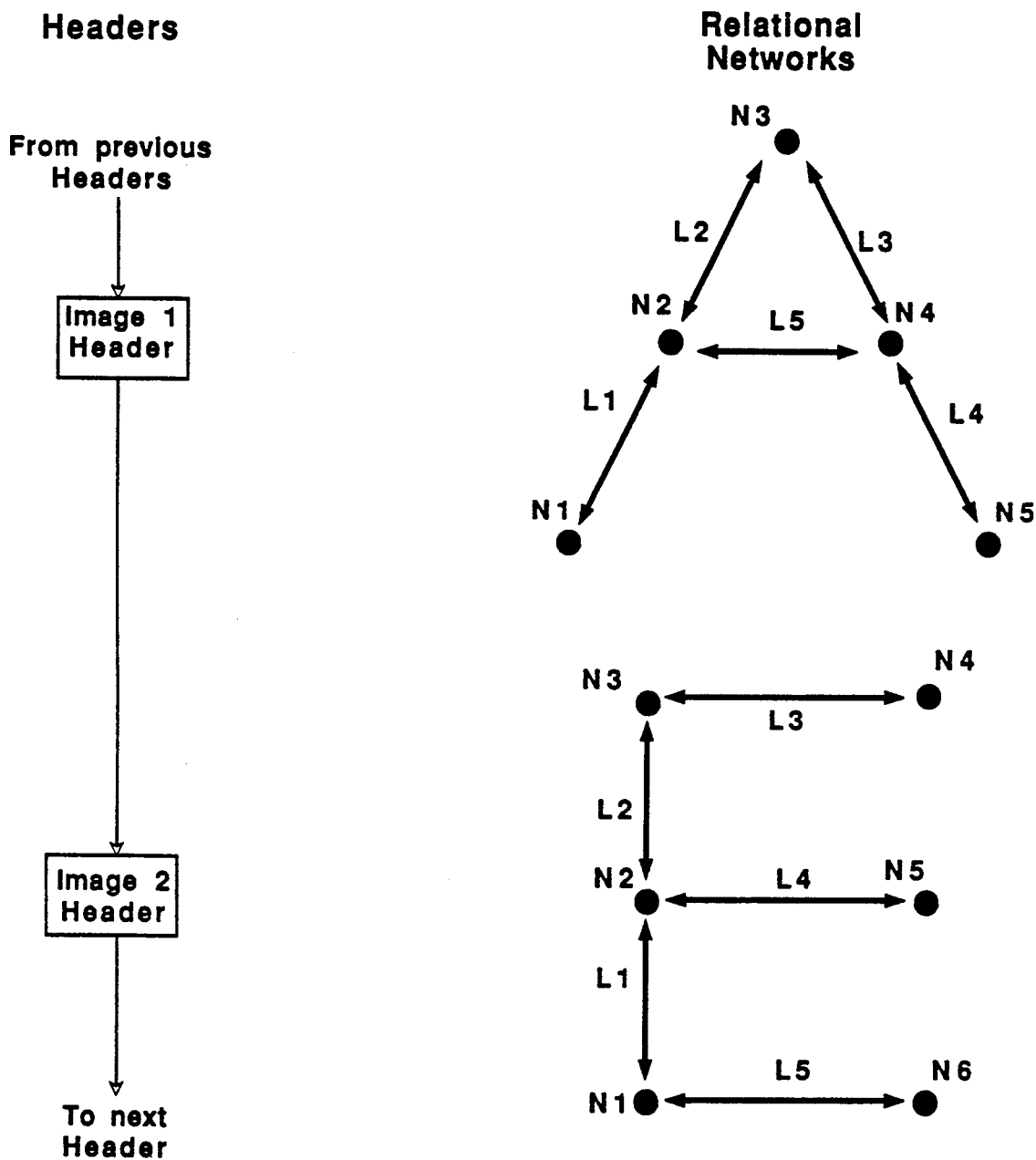
FIG. 9 is a diagram illustrating the relationship between the image header and the relational network for the letters "A" and "E".

As stated, the image header is connected to its relational network through the pointer to the head node. The relational network consists of a set of data elements which represents the node portion of the link/node structure. Each node is represented by a designated section of memory which, as is the case with the overall image header, holds information descriptive of the node, such as a unique node name, a count of the number of links and a pointer to a list of pointers, called the "node loop". The node loop is a linked list of data elements each containing pairs of pointers. One pointer points to the next element in the list, the other pointer points to a pointer in the loop of another node. Stated more contextually, the first pointer-to-pointer connection represents the various points at which links exit and leave nodes. The second pointer-to-pointer relationship, that from one loop to another, represents the actual links between nodes. The node loop is conceptually a circular structure arranged like a clockface, with entry/exit directions originating at the top and ascending in the clockwise direction. In this manner, it is possible to store and presence of all relationships in a vector structure. A diagram illustrating the relationship between the image header and the relational network is shown in FIG. 9. This illustration cites the data structure of the characters "A" and "E".

COMPONENTS OF RELATIONAL NETWORK DATA ELEMENTS

NodeHeader

Node identification code
Number of links
Pointer to loop

NodeLoop

Pointer to next element in loop
Pointer to element in another loop
Link information
Distance between nodes
Exit direction from loop
Distance to key points on link (i.e. ¼ points).

Although Stages 04 and 05 speak directly to the process of Screening and Searching, both those operations bear directly on the manner and format by which information is stored. The storage format permits screening and retrieval of this information in two ways:
 by reference keys,
 or, by reference series.
The reference keys provide a quick means of focusing only on images with very similar characteristics. Conversely, the reference series is used to screen comparisons which cannot possibly be a match. In other words, the reference keys are inclusive. They identify small subsets from the entire reference library—each subset contains likely matches for the test image. The reference series are exclusive since they are used to rule out impossible matches.

Although the reference keys and series are used in Stage 04 (Screening), they are generated in Stage 03 (Data Storage) and maintained as part of an images data structure.

In short, the reference key is a string of characters which distinguishes images from each other. The purpose of the key is to identify images with very similar characteristics for a more detailed analysis. The reference series is a string of integers, each of which maintains a tabulation of the number of nodes which has a specific number of links. Each of these is discussed as follows:

THE CONCEPT OF THE REFERENCE KEY (22 IN FIG. 41)

The purpose of the reference key is to capture the essence of the link/node relationships contained in the stored image data, storing this information in such a form that it can be referenced very quickly using conventional key referencing techniques. To function as a reference key, the information must take the form of a string of characters in ASCII format. The speed of reference is also a function of the length of this string, so the length of the key should be as short as possible.

Creation of the reference key is a two-stage process. First, relational information is extracted from the image. Second, this information is arranged into a single series of characters which will always express a particular set of relationships. The reference key is built by creating a matrix of all nodes and noting all of the linkages between them. For illustrative purposes, the matrices for the previously discussed character "A" and "E" are presented in FIG. 10. The nodes and connections between nodes extracted from the image is placed in the matrix. For example, in FIG. 10, the matrix for character "A" indicates that node 1 and node 2 are connected by link L1, while node 2 and node 4 are connected by link L5.

The information in FIG. 10 can be readily translated into a unique key for an grouping of links and nodes. This is accomplished by treating the presence or absence of links as 1's and 0's, then "bitmapping" this information into an area of sequential memory bits. Mapping of 1's and 0's, into a prescribed area of memory, then dividing this sequential memory area into 8 bit segments will enable "reading" this area as a series of ASCII characters. The resulting string of characters will generate a key which is unique to the fundamental relationships within a character. If two characters have identical internal relationships, they will generate the same key. Thus, while matching by key will greatly narrow the number of possibilities of likely "matches", it will not necessarily be the final step in the recognition process.

THE CONCEPT OF THE REFERENCE SERIES (20 IN FIG. 41)

The numeric reference series is another attribute of an image which is created to facilitate the recognition process. Unlike the reference key which is used for matching, the series is used to screen image comparisons to determine if a match is even possible. Whereas the reference key works by "inclusion", the reference series works by "exclusion". The series consists of an array of integers, each of which represents a total number of nodes with a certain number of links. Reference series can be tabulated for individual nodes as well as entire images.

The reference series for the overall image is used for screening purposes whereas individual node reference series are used for key construction, and will be discussed in conjunction with Key Generation.

In the following table, the lower row (Number of Nodes), illustrates the structure of a sample series for the letter "A".

| Number of Links: | 3 | 2 | 1 | 0 |
|---|---|---|---|---|
| Number of Nodes: | 2 | 1 | 2 | 0 |

In this example, the series shows that the letter "A" has 2 nodes with 3 links, 1 node with 2 links and 2 nodes with 1 link Its reference series is simply 2,1,2,0. Whereas this information does not guarantee a direct match, it can be used to rule out certain comparisons. For instance, the letter "X" has 1 node with 4 links and 4 nodes with 1 link yielding a series of 1,0,0,4, 0. Since "A" has no nodes with 4 links, a match with "X" would not be possible and can be quickly ruled out.

Both the reference key and series provide a means of quick reference and screening of potential matches. The actual determination of a match, however, is the product of a searching process which is discussed as Stage 05. Screening is an important prelude to searching. Whereas the details of screen are presented in the detailed discussion of that stage, the screening process is made possible by the reference key and series elements. Following is a detailed discussion of both concepts.

BUILDING THE REFERENCE KEY

As noted, the reference key provides an effective means of quick image matching.

It takes the form of a series of ASCII characters which can be sorted by relative value and quickly accessed using conventional data base techniques. In fact, the system creates several reference keys. However, these keys can be grouped into two classes based upon image form: exact and inexact.

The exact form represents the exact structure in its idealized form.

The inexact form anticipates the distortions most likely to occur in an image.

Each image will have one exact form and many inexact forms depending on likely distortions. For each exact and inexact form derived, the system generates three keys.

Key 1: contains all of the information in the image.
Key 2: contains all image content excluding those nodes which ar the result of a line inflection.
Key 3: excluded the same nodes as Key 2 and also excludes any "spurs". That is, single lines leading to a terminus.

For discussion purposes, the groupings of these 3 keys for an image form is called a Key Group.

KEY GENERATION

With regard to key type, the following paragraphs present a conceptual discussion of key generation. These methods apply both to the exact and inexact keys. Following this discussion, the specific characteristics of the inexact form are presented in detail. The logic of key generation is shown in Chart 15.

The conceptual basis of the key is a matrix of relationships as illustrated in FIG. 10. The matrix consists of a listing of nodes and individual "cells", each representing the "intersection" of nodes. The number of cells is a function is a function of the number of nodes and can be calculated as the summation of the series $n+n-1+n-2 \ldots +n-n$. In the context of the link/node image structure, each linkage can be equated to one bit of information. Under the matrix concept, whenever one or more links exists between two nodes, their cell of intersection is assigned a value of "1", otherwise the "background" value of all matrix cells is "0". The cells of the matrix can be viewed as sequential areas of computer memory with every 8 cells representing 1 bit. Thus, the series of cells can be interpreted as a string of ASCII characters. An illustration of the bitmapping concept is presented in FIG. 10. The series of ASCII characters represents the reference key. In the example cited in FIG. 10, the Reference Key consists of 3 characters with binary values of 01101100, 00001000, 00000000 or ASCII values of 108,8 and 0 respectively. The length of the key, in bytes, will be the number of cells in the matrix divided by 8.

To be useful, however, the key must be consistent for an image, regardless the order by which link and node information is recorded. The order of the nodes in the matrix cannot be random since this would lead to n factorial (n!) possible keys. Thus, the arrangement of the nodes must be established by a methods which will ensure a consistent arrangement of nodes.

The method employed to establish node order can best be illustrated by again considering the matrix model. This method entails "weighting" the linkages toward one side of the matrix. The concept is presented graphically in FIG. 11 which shows two matrices for the letter "E", both valid, but one with links distributed randomly and the other with links weighted. Given this framework, it is possible to establish a consistent order for key generation.

As each piece of information from an image is recorded, the number of links connected to each node is tabulated, this number becomes the "reference series" for the node. Once all the information for an image has been recorded, it is possible to use each node's reference series as the basis of key generation. The premise of key generation is establishing an order for nodes which can be always be replicated, regardless the order in which they were recorded. As discussed, this order is determined by "weighing" nodes by their intensity of links.

In order to weight a matrix, it is necessary to establish a "level of affinity" among nodes with identical or closely matching numbers of nodes. The level of affinity follows the rule that each node will have the strongest affinity for the node to which it is connected with the greatest number of links, with the strength of the affinity lessening as the difference in number of links widens. Affinity among nodes will establish their ranked order.

The level of affinity can be measured using the reference series. This is accomplished by calculating the reference series for each node. The concept of the reference series is illustrated in FIG. 12, its logic in Chart 13. The cumulative reference series consists of the summation of the reference series for the node plus all other nodes to which it connects which have equal or less links. The series is computed using a depth first search, starting at each node and encompassing all nodes with equal or less links. In every case where the search encounters a node with less links than the start node, the search will branch into all links emanating from that node. When it encounters a node with an equal number of links, it will stop the branch of the search at that node. The product of this search will be a reference series for each node containing the original reference series for the node and the summation of series from all nodes to which it is connected and which have equal or less links. The concept of the cumulative reference series is illustrated in FIG. 13, the logic for building it is shown in Chart 14.

The reference series for any individual node is established by identifying all nodes directly linked to it and compiling a series of integers, representing the number of links in all the attached nodes. Only those nodes with links less than or equal to the individual node are considered. Thus, if Node 2 from the link/node structure for the character "E" is considered (FIG. 11), this node connects to 2 nodes, each with 2 links and 1 node with only 1 link. Its reference series consists of 1 count of 3 links (Node 2 itself), 2 counts of 2 links (Nodes 3 and 1) and 1 count of 1 link (Node 5). Similarly, Node 4, also from the character "E" links to 1 node with 2 links. In this latter case, Node 3 is not added into Node 4's reference series, because it has 2 links against Node 4's single link. Thus, the reference series for Node 4 would only contain its own link count.

The following table shows the individual reference series for each node in the character "E".

| Node | Links | | | |
|---|---|---|---|---|
| | 3 | 2 | 1 | 0 |
| 1 | 0 | 1 | 1 | 0 |
| 2 | 1 | 2 | 1 | 0 |
| 3 | 0 | 1 | 1 | 0 |
| 4 | 0 | 0 | 1 | 0 |
| 5 | 0 | 0 | 1 | 0 |
| 6 | 0 | 0 | 1 | 0 |

The cumulative reference series not only tabulates all the links on nodes directly connected to any particular node, but also sums all nodes that are connected to it by any pathway, providing the pathway does not "cross" a node of an equal or greater number of links. In the previously cited example of the character "E", Node 2 connects directly to Nodes 1, 3 and 5. However, it also has a direct pathway to Nodes 4 and 6. Thus, its cumulative reference series, in fact, contains all the nodes in the image structure. This is expected since this node has the greatest number of links in the entire image. Node 3 connects to nodes 2 and 4. However, since its number of links is less than those of Node 2, the pathway that can be followed in accumulating the cumulative reference series stops at Node 2. Thus, its cumulative series is the same as its basic reference series consisting only of itself and Node 4.

The following table shows all cumulative reference series for all nodes in the character "E".

| Node | Links | | | |
|---|---|---|---|---|
| | 3 | 2 | 1 | 0 |
| 1 | 0 | 1 | 1 | 0 |
| 2 | 1 | 2 | 3 | 0 |
| 3 | 0 | 1 | 1 | 0 |
| 4 | 0 | 0 | 1 | 0 |
| 5 | 0 | 0 | 1 | 0 |
| 6 | 0 | 0 | 1 | 0 |

Once the cumulative reference is established, a numeric sort of nodes can be performed by cumulative reference series. Reference series are sorted by comparing their individual array elements on a one-to-one basis. That is, the first array elements are compared, then the second, third, etc., until either all array elements have been considered or an element in the test array is found to be greater than one in the reference array. In the latter case, when a higher value is found, that array containing the higher value is considered the greater reference series. If an element in the reference array is greater, the difference is added to the next array element. The number of elements in a reference series will always be established as the greatest number of links on any node in the image structure. Thus, with the number of elements in the series constant, and the elements arranged in descending order, reference series can be compared on an element by element basis, starting with the first element and proceeding through the series. If an element in on series is greater than that in the other, the comparison stops, and the series with the greater element is designated the greater series. If all elements match exactly, the series are considered equal.

The following table shows the sorted cumulative reference series for the character "E".

| Node | Links | | | |
|---|---|---|---|---|
| | 3 | 2 | 1 | 0 |
| 2 | 1 | 2 | 3 | 0 |
| 1 | 0 | 1 | 1 | 0 |
| 3 | 0 | 1 | 1 | 0 |
| 4 | 0 | 0 | 1 | 0 |
| 5 | 0 | 0 | 1 | 0 |
| 6 | 0 | 0 | 1 | 0 |

By sorting nodes by their cumulative reference series, an order can be established which will always generate the same weighted matrix for the sam internal relationships in the link/node image structure Once the nodes have been sorted, one additional step, the process of "sliding" nodes is applied. Once the node list has been sorted by each node's cumulative reference series, it is already arranged in descending order with the node of greatest reference series leading the list. The sliding process consists of sorting among nodes of equal rank by moving to a higher position in the node list those nodes which are linked to higher ranked nodes.

This process can best be described by example. For instance, the letter "E" has 5 nodes with the single central node (Node 2) with 3 links also having the greatest reference series. There are also 3 terminal nodes, each with only 1 link. At the end of the reference series sort, the 3 single link nodes may fall into in any one of 6 orders (i.e. 3!). Through the sliding process, however, the node that is connected to the 3-link node will be moved to a position in the node list higher than the other 2. The actual sliding process works by starting with the highest ranked node, (in the case of "E", this is Node 2) then checking each node connected to it by a direct link. In this example, Node 2 is connected to Nodes 1, 3 and 5. Each of these nodes is checked by comparing it to the one in the next higher position in the ranked node list. As can be seen in the above table Node 1 would be compared with Node 2, Node 3 with Node 1 and Node 5 with Node 4. A comparison is then conducted. If the node in the next higher slot has a higher reference series, the process stops, since the nodes are not of equal reference series value. If the reference series are equal, the nodes are switched. In the example, Node 2 has a higher reference series than Node 1. Thus, they would not be switched, however, Node 1 will be "flagged" to note that it has already been evaluated and should not be switched in another comparison. Node 3 is then compared with Node 1. Although they have the equal reference series, Node 1 has already been flagged and, thus, they will not be switched. The final comparison is between Node 5 and Node 4. Both Nodes have equal reference series and Node 5 has not been flagged as previously evaluated. They can be switched. This process is repeated until a node with a higher reference series is encountered. In the case of Node 4, this occurs when it is compared to Node 3. The process is completed for all nodes connected to the first node, Node 2. All nodes evaluated have been "marked" so that they cannot be switched with any others. The process is repeated starting with the second ranked node in the list Node 2 and proceeds along the list until all nodes have been considered. Once the sliding process has been completed for all nodes in an image, the matrix of linkages has been successfully "weighted" and will always be the same for images with the same link/node structure.

In summary, using character "E" as an example, the sliding process will move Node 5 to the highest position for all 1 link nodes since it is connected to Node 2, the highest ranking Node in the image structure. Node 6 will follow Node 5, since Node 6 is connected to Node 1, the second highest ranking Node in the image structure.

Once the matrix is created it is possible to generate the reference key. Identical matrices will always produce identical keys. Examples of weighted and unweighted matrices are shown in FIG. 11.

Figure 14:
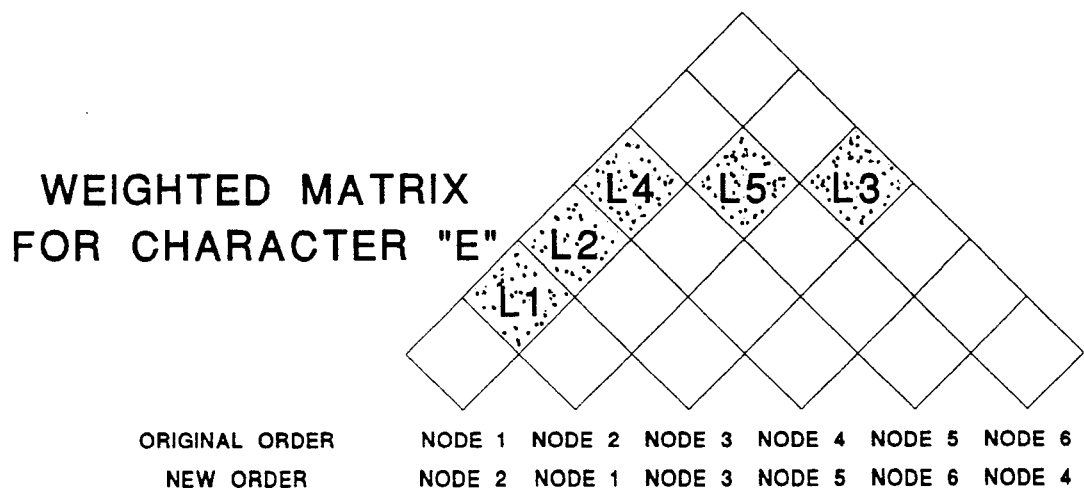
FIG. 14 shows how the reference key is created by bitmapping the contents of the matrix into a location in memory, in accordance with the present invention.

As discussed, the reference key is created by "bitmapping" its content into a location in memory, then reading this area as a string of ASCII characters. The bitmapping process is illustrated in FIG. 14.

Keys are unique to each distinctive image, but they are not unique to the symbolic representation of that image. For instance, there are several ways to represent the same alphanumeric character. FIG. 15 shows valid alternative representations of the character "A". Each of these will yield a unique link/node structure and, consequently, a unique key. To take full advantage of the key concept, it is necessary to record as many forms of common images as possible. When this becomes a mathematical impossibility, such as trying to anticipate all overrunning lines in all printed characters, a different method of screening images is applied prior to conducting the search comparison.

THE INEXACT FORM

The inexact form provides a means for anticipating an image's most likely distortions. Such distortions include superfluous links and nodes caused by flaws in the actual image or the scanning process. These distortions may take the form of an overextended line or an incomplete/disconnected cross-member. It is important to note that these are predictable distortions and must be distinguished from unpredictable distortions such as a "strikeover" or superfluous line drawn across an image. The later case, the unpredictable distortion, can be controlled during the Stage 05, Searching, and this matter will be discussed later. However, in instances where certain forms of distortion are indeed predictable, the inexact form creates a very efficient means of screening.

Since distortions will occur randomly, creating a unique key to account for each individual predictable distortion would require several keys. The character "M" has the potential for 6 overextended lines which would require 2 to the 6th power, or 64 different forms to account for each possible grouping of these distortions. Since distortion to overextension can take any one of the 64 forms, all forms must be considered. Since "M" has no cross members, it is assumed that no distortions will be caused by incomplete lines. If they are, they will be corrected by the Bridging technique previously described.

Figure 16:
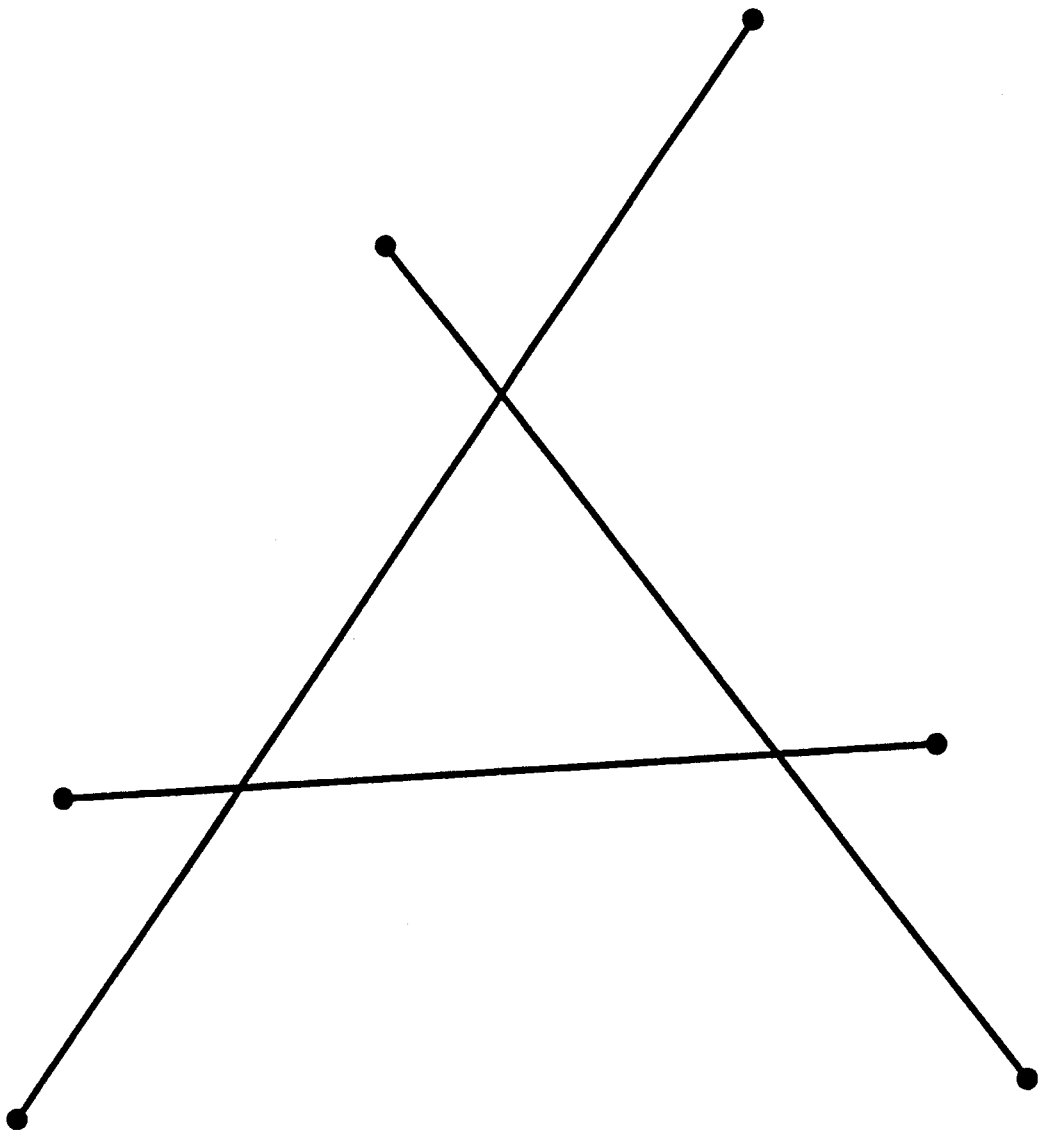
FIG. 16 shows all the inexact forms of the character "A" which may be used in conjunction with the present invention.

FIG. 16 shows all the inexact forms of the character "A". Once the transformation has taken place, the 3 Keys are generated for the inexact form in the same method as for the exact form. It is important to stress that the inexact key is only a screening tool and may miss some distorted forms of an image.

STAGE 04: SCREENING

Overview of Screening

Image matching is a two-step process. The first step consists of screening as a prelude to the second step which is searching. The logic of screening and searching is shown in Chart 16.

Two types of screening are performed:
Screening by reference keys
Screening by reference series If either screening process is successful, the next stage (Stage 05), Searching will be activated. If screening fails, no match for the test image exists in the reference library. The purpose of screening is to facilitate quick matching. The screening process works by applying very efficient data retrieval techniques to match image keys. Such database methods ar in widespread practice and represent a family of techniques which can be used by this invention.

SCREENING BY REFERENCE KEYS

The strategy underlying the screening by key is that the number of keys within the reference library may be very large—in fact, much greater than the actual number images. However, the keys associated with the test key should be linked—in fact, the test image should have only 1 key group of all the 3 previously identified keys.

If bridging has been used to fill probable gaps in the test image, 1 key group should be established for each form containing a combination of bridges. But actual look-ups by these other key groups would only occur if no match is found in the primary key group.

Screening by key is a simple table look-up exercise. All reference library image keys are contained in a table. A key group for the test image is generated and a match for each of its 3 members is sought in the reference table. If a match is found, the reference key connected to the key in the reference table is compared with the test image using the search techniques contained in Stage 06, Searching.

If no match is found for any of the 3 members in the key group, the second screening strategy, screening by reference series is activated.

The screening process can also have certain rejection applied to the key. For instance, the angle between 2 links, the length of a link or the requirement that a particular link be a curve may be specified. For example, the letters "A" and "R" could have the same keys, but the R will always have a curve to distinguish it from the "A".

Although the searching process (Stage 05) would be able to make this determination, appending these criteria to the key provides a functional shortcut by eliminating searches likely to fail.

SCREENING BY REFERENCE SERIES

The second screening method uses the reference series for an entire image This series simply reflects the summation of all reference series for an image's individual nodes. By comparing the reference series of 2 images, it is possible to determine whether a match is possible. Unlike the key, a reference series match will not guarantee an exact match of nodes and linkages. Rather, it will show if a match is even possible. For instance the reference series for the letter "A" is 0,2,1,2,0 and the reference series for the letter "X" is 1,0,0,4,0. It can be quickly seen that the letter "X" has 1 node with 4 links whereas "A" has 0 nodes in this category. Thus, the possibility of finding the character "X" inside the character "A" can be ruled out. However, if an image with the character "X" inscribed in a box as shown in FIG. 12 is considered, its reference series would be 1,4,0,0,0. In this case, it can be shown that the character "X" is part of the image by comparing reference series.

The actual comparison is performed by evaluating series elements on a one-to-one basis. In the case of the "X" and the "X" inscribed in a box, the first elements are compared. If they the test series is less than the reference series, the comparison continues. The comparison is not only made by elements in matching "slots" in the series, but also include all subsequent slots. For instance, the second, third and fourth elements of the reference series are 4,0,0,0 whereas these values are 0,0,4,0 for the test series. Whenever two elements are matched and the test is greater than the reference, the match fails, however, if the reference is less than the test, the difference is "carried over" to the next element in the series. Thus, in this example, the comparison of 4 and 0 in the second slot would generate a difference of 4 which would be carried into the third slot which, again, would generate a remainder of 4 which would be carried over into the fourth slot. In this case, the values would be equal and it would be determined that the reference series match was successful.

The purpose of the screening process is to reduce the number of detailed searches which must be performed. Once the screening process is complete, the next step becomes the search.

STAGE 05: SEARCHING

Searching describes the indepth comparison of the attributes of two images. One image is known and used for reference purposes, the other image is unknown and is being tested for a match with a known image. For purposes of discussion, the known image is labelled the "reference image" and the unknown image, the "test image". The screening and searching processes are performed by comparing the test image against each member in a library of several reference images. The logic of searching is presented in Chart 17.

Figure 17:
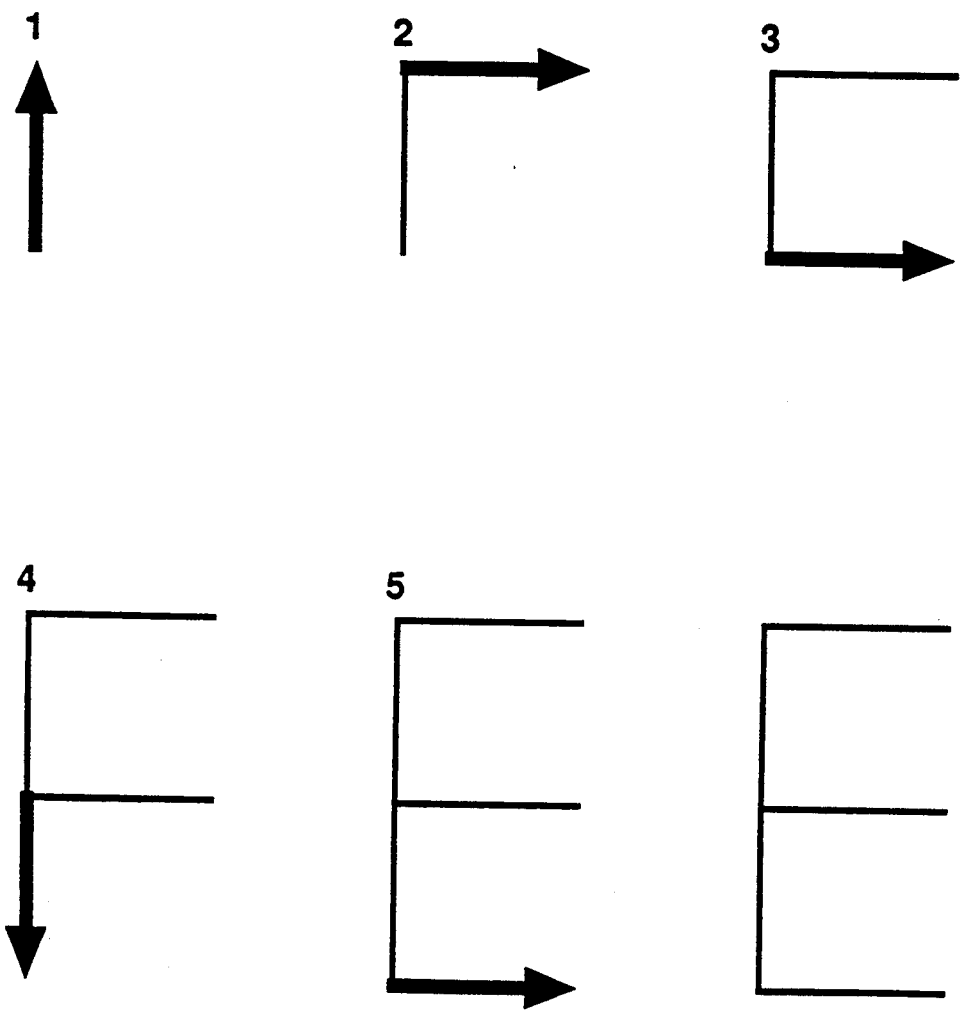
FIG. 17 shows step-by-step search progression through the character "E" in accordance with the present invention.

The images are compared on a one-to-one basis by specific attributes while a score is maintained to measure the strength of the comparison. The search method employed is a depth first search which starts at a designated node and proceeds through the link/node structure from node-to-node until every link and node in the entire structure is covered. The search proceeds from the first link of the starting node, to the next node. It them selects the next available link which is on the clockwise side of the link by which the node is entered. The search will keep advancing to nodes until all nodes have been covered. If a node has previously been covered by the search, the link to that node will be evaluated but the search will not move to the node. Whereas the depth first search method is employed, it should be noted that a breadth first search would work equally well. FIG. 17 shows step-by-step search progression through the character "E". The search is performed recursively. That is it is conducted by an algorithm that issues a function call to itself every time the search advances to a new node. The recursion advances in tandem with the "depth first" nature of the search process until all nodes have been covered. Comparisons are made at each level of recursion. Should failure be detected at any level, the algorithm stops work at that level and returns the value 0. Whenever the search can proceed no further at a particular level, either through completing examination of all links at that level or encountering a failure condition, the search "drops" to the previous level of recursion.

The search process compares images in two ways.
  by comparing pathways
  by comparing attributes Pathway comparison is achieved by charting a course through two images simultaneously expecting to find identical pathways. If it does not find identical pathways, then the search fails indicating that the images do not match. Concurrently, the search maintains a score of correlation between image attributes. Since it is possible for two different images to have identical pathways (the previously cited example of the characters "b" and "d"), the score becomes the only means of differentiating the images. Even if the pathway comparison fails, the score obtained by comparing attributes of portions of the image can be used as a basis of comparison.

Rather than specifying tolerances for each match, a correlation score is computed. The correlation score used is the statistical correlation coefficient "r" which represents the degree of linear correlation between the attributes of two images. The coefficient measures correlation and, as such, remains unaffected by scale or orientation of image attributes if all the relative relationships hold true. The score will range from 0 to 100 reflecting the use of integers to facilitate speed of execution. The score is computed for all of the measured items such as absolute or relative length of link, direction, depth or skew of curvature, etc. The search is performed as a recursive analysis which follows pathways through the structure. Failure can only occur if a variation is detected in the pathways. The score serves as the principal means of determining the likelihood of an accurate match. If the search is successful and the score is close to 100, the probability is quite high that they represent the same image. Depending on the nature of the image, different matching techniques may be employed. These include simple numeric comparisons as well as statistical techniques for curve matching. In either case, the matching exercise must be successful for all list items for recognition of an image to occur. Following is a detailed discussion of the key aspects of pathway comparison and scoring.

PATHWAY COMPARISON

Inherent in the link/node format are numerous pathways through the image structure. These pathways become a key way of comparing images during the search process. To perform this comparison, two searches are launched simultaneously: one in the test image, one in the reference image. As each search proceeds from node to node within their respective image structures, the nodes are marked with a unique sequential numeric designation indicating the "step" in the search at which the node is reached. For instance, the starting node will have a designation of 1, the next nodes reached 2, 3, etc. As the two searches each reach new nodes, the step indicators are compared. For the search to proceed, these indicators should either be equal to each other or equal to zero. If they are equal to each other, then similar pathways are being followed. If they are equal to 0, then neither node has been reached before and the searches should proceed before pathway determination can be made. For a pathway search to succeed, all steps for nodes must match as they are encountered in both searches. Failure of the pathway search does not necessarily indicate that images do not match, since extraneous links and nodes in one image may create extraneous pathways. Should the pathway search fail, attempts ar made to bypass links and nodes at the site of failure. Should these attempts fail, it will be determined that a match between structures cannot be found.

The starting node in the reference image is always designated as the node with the most links, although any node could be used. In the case of the test image, the node with the most links is also selected as the starting node. But if the comparison fails, another node is selected and the comparison repeated until the only remaining nodes have fewer links that the starting node of the reference image. Throughout this process, the starting node of the reference image remains constant. Thus, the maximum number of searches which conceivably could be performed in comparing two images would be equal to the number of nodes in the test image multiplied by the number of links in the starting node of the reference image.

The pathway search will fail when the step indicators of the selected nodes in the reference and target images do not match. Such failure may result from the following conditions:

1. The images are not the same
2. The Test image contains superfluous links
3. The Test image contains superfluous nodes Since the purpose of the pathway search is to determine whether two link/node structures represent the same image, it must be determined that failure of the search is not the result of items 2 or 3 above. Given the nature of scanned data both these conditions can be expected on a regular basis and both these conditions must be addressed by the search process.

CONTROLLING FOR SUPERFLUOUS LINKS

Often, valid nodes will have extra links. Since nodes are created at the intersection of lines, an overlapping of lines would still lead to the node's creation, but would also result in extra links. In a hand printed version of the character "A", there are 3 nodes where the potential for overextended lines exists. At these 3 nodes, there are actually 4 opportunities for overextended lines or 16 (2 to the 4th power) possible versions of the character with various overextended lines. The character "M" has 64 possible versions and an image more complex than a character can easily have thousands of possible versions due to overextended line junctures. Those distortions which are predictable such as overextended lines, are addressed through the inexact form of the image. However, the inexact form is transferred into a key only and not maintained as an actual image structure. Thus, when encountering predicated inexact forms as well as unpredicted forms, the search process is able to screen for superfluous links and find the reference image "inside" the test image.

As the parallel searches move through the reference and test images simultaneously, the number of links from each node in each image is compared. If the numbers match, the search proceeds with the comparison on a link-by-link basis. If the reference image has more nodes than the test image, the search fails, because the two cannot be the same image. If the test image has more nodes than the reference image, the search proceeds under the assumption that there may be superfluous links. The logic underlying this process is shown in Chart 18.

Conceptually, the system will calculate the number of excess links and establish this number as the maximum "allowable" failures which may occur from the nodes under study. That is, typically because of its recursive structure, if a search fails at any point, it returns a failure value up through its hierarchy of recursion. If this failure value returns to the highest level, the search is considered a failure. If this failure returns to a level where a failure allowance has been established, then the failure allowance is reduced by 1, but the search will proceed. If continued failures occur, the allowance will be reduced by 1 for each occurrence until it is equal to 0. A failure received at a level where the allowance is 0 will return a failure to the next higher level of recursion.

If the failure value is ultimately passed to the highest recursion level, the search is considered to be a failure.

CONTROLLING FOR SUPERFLUOUS NODES

Superfluous nodes are most likely to be artifacts of the scanning process. For instance, in curved characters such as "C", it is possible that scanning may create angles or corners in the curve. These would be interpreted as nodes. Also, environmental "noise" such as dust or scratches on the scanner may add both links and nodes to the test image. Whereas, much of this extraneous information can be discarded during the initial processing of the image, some may remain at the time the search is conducted and will require special handling. The logic for this aspect of the system is shown in Chart 19.

A superfluous node is detected by the pathway analysis when the node steps do not match and a failure value is returned. If the test image has more total nodes than the reference image, this difference is established as an overall failure allowance for superfluous nodes. Once a superfluous node allowance has been established, a failure value returned to a node will result in the bypassing of that node. Because testing and eliminating superfluous nodes can greatly expand search time and reduce search performance, certain criteria measuring the likelihood that a node is superfluous must be met. Superfluous nodes are likely to be:

Nodes with only 2 links since these nodes are generated by sharp changes in line direction which can be either an artifact of the scanning process or the method by which the image was produces (i.e. printing style);

Nodes connected to one or more nodes with single node connections since these nodes would likely be the product of environmental "noise".

When a failure value is returned to a node and either criterion for a superfluous node is met, the superfluous node will be bypassed. The bypass entails fusing an entry and exit link of the superfluous node to create a single link. If the superfluous node contains only two links, these will be fused into a single link which will have the summed length and curvature of the two combined links. If it contains more than two links, the entry link will be fused with the exit link which will create a curve most closely matched to the link in the reference image. FIG. 22 shows the fusion of 2 curves. When links are fused, the new combined link carries attributes of the 2 fused links. It will retain the original exit directions from its end connecting nodes, its length will be the sum of the combined links and the distance to key points along the link will be recalculated to reflect the combined values.

EXAMPLES OF SEARCH LOGIC

The ensuing paragraphs provide a step-by-step overview of the search process.

Figure 18:
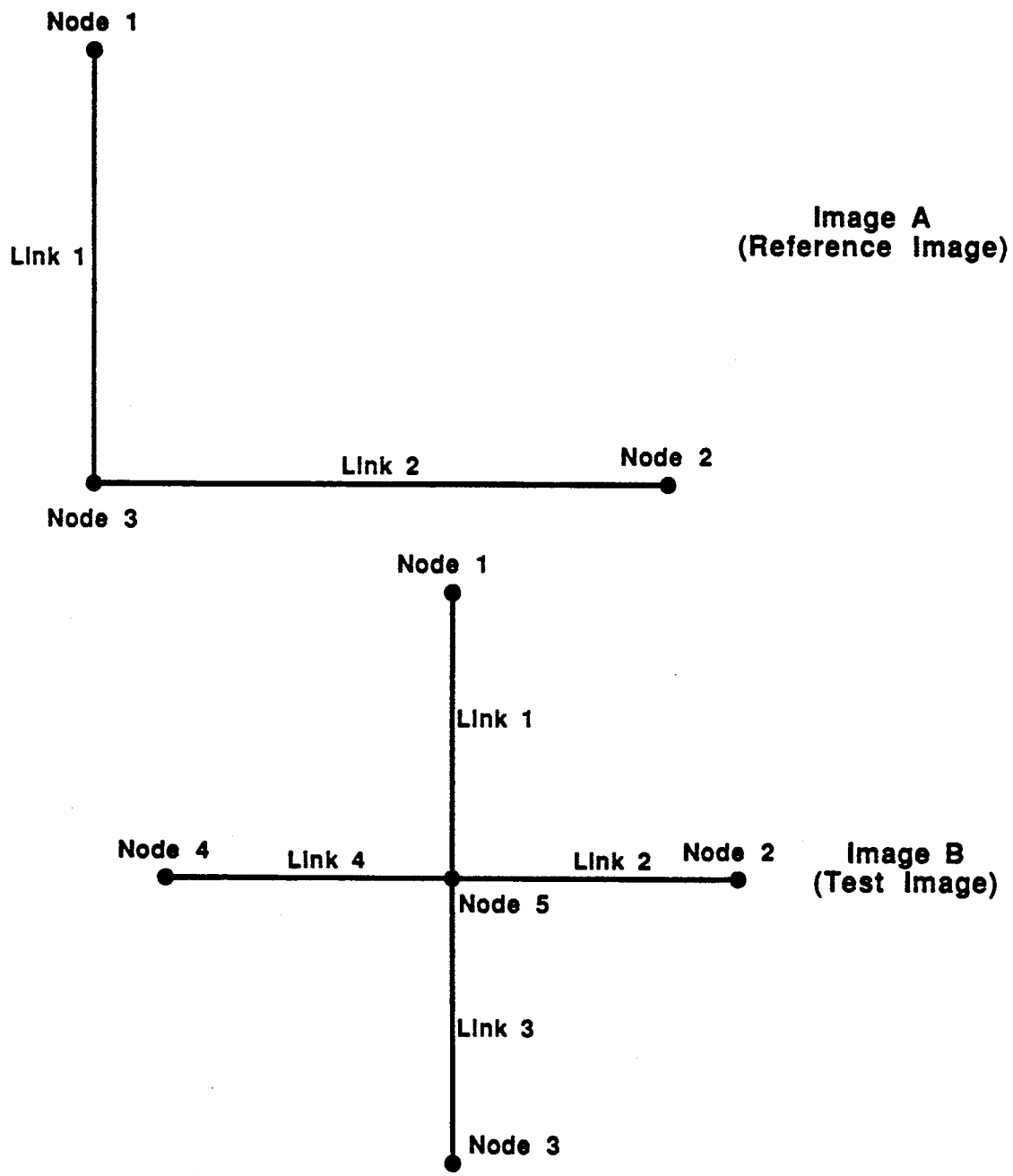
FIG. 18 shows two graphic forms, one a simple right angle as a reference image, and the other a cruciform as a test image for use in conjunction with the present invention.

FIG. 18 shows two graphic forms, one a simple right angle (Image A), the other a cruciform (Image B). For purposes of illustration, Image A is the reference image, Image B is the test image. That is, during the search process, the system will attempt to "find" Image A "inside" Image B. Since the images have an unequal amount of links and nodes, the screening process will not find a match by reference key. However, as shown in the following table, a comparison of reference series will indicate the possibility that a match could exist.

|         | Links |   |   |   |   |
|---------|-------|---|---|---|---|
|         | 4     | 3 | 2 | 1 | 0 |
| Image A | 0     | 0 | 1 | 2 | 0 |
| Image B | 1     | 0 | 0 | 4 | 0 |

Figure 19:
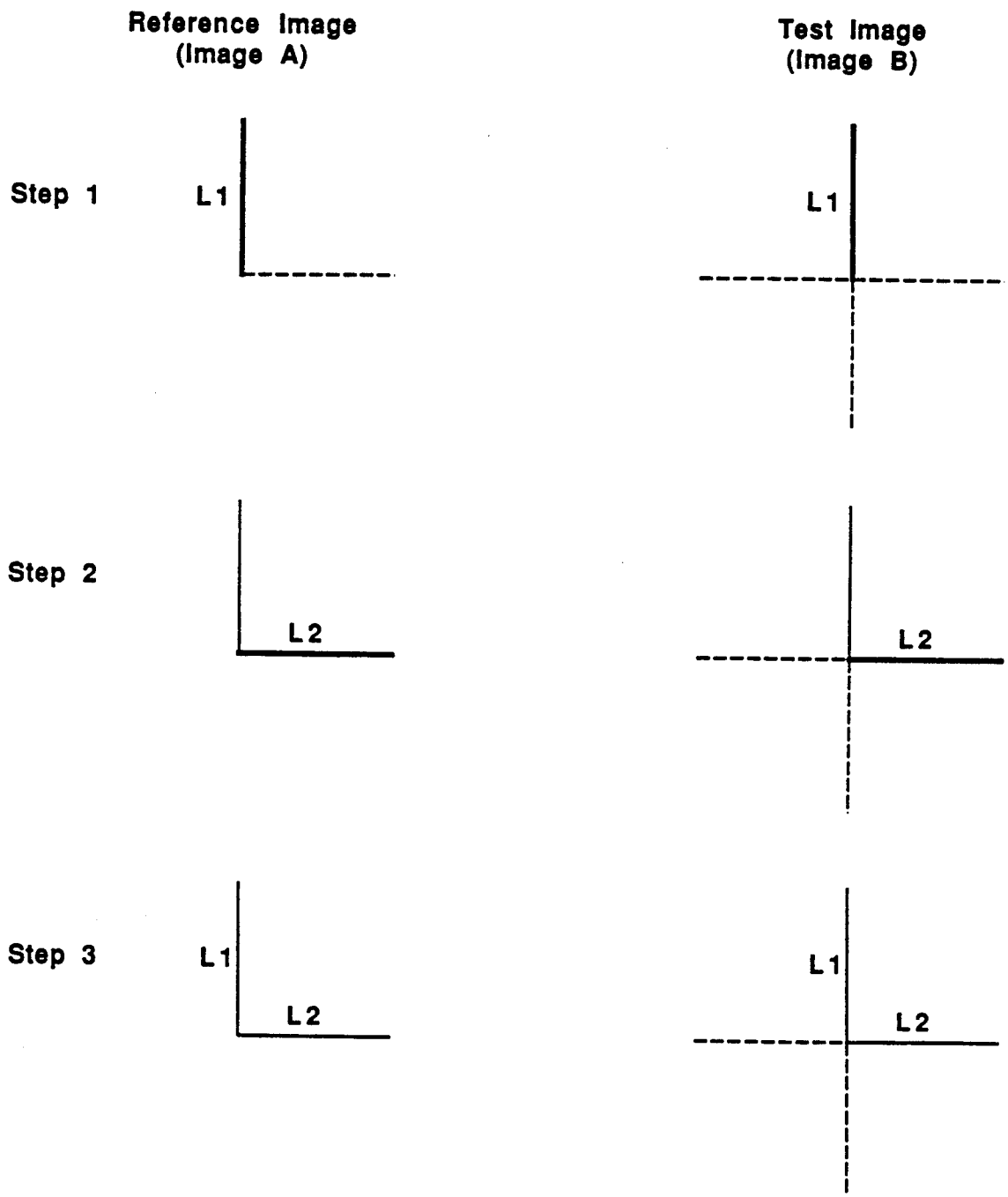
FIG. 19 shows the step-by-step progression of a search using the two graphic forms in FIG. 18, in accordance with the present invention.

For every value associated with Image A, there is a value associated with Image B that is in a slot of equal or greater value. That is the "1" in Image A's "2" slot can be matched with Image B's "1" in its "4" slot and Image A's "2" in its "1" slot is covered by Image B's "4" in its "1" slot. If a reverse comparison is attempted, it can be shown that Image B will not fit inside Image A because Image A has no value in its "4" slot and only a value of "2" in its "1" slot. Given that the reference series indicate that a match is possible, a search can be performed to determine whether the match actually exists. the step-by-step progression of this search is shown in FIG. 19.

If the nodes in both images are sorted by their cumulative reference series, they will be ranked as shown in the following tables.

| Image A |
|---------|

|       | Links |   |   |   |   |
|-------|-------|---|---|---|---|
| Nodes | 4     | 3 | 2 | 1 | 0 |
| 3     | 0     | 0 | 1 | 2 | 0 |
| 1     | 0     | 0 | 0 | 1 | 0 |
| 2     | 0     | 0 | 0 | 1 | 0 |
| Image B |     |   |   |   |   |
| 5     | 4     | 0 | 0 | 4 | 0 |
| 1     | 0     | 0 | 0 | 1 | 0 |
| 2     | 0     | 0 | 0 | 1 | 0 |
| 3     | 0     | 0 | 0 | 1 | 0 |
| 4     | 0     | 0 | 0 | 1 | 0 |

Given this ranking, Node 3 becomes the "head node" for Image A and Node 5 becomes the head node for Image B. The search can now be performed as follows:

Image A-Node 2 is compared to Image B-Node 5. From each node, the system selects the link with the highest "clockface" position (i.e. 12:00). For Image A-Node 2, this is Link 1 and for Image B-Node 5, this is also Link 1. For both images, the system follows Link 1 from its source to its destination while concurrently compiling the basic tabulations which will be used to compute the r-square-100 statistic. The search now has moved to Node 1 in Image A and Node 1 in Image B. Since this is a terminal node in both images, the search returns to Image A-Node 3 and Image B-Node 5, then proceeds to the next link in a clockwise direction. In both images, this is Link 2. The system then follows this link for both images and arrives at Image A-Node 2 and Image B-Node 2. Again, the basic tabulations underlying the r-square-100 statistic are performed. Since this is also a terminal link, the search returns again to Image A-Node 3 and Image B-Node 5. Since Image A (the reference Image) has no more links, the search stops and indicates a successful match. The sequence by which links are compared is as follows:

Image A 1, 2 (Success)
Image B 1, 2 (Success)

Figure 21:
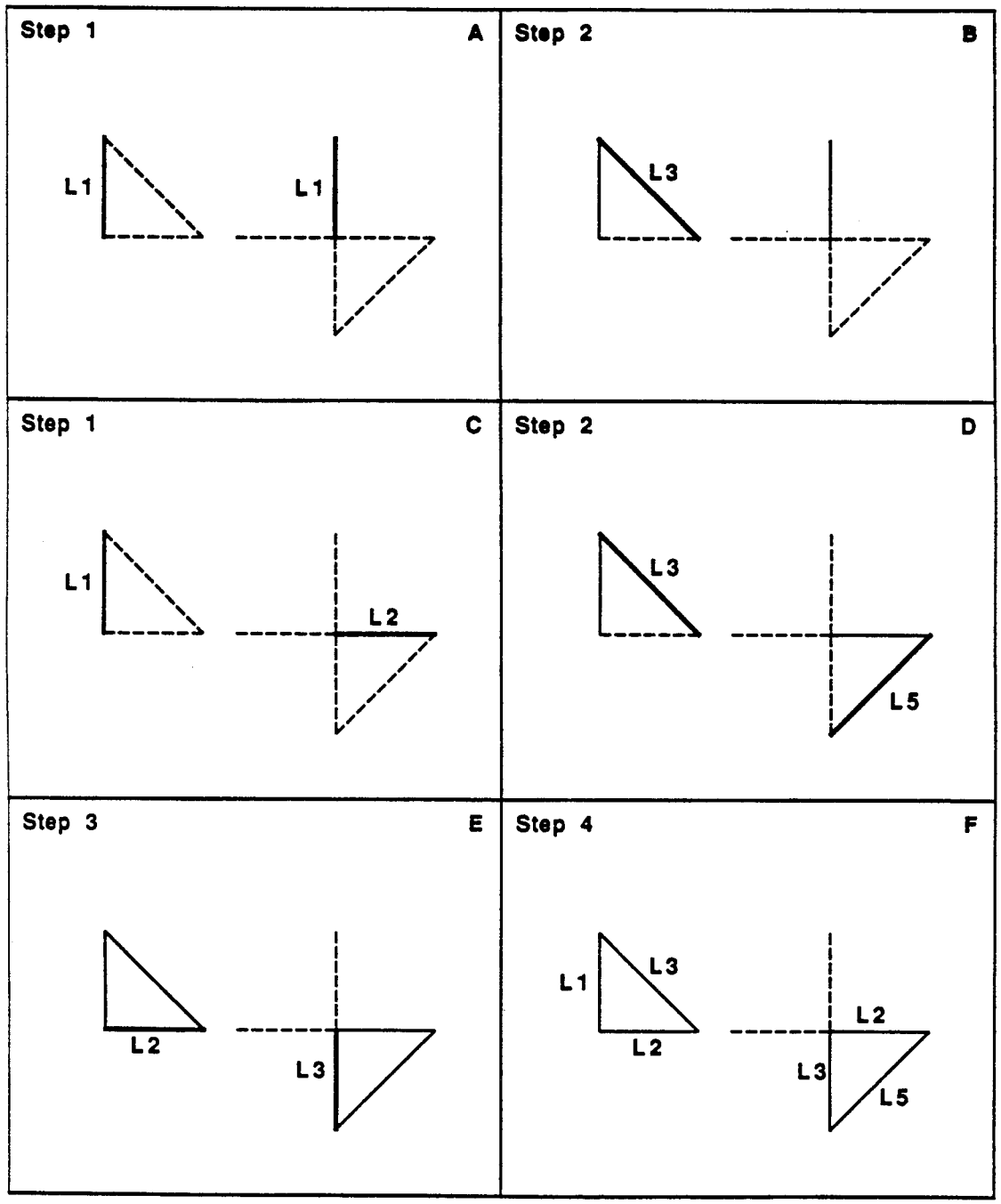
FIG. 21 shows the step-by-step progression of a search using the modified graphic forms in FIG. 20 in accordance with the present invention.
Figure 23:
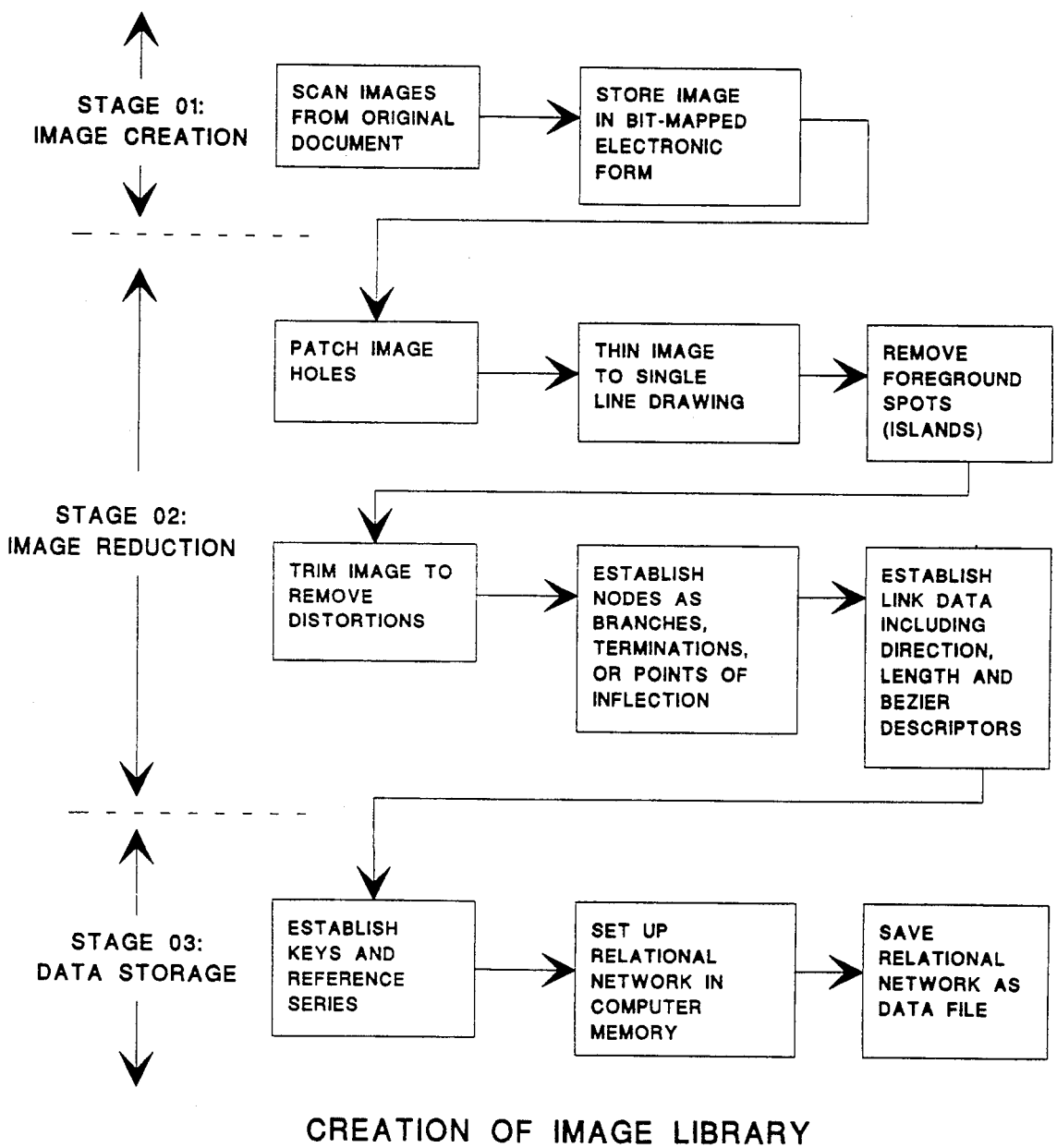
FIG. 23 shows Chart 11 illustrating the steps involved in setting up the reference library in accordance with the present invention.
Figure 24:
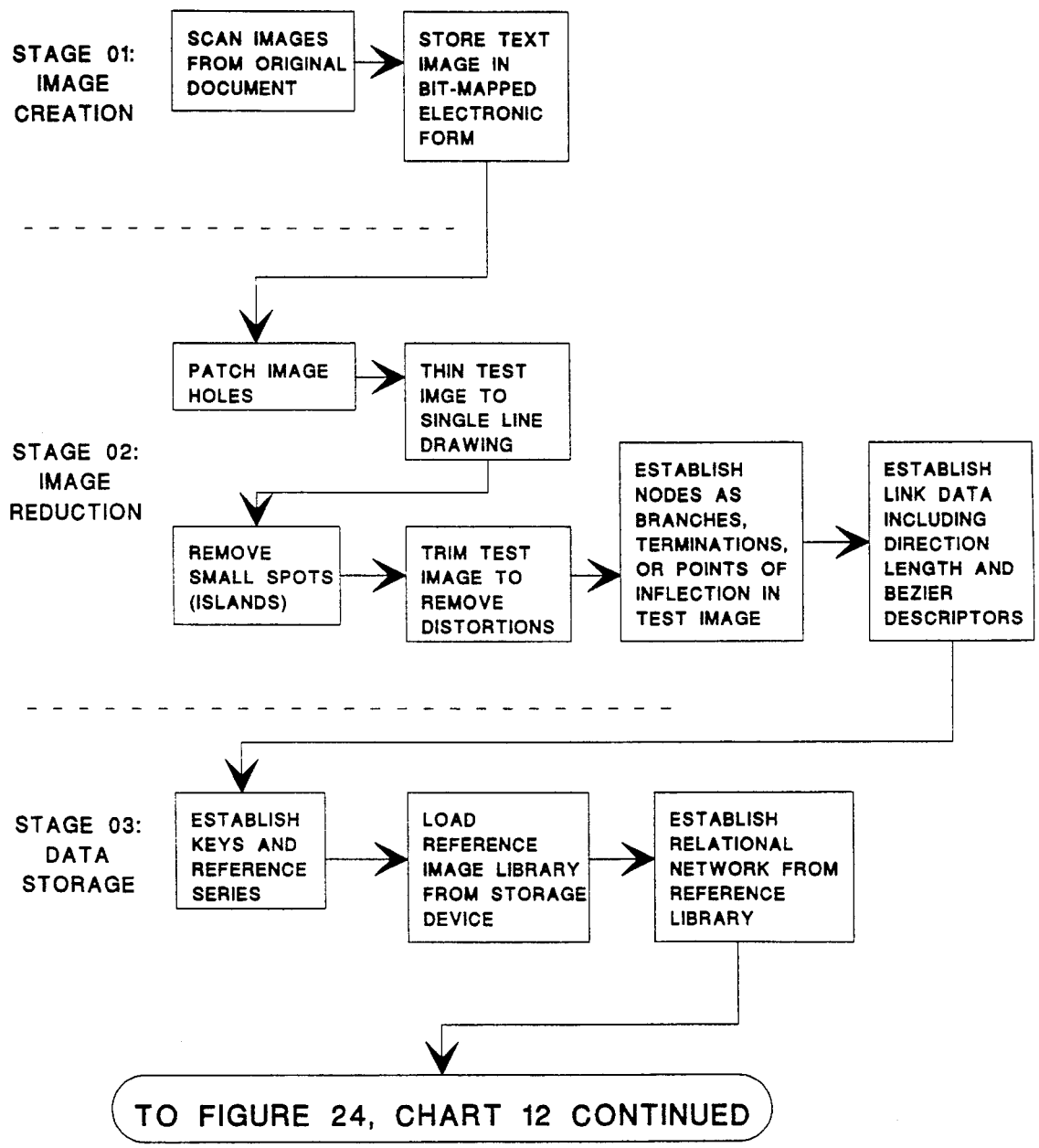
FIG. 24 shows Chart 12 illustrating the full image recognition process appending the recognition stages to the image reduction and storage steps in accordance with the present invention.
Figure 25:
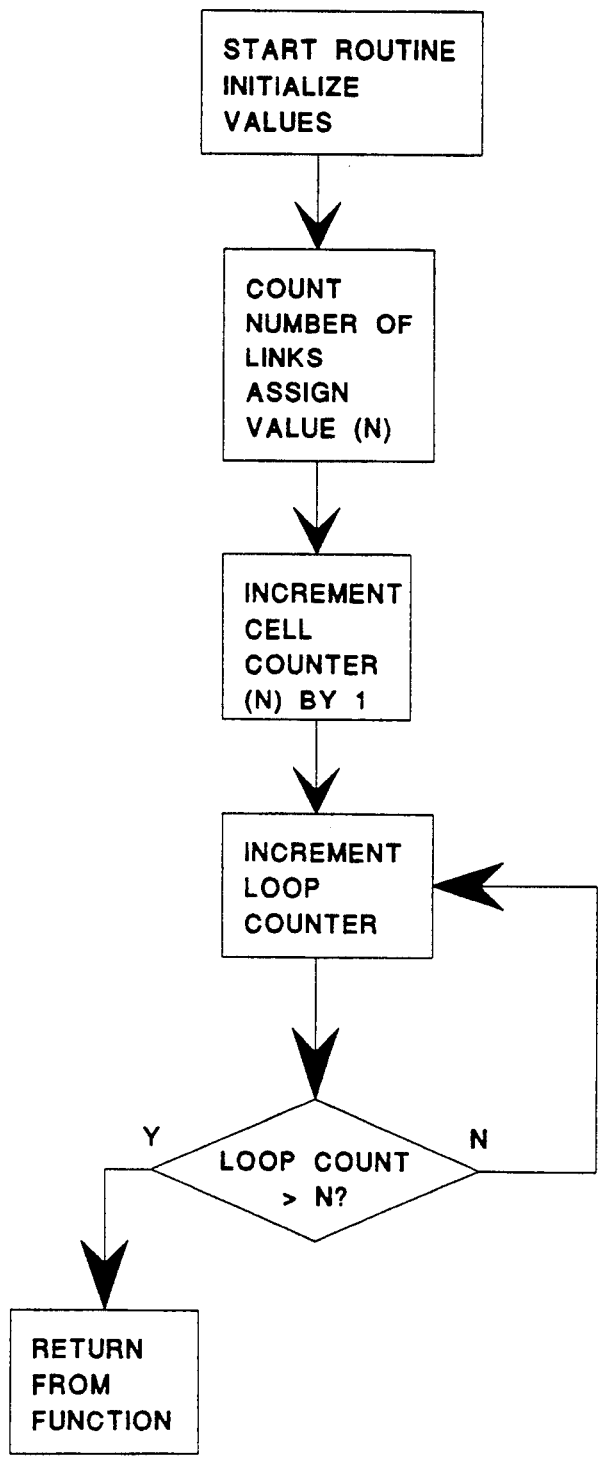
FIG. 25 shows Chart 13 illustrating the logic of the reference series in accordance with FIG. 12 embodying the present invention.
Figure 26:
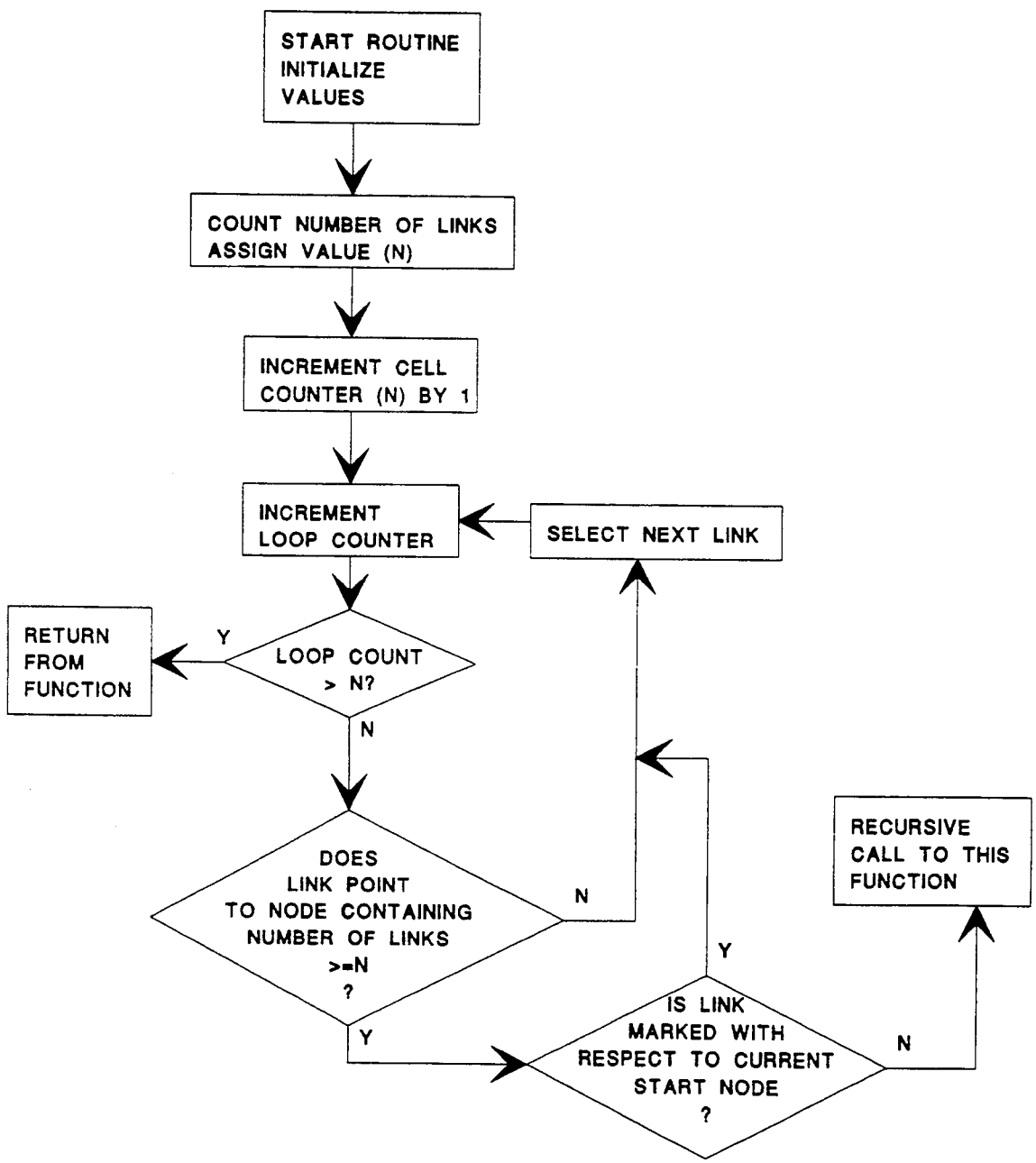
FIG. 26 shows Chart 14 illustrating the logic for building the cumulative reference series in accordance with FIG. 13 embodying the present invention.
Figure 27:
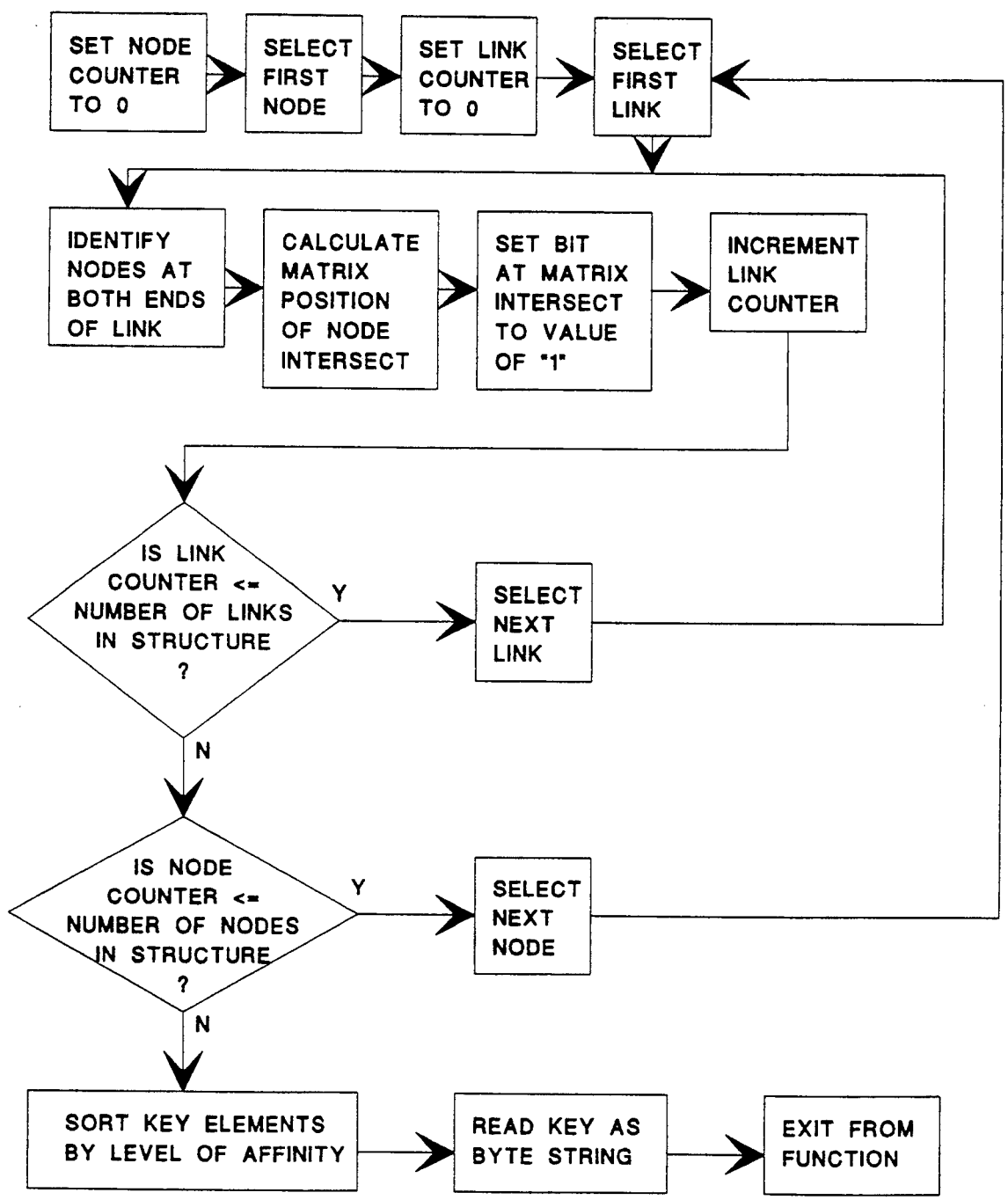
FIG. 27 shows Chart 15 illustrating the logic of key generation for both exact and inexact keys in accordance with the present invention.
Figure 28:
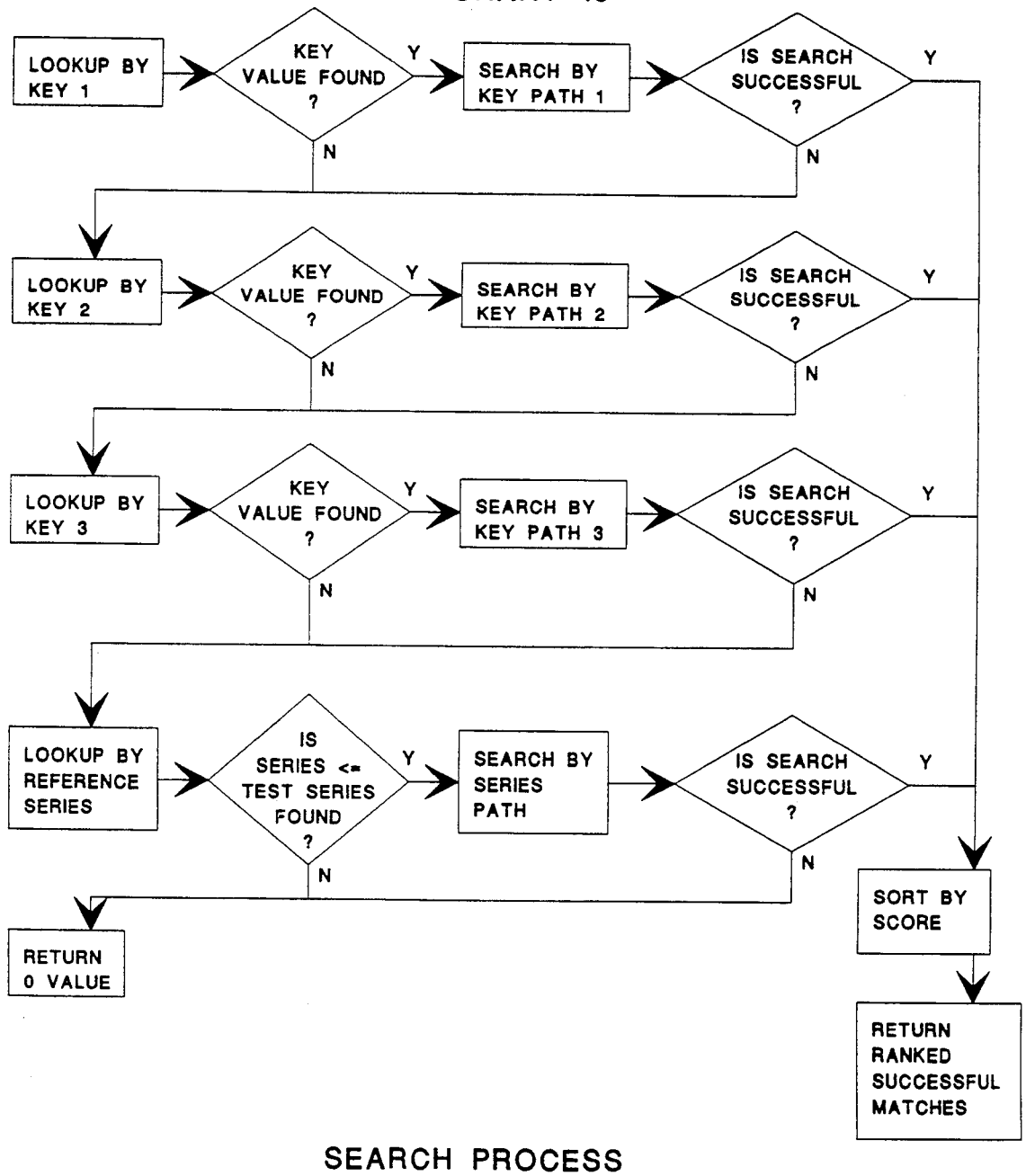
FIG. 28 shows Chart 16 illustrating the logic of screening and searching in accordance with the present invention.
Figure 29:
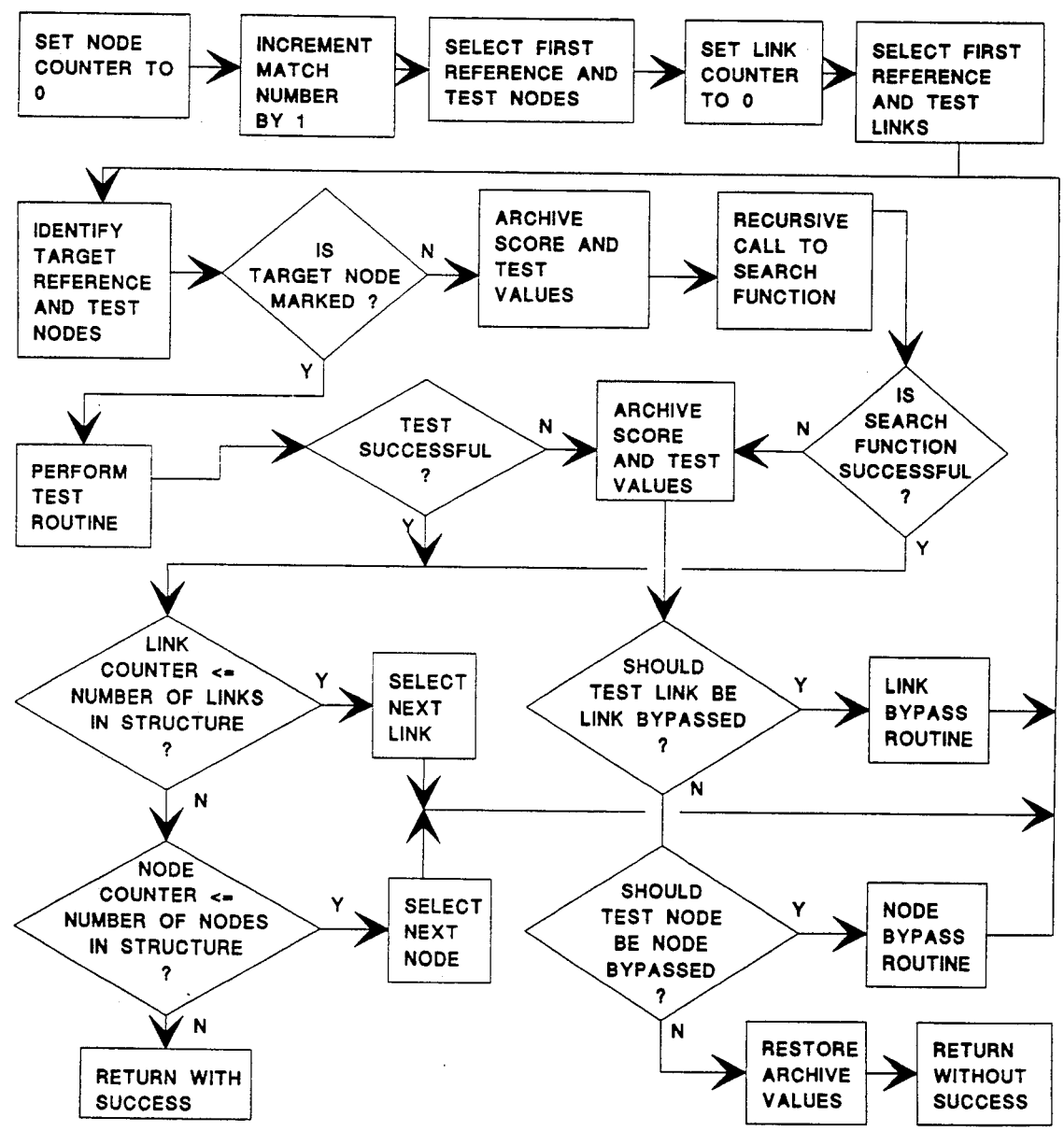
FIG. 29 shows Chart 17 illustrates the logic of searching of searching a library of references in accordance with the present invention.
Figure 30:
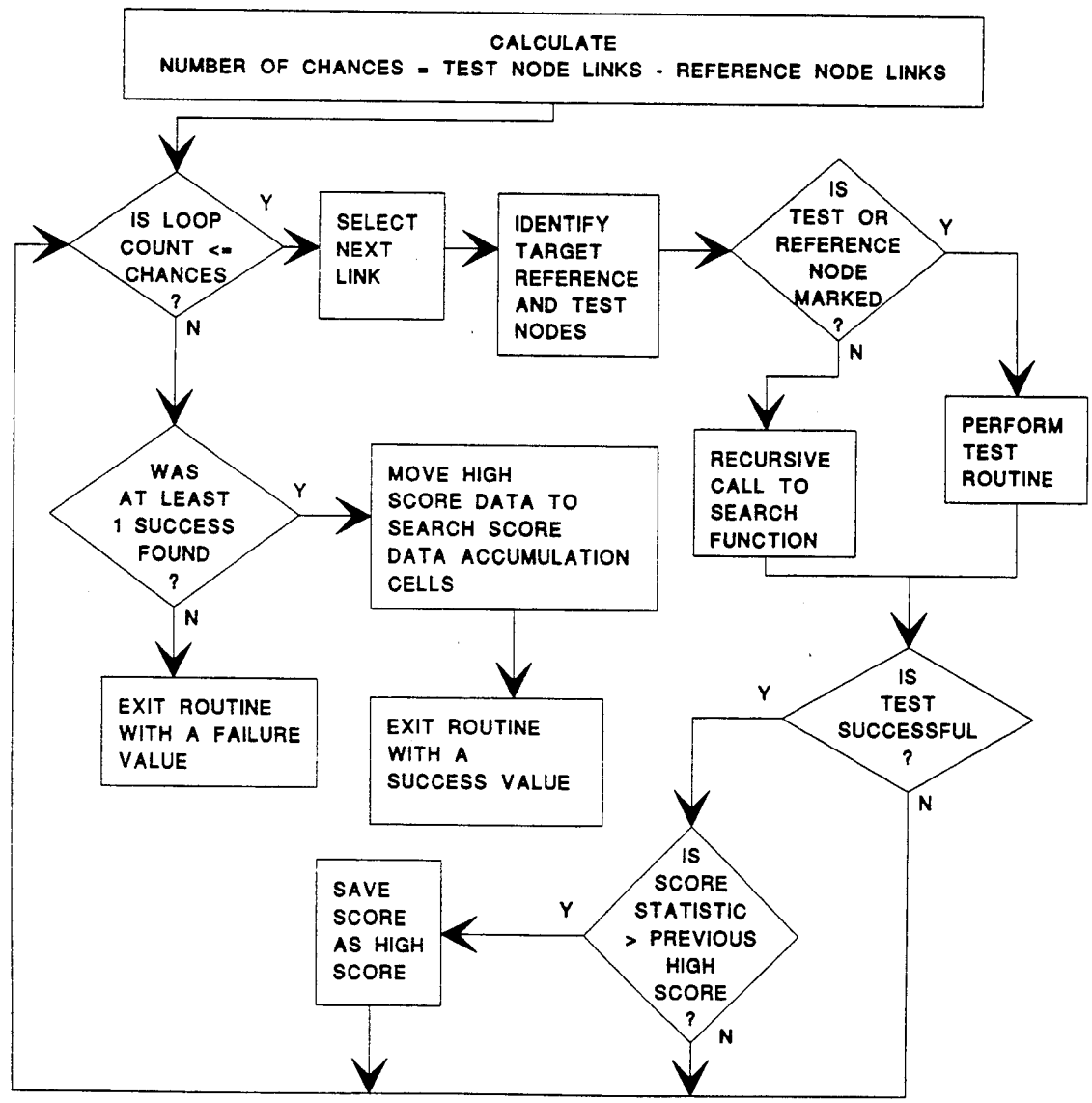
FIG. 30 shows Chart 18 illustrating the logic underlying the process for controlling superfluous links in pathway comparison in accordance with the present invention.
Figure 31:
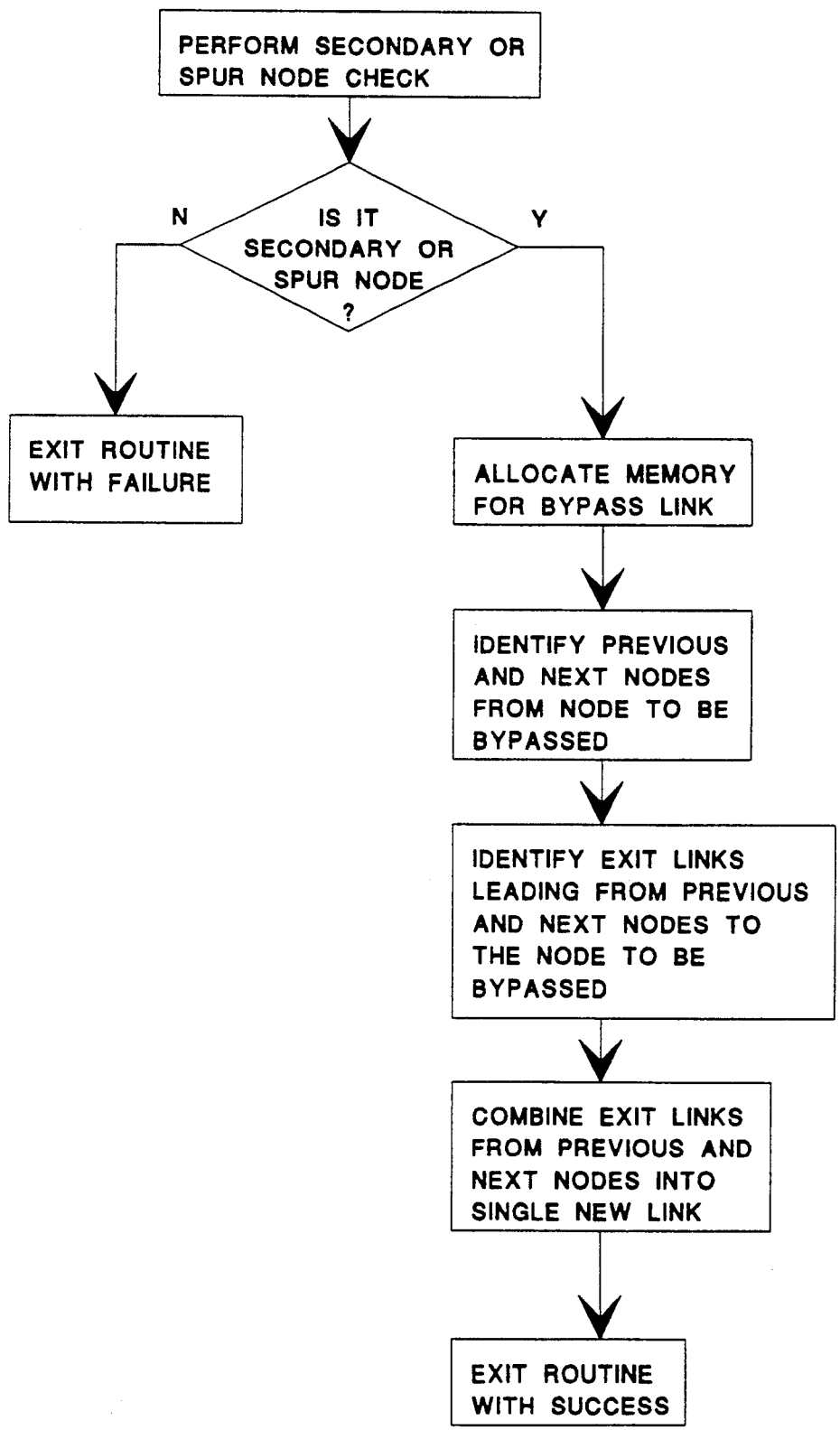
FIG. 31 shows Chart 19 illustrating the logic underlying the process for controlling superfluous nodes in pathway comparison in accordance with the present invention.
Figure 32:
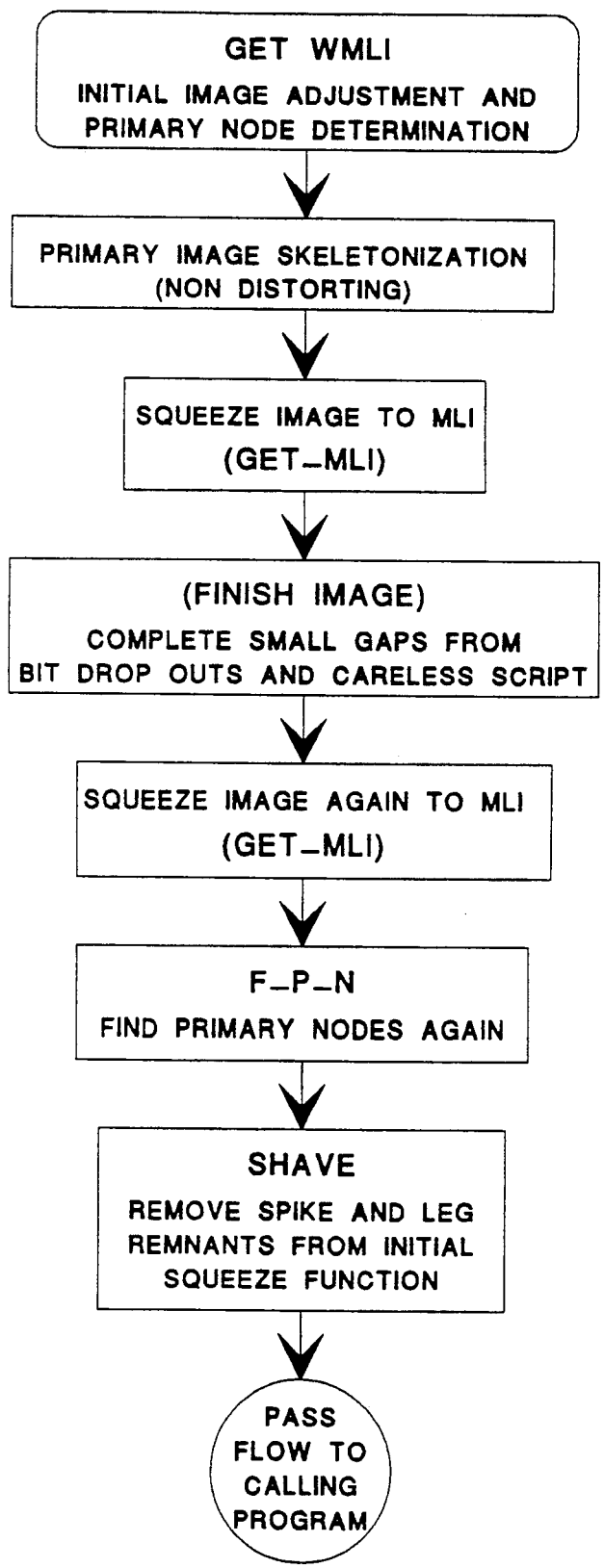
FIG. 32 shows Chart 2 illustrating the process used to obtain the Working Minimum Line Image (WMLI) in accordance with the present invention.
Figure 33:
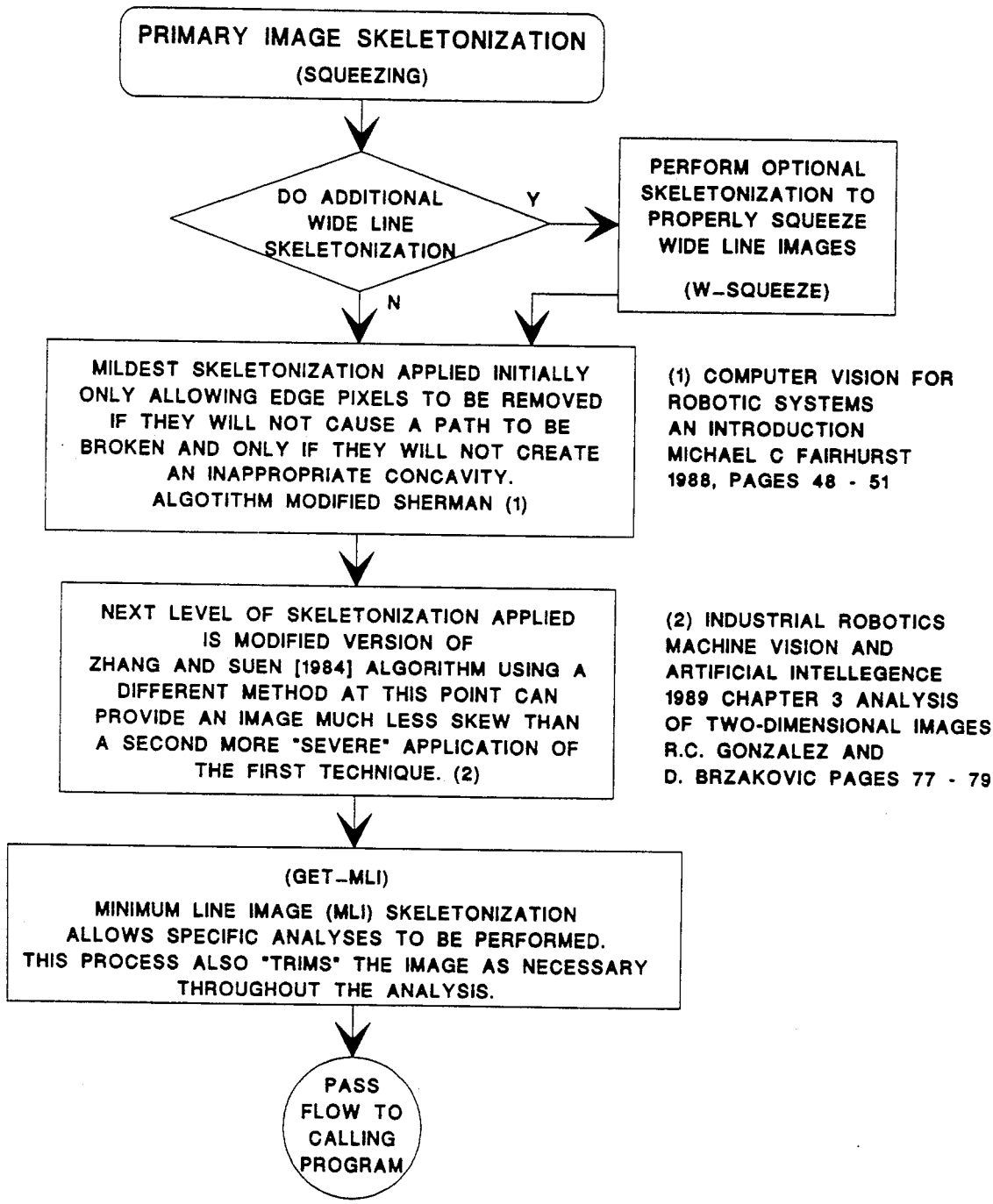
FIG. 33 shows Chart 3 illustrating an algorithm used to skeletonize wide lined images in accordance with the present invention.
Figure 34:
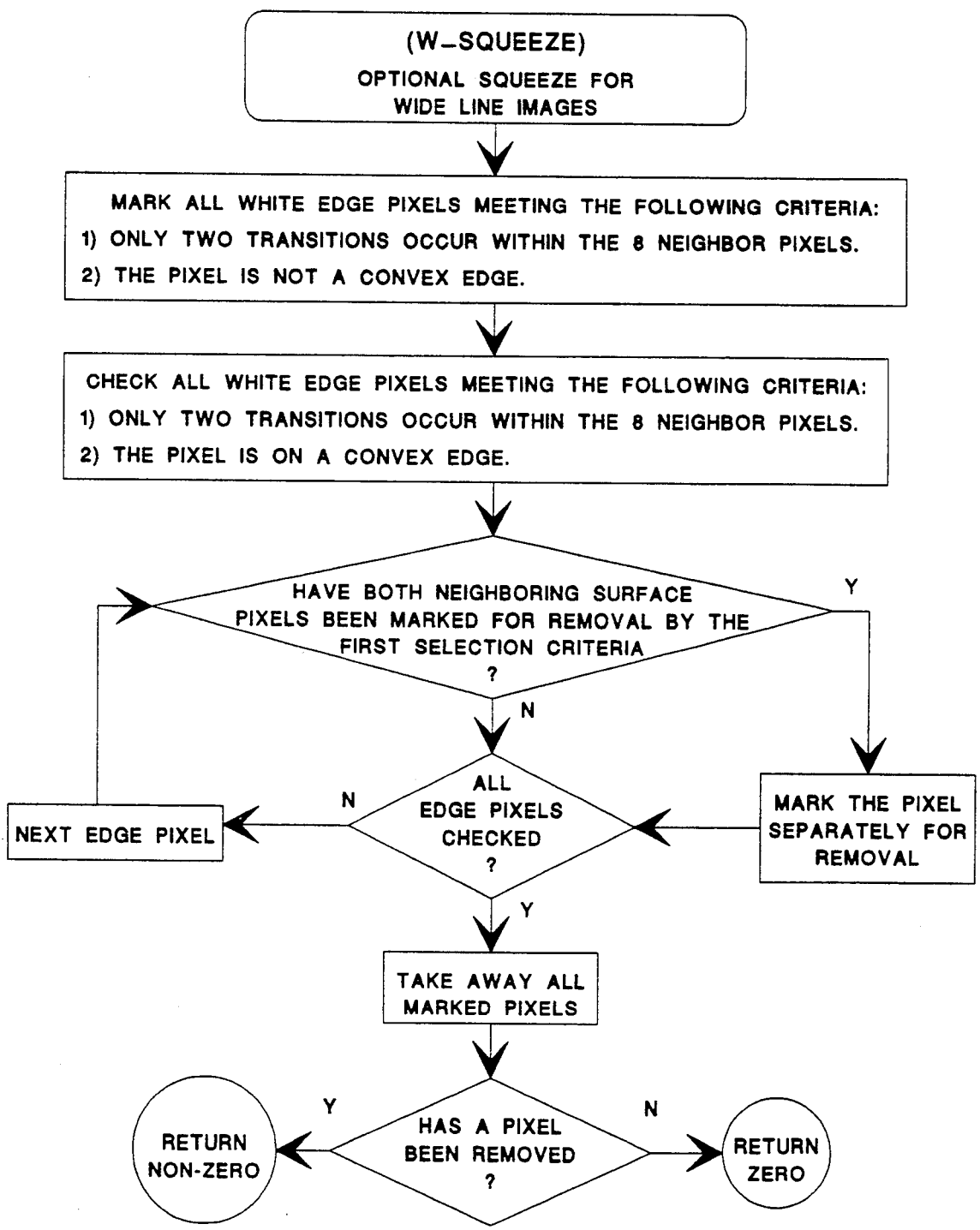
FIG. 34 shows Chart 4 illustrating a prior art algorithm used in obtaining the skeleton of an image.
Figure 35:
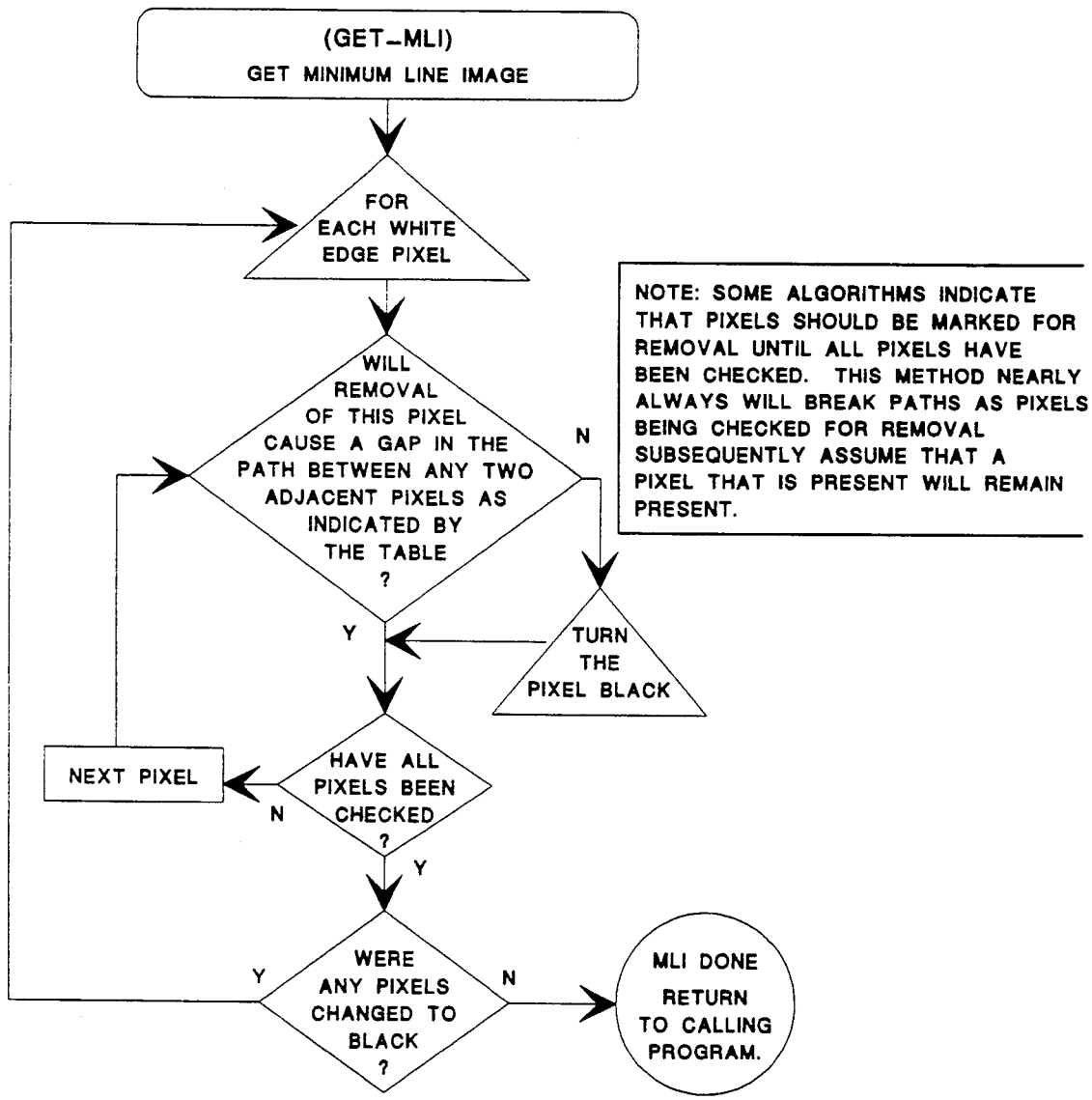
FIG. 35 shows Chart 5 illustrating the final squeeze method for producing the minimum line image in accordance with the present invention.
Figure 36A:
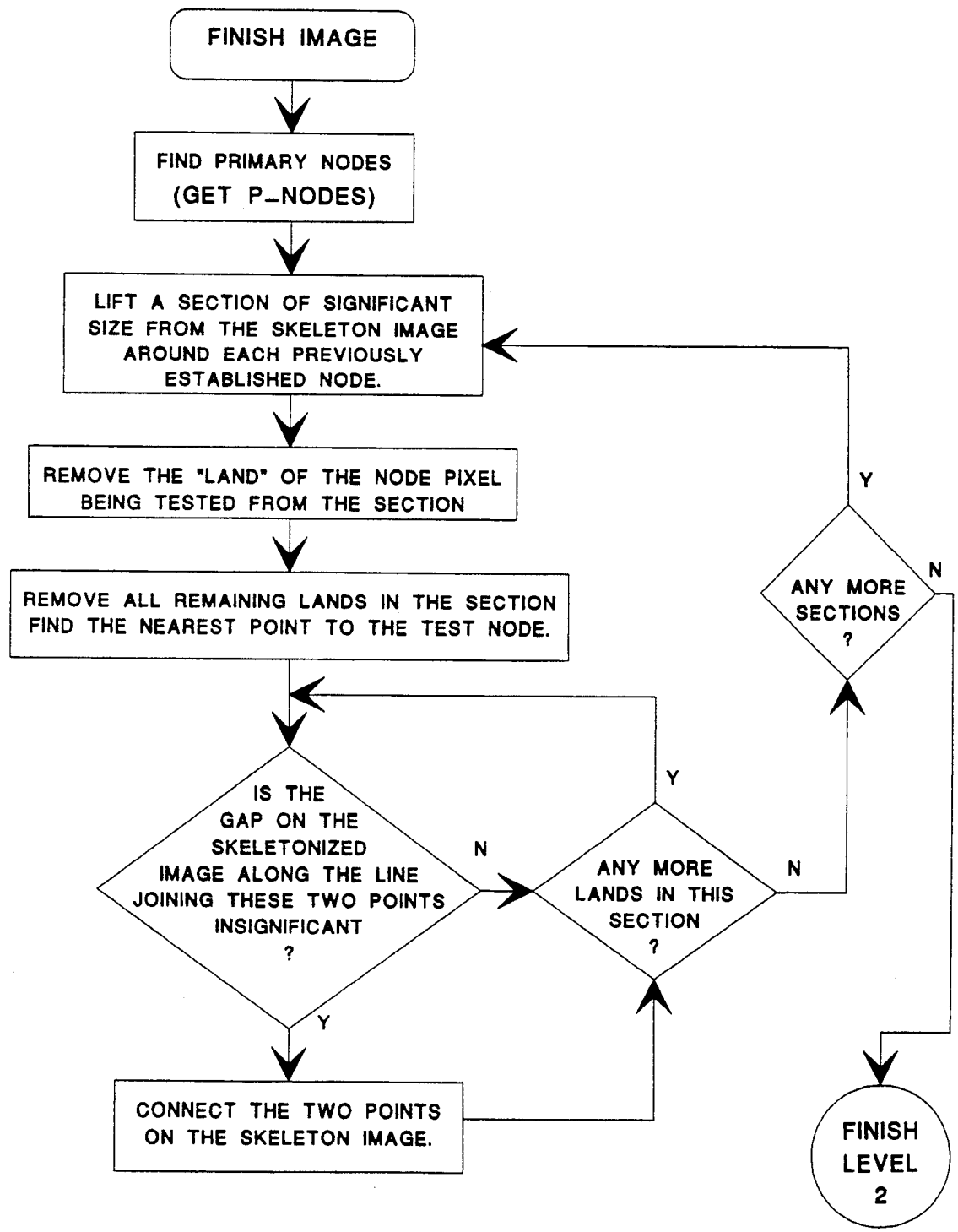
FIG. 36A and 36B show Chart 6 illustrating the method for finishing the image to eliminate errors before finding primary and tertiary nodes in accordance with the present invention.
Figure 36B:
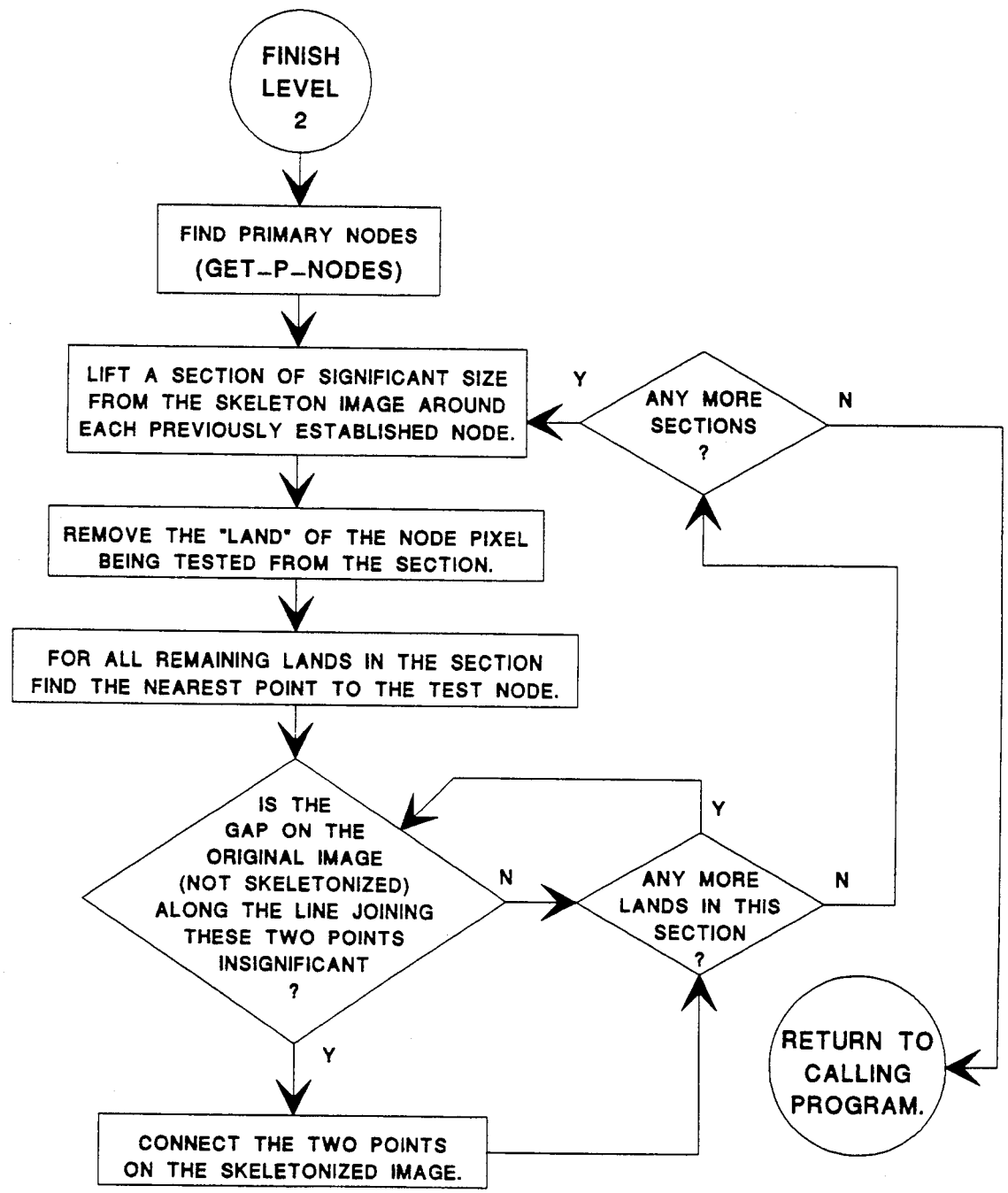
Figure 37:
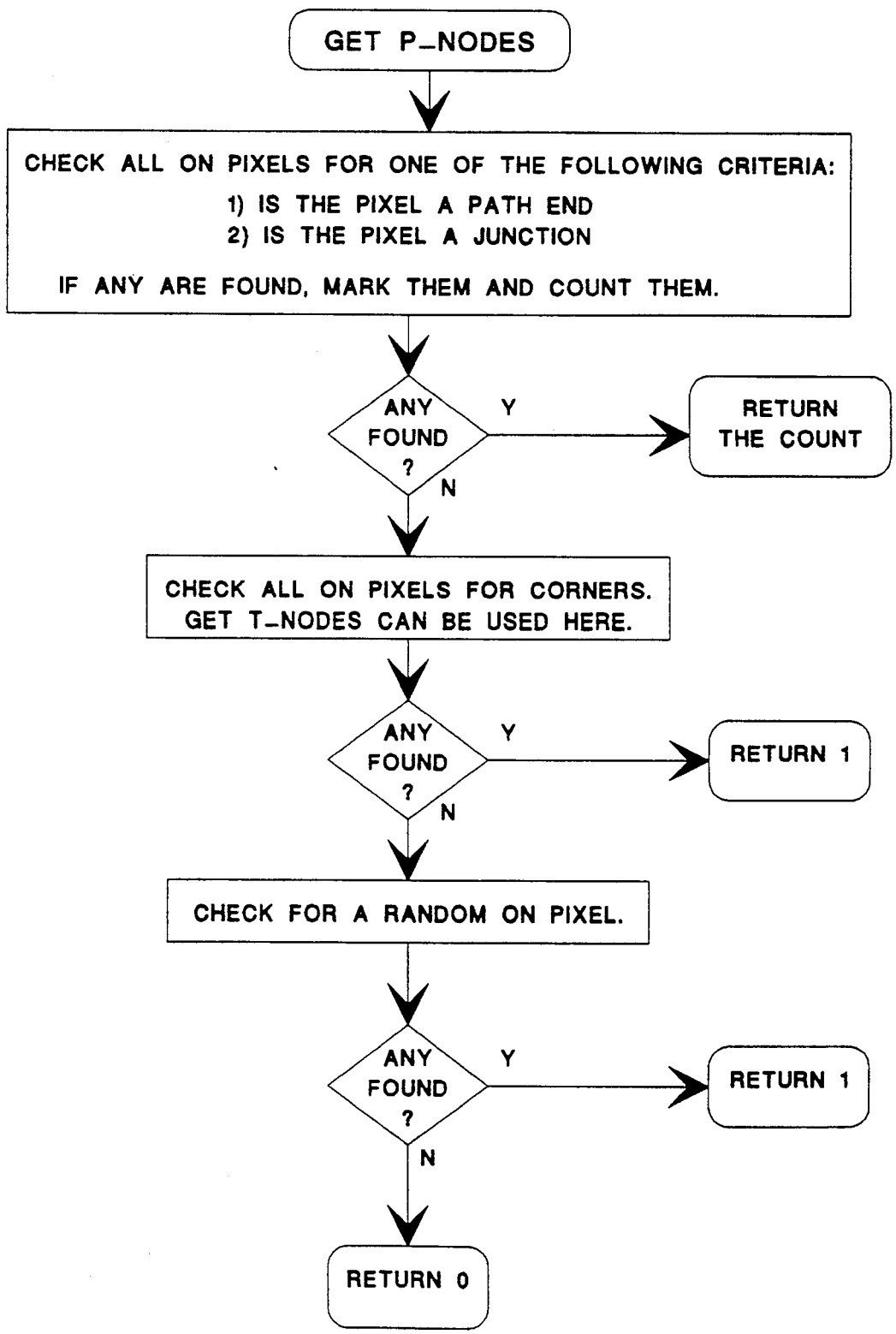
FIG. 37 shows Chart 7 illustrating the method of finding primary nodes in accordance with the present invention.
Figure 38:
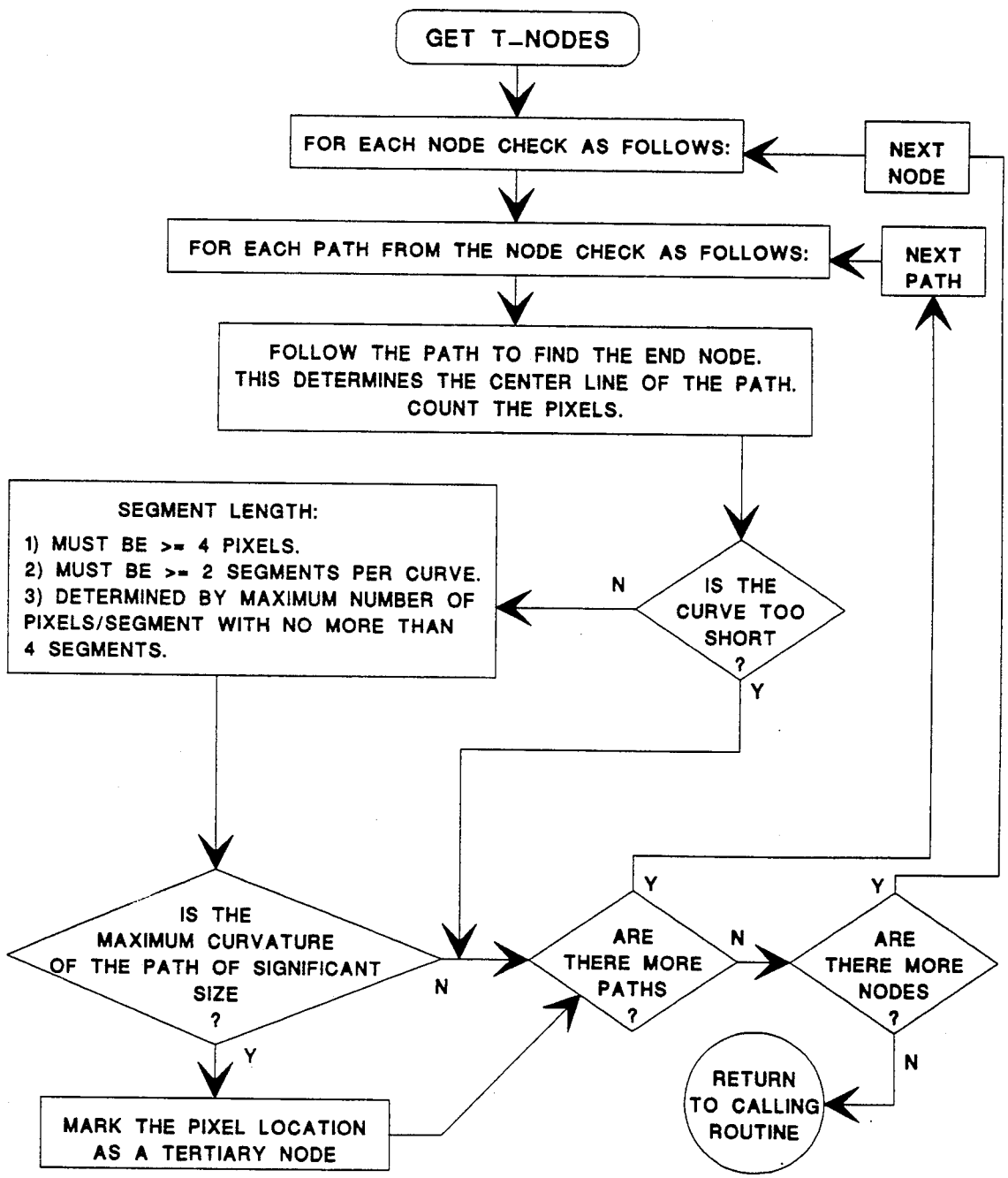
FIG. 38 shows Chart 8 illustrating the method of finding tertiary nodes in accordance with the present invention.
Figure 39:
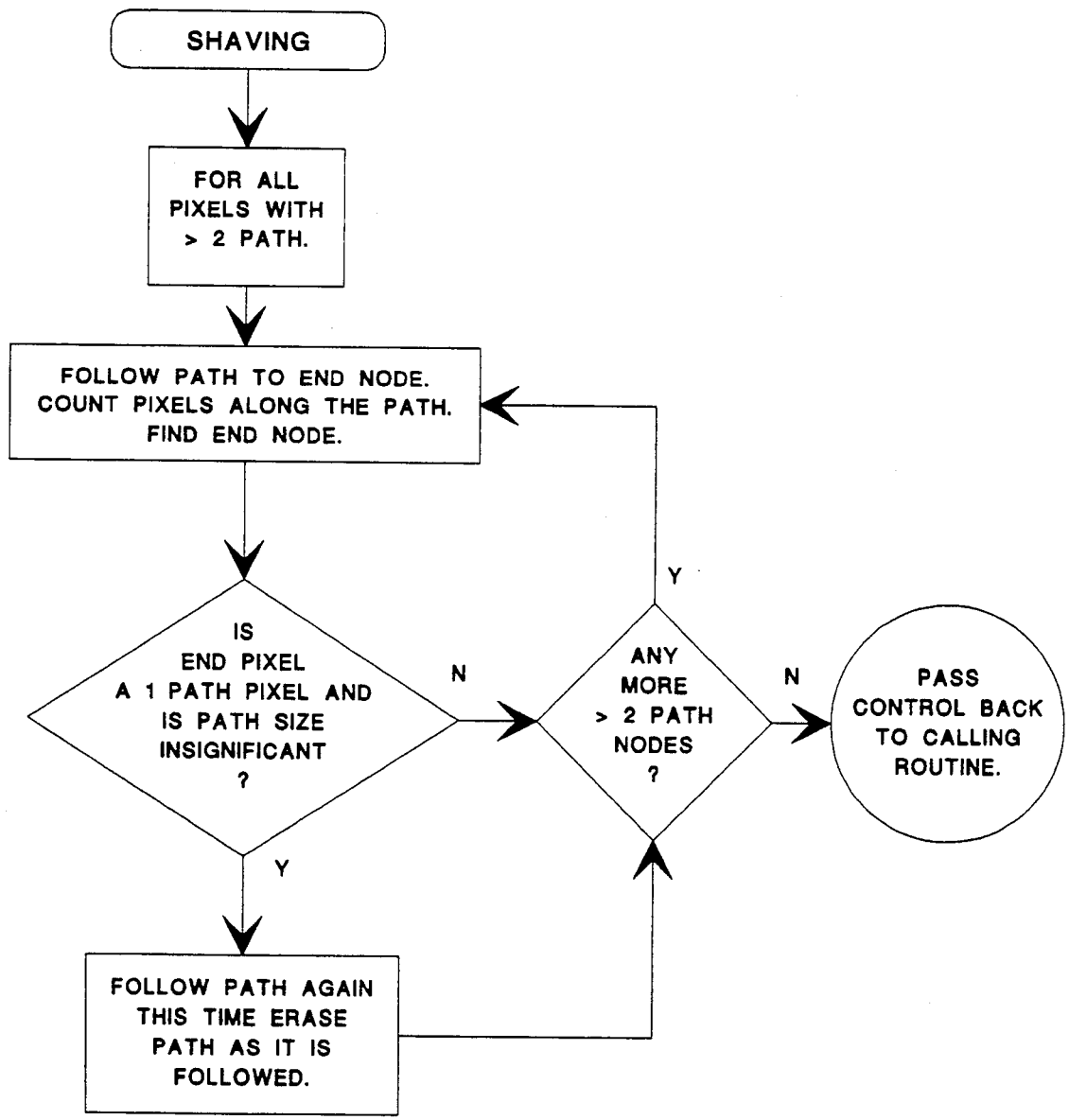
FIG. 39 shows Chart 9 illustrating the image shaving process in accordance with the present invention.
Figure 40:
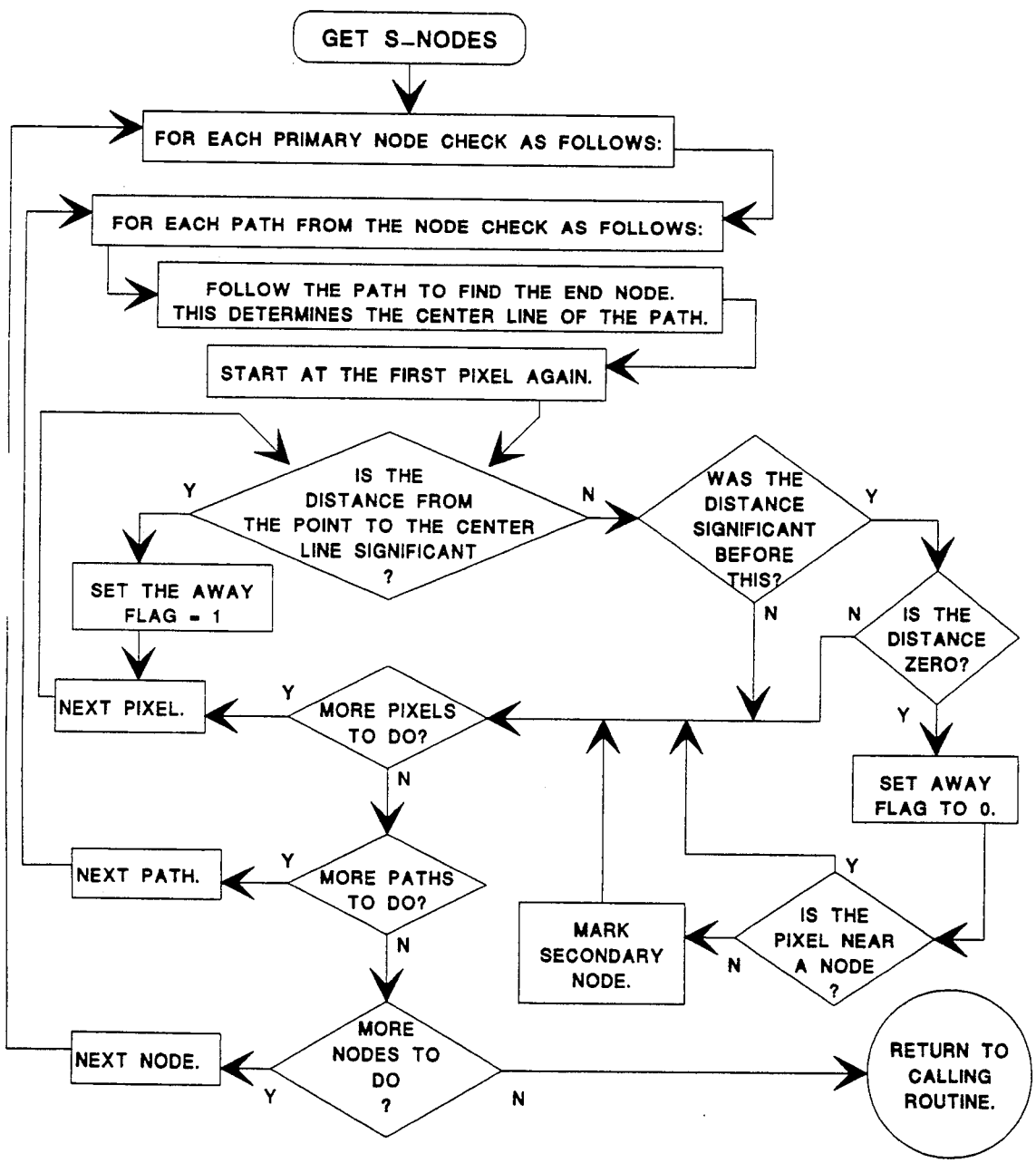
FIG. 40 shows Chart 10 illustrating the process for finding secondary nodes in accordance with the present invention.

FIG. 20 shows both images modified somewhat to contain triangle at different orientations. This will create a more complex form of search as follows:

In this situation, the search would commence at Image A-Node 3 and Image B-Node 5, then proceed, in both cases, along Link 1 to Image A-Node 1 and Image B-Node 1. Since Image B-Node 1 is a terminal node and Image A-Node 1 is not, the search would fail at this point. However, since Image B-Node 5 has 2 more links than Image A-Node 3, the search would continue under the assumption that Image B-Link 1 is a superfluous link. Thus, the search would move to the next clockwise link on both Image A-Node 3 and Image B Node 5. This search is shown in FIG. 21. In both cases, this is Link 2. The search will then follow Link 2 in both images and arrive at Image A-Node 2 and Image B-Node 2. Then the search will move clockwise around both these nodes to the next available links which are Image A-Link 3 and Image B-Link 5 arriving at the following nodes: Image A-Node 2 and Image B-Node 3. The search will, again, move around each node in a clockwise direction to the next available links which are Image A-Link 2 and Image B-Link 3. Following these links will lead to Image A-Node 3 and Image B-Node 5. Since both these nodes are the starting nodes for the search and, thus, both have a step value of 1, the search will stop with a successful match. For this search, links are compared in the following order.

Image A 1, 3 (Failure), 1, 3, 2 (Success)

Image B 1 (Failure), 2, 5, 3 (Success)

SCORE

The score measures the degree to which character attributes are correlated.

Two methods are used. The first is based upon the standard coefficient of correlation "r". The actual value used, which for reference purposes is labelled "r-squared-100" is the square of "r" which is then multiplied by 100, since this value can be computed without using floating point arithmetic. Statistically, whereas "r" represents linear correlation, the square of "r" represents the amount of variation in a variable attributable to its correlation to another variable. For use in image comparison, either "r" or its square serves as a useful correlation statistic. The assumption underlying character attribute comparison is that a linear correlation exists between the attributes of 2 versions of the same image. Since correlation is sensitive to "relative" differences, the correlation statistic is not dependent upon size or orientation of the two compared images.

The specific calculations used to derive the correlation statistic "r-squared-100" are presented as follows:

$$r\text{-squared-100} = \frac{(n(\Sigma xY) - (\Sigma x)(\Sigma Y))^2 \times 100}{(n(\Sigma x^2) - (\Sigma x)^2) \times (h(\Sigma Y^2) - (\Sigma Y)^2}$$

The r-squared-100 statistic is based on tabulations performed throughout the search process. For instance, as image attributes are compared, assuming that an attribute of the reference image is designated "x" and the test image "y" the following are values are summed at each search juncture:

x
y
x squared
y squared
x-y
x squared—y squared
count

Using these summed values, the r-square-100 statistic can be computed at any time.

The second method uses a weighted tabulation of successful matches. That is, the same attributes used for the "r" statistical correlation are used but rather than summing this information for use in a statistical formula, the system tabulates the number of success and failures resulting from the feature-by-feature comparison.

Success and failure are determined by comparing the variations in feature attributes with pre-defined criteria. For example it may be determined that the exit angles of any two links under comparison must be within 30 degrees for the feature match to be successful. Thus, if the difference were greater than the 30 degree criterion, the comparison would fail. As the feature comparisons are tabulated, they are also weighted. Weighting is specific to each image in the reference library since the significance of certain features such as exit angle or length of link will vary by image. For example, the curved tail in the "g" distinguishes it from a "9". The lengths of the stems distinguishes the "b" from "p".

Maintaining either statistic when eliminating superfluous links and node requires special logic. It is important to note that often the removal of superfluous links from a particular node cannot be accomplished by eliminating those links which lead to a returned failure value through pathway analysis. Sometimes, even superfluous paths may lead to the same destination as valid paths, and thus the pathway analysis feature of the search will not return a 0 value. Thus, the r-squared-100 statistic becomes an important means for selecting valid links and eliminating superfluous ones. However, when such an analysis is performed, it is necessary to store the accumulated values at each level of recursion. These values are then passed to subsequent levels of recursion. Thus, since superfluous links can often only be detected through a continuing search process, it is necessary to capture a "snapshot" of system status before proceeding. Key pieces of system information which be maintained include all summary values used in computing the statistics as well as the step indicator for all nodes. Summary information is maintained for:

length of link
relative exit orientation from node
absolute exit direction from node
direction from node to node.

The length of link value is measured as the linear distance from one end node to the other. The relative exit orientation from a node is the circumference measurement between links around the node. The absolute exit orientation is the direction relative to an assumed orientation with a value of zero assigned to the direction of a vector pointing straight up. The key points on the link represent a variable number of points (depending on the length of the link) which are correlated. The value of these points are generated using the Bezier values for a link. If 2 links have orientation in the same direction, a positive statistic between 0 and 100 will be produced. If one link is a line, a correlation of zero will result. If the lines curve in different directions, a negative result will be produced.

A separate statistic is maintained for each of these. The final statistic represents a weighted average of separate values. Weighting can be varied and depends upon application. The search process returns 3 values:

Success/Failure Indicator,
Score Value, and
Link Ratio

A validity check range can be established for each of these values. That is, should a variation or mismatch in features be encountered that exceeds a specified value, the entire search terminates and the comparison is considered failed. The Success/Failure indicator will have a value of either 1 or 0 indicating a successful or failed search. This value will be 1 if the pathway search has been successful. That is, both the reference and test image must have identical paths. Even if the test image is much larger than the reference image, if all the pathways in the reference image exist in the test image, the match is considered successful. The Score Value measures the correlation of image attributes and, thus, provides the means for distinguishing among images with identical pathways, but which are different images. The Score Value is actually the r-squared-100 statistic compiled for the complete comparison of all image attributes. The Link Ratio is the ratio of the number of links in the reference image to the number of links in the test image. This value indicates what portion of the test image is actually matched to the reference image. The Link Ratio is used to control for simple reference images such as the letter "I" or number "1" which will very likely be found in pathway and score evaluation.

STAGE 06: INTERPRETATION

The search process returns a 2 dimensional array with 3 cells containing information. The first cell contains the name of each reference image which has a success/failure indicator value of 1. That is, a successful pathway match has been found. The second cell contains the Score Value, the r-square-100 statistic, indicating the correlation of image attributes. And, the third cell contains the Link Ratio which shows the proportion of the reference image contained in the test image. Interpretation of these statistics is accomplished by sorting them in descending order, first by Score Value, then by Link Ratio. Matches with very low Link Ratios are ruled out since these likely reflect the presence of simple reference images in a complex test image. If orientation is known, the absolute exit orientation statistic is substituted for the relative statistic. Also, as a final check, if the image base-line is known, this information is also applied.

THE RECOGNITION PROCESS

Image recognition is accomplished through the combined process of recording and matching. Recording involves interpreting the image according to the Stage 01 through 03, as discussed, storing an image's key and structure in memory. Matching entails following the same process for an unidentified image, then attempting to match it with known images by comparing keys, reference series and pathways. The matching process always attempts to fit the reference image into the test image and will indicate success when this task is accomplished successfully. To facilitate speed, the system will maintain several alternate forms of the same image for commonly used images such as characters, numbers and symbols. In this way, the number of comparisons can be reduced during the screening process using a reference key. If a direct match can be an image cannot be matched with known images, the system will request, through a prompt or other means, that a name or designation for the image be provided. This information becomes part of the system's permanent image inventory. The ongoing growth of its internal image inventory is clear expression of the system's inherent ability to "learn" and to apply its growing body of knowledge.

What is claimed is:

1. A method for storing a character comprising:
   creating an image of said character;
   reducing said image of said character to a skeleton image;
   representing said skeleton image of said character in the form of a linked list comprising a plurality of entries and a plurality of pointers between said entries, organized on the basis of internal structure corresponding to a plurality of nodes, and connections between said plurality of nodes, wherein each of said plurality of entries in said linked list corresponds to one of said plurality of nodes, and each of said pointers between entries corresponds to one of said connections between nodes; and
   storing said representation of said skeleton image of said character as the representation of the internal structure of said character.

2. A method for storing a character comprising:
   creating an image of said character;
   reducing said image of said character to a skeleton image;
   representing said skeleton image of said character on the basis of the internal structure of said character by a descriptor corresponding to a plurality of nodes and connections between said plurality of nodes of said character, said descriptor being a reference key which is unique for a given plurality of nodes and connections between said given plurality of nodes, said unique reference key corresponding to a reference series for each node of said character, said reference series for a given node of said character being a series of integers, each integer being equal to the number of nodes having a given number of connections between nodes, connected to said given node; and
   storing said reference key representation of said internal structure of said character as said descriptor of said character.

3. A method in accordance with claim 2, wherein said step of representing said skeleton image of said character by said unique reference key, further comprises:
   computing the cumulative reference series for each given node of said character, said cumulative reference series being a series of integers, each integer being equal to the number of nodes having a given number of connections between nodes connected to said given node, including nodes having less than or equal to the number of connections to said given node, and through nodes having less than the number of connections to said given node;
   sorting said cumulative reference series for each given node into a weighted order according to the number of connections connected to each said nodes;
   constructing a connection matrix of noes and connections between said nodes, in said weighted order; and
   bit mapping the connection matrix of connections between said sorted nodes to form said reference key.

4. A method in accordance with claim 1, wherein said step of representing said skeleton image of said character on the basis of internal structure corresponding to a plurality of nodes, and connections between said plurality of nodes, comprises:
   representing said connections between said plurality of nodes in the form of a link substantially represented as a line.

5. A method in accordance with claim 1, wherein said step of representing said skeleton image of said character on the basis of internal structure corresponding to a plurality of nodes, and connections between said plurality of nodes, comprises:
   representing said connections between said plurality of nodes in the form of a curve substantially represented by at least one Bezier descriptor.

6. In an image recognition system having a reference image library including a plurality of stored reference images, each of said stored reference images represented on the basis of the internal structure of respective reference characters including a plurality of respective unique reference keys corresponding to the internal structure of said respective plurality of reference characters, each of said plurality of unique reference keys being a descriptor corresponding to a given plurality of nodes and connections between said given plurality of nodes, a method for screening reference images for matching with a test image comprising:
   creating an image of said test character;

reducing said image of said test character to skeleton image;

representing said skeleton image of said test character by a reference key, said reference key being a descriptor unique for a given plurality of nodes and connections between said given plurality of nodes, said unique reference key corresponding to a reference series for each node of said character, said reference series for a given node of said character being a series of integers, each integer being equal to the number of nodes having a given number of connections between nodes, connected to said given node; and comparing said unique reference key of said test character to each of said plurality of unique reference keys of said reference characters, to match one of said reference images in said reference image library to said test image.

7. An image recognition system in accordance with claim 6, wherein said step of representing said skeleton image of said test character by a reference key comprises translating a weighted matrix of nodes and connections between nodes to a binary representation of said matrix.

8. A method in accordance with claim 7, wherein said step of representing said skeleton image of said test character by said reference key, further comprises:

computing the cumulative reference series for each given node of said test character, said cumulative reference series being a series of integers, each integer being equal to the number of nodes having a given number of connections between nodes connected to said given node, including nods having less than or equal to the number of connections to said given node, and through nodes having less than the number of connections to said given node;

sorting said cumulative reference series for each given node into a weighted order according to the number of connections connected to each said nodes;

constructing a connection matrix of nodes and connections between said nodes, in said weighted order; and bit mapping the connection matrix of connections between said sorted nodes to form said reference key.

9. In an image recognition system having a reference image library including a plurality of stored reference images, each of said stored reference images represented on the basis of the internal structure of respective reference characters including a plurality of respective unique reference keys and reference series corresponding to the internal structure of said respective plurality of reference characters, each of said plurality of reference series being a descriptor corresponding to a series of integers, each integer being equal to the number of nodes having a given number of connections between nodes in said character, a method for screening reference images for matching with a test image comprising:

creating an image of said test character;
reducing said image of said test character to skeleton image;

representing said skeleton image of said test character by a reference key, said reference key being a descriptor unique for a given plurality of nodes and connections between said given plurality of nodes, said unique reference key corresponding to a reference series for each node of said character, said reference series for a given node of said character being a series of integers, each integer being equal to the number of nodes having a given number of connections between nodes, connected to said given node, and by a reference series for said character, said reference series for said character being a descriptor corresponding to a series of integers, each integer being equal to the number of nodes in said character having a given number of connections between nodes in said character;

comparing said unique reference key of said test character to each of said plurality of unique reference keys of said reference characters to match one of said reference images in said reference image library to said test image; and comparing said reference series of said test character to each of said plurality of said reference series of said reference characters to exclude ones of said reference images in said reference library form a match with said test image.

10. In an image recognition system having a reference image library including a plurality of stored reference images, each of said stored reference images represented on the basis of the internal structure of respective reference characters including a plurality of nodes and connections between said plurality of nodes, a method for searching said stored reference images for matching with a test image comprising:

creating an image of said test character;
reducing said image of said test character to skeleton image;
representing said skeleton image of said test character on the basis of internal structure as a plurality of nodes and connections between said plurality of nodes; and computing the ratio of the number of connections between nodes in the test image to the number of connections between nodes in the reference image for at least first and second ones of said stored reference images from said reference image library to form first and second link ratios for said first and second stored references images, respectively.

11. A method in accordance with claim 10, further comprising:

comparing said first link ratio for said first stored reference image to said second link ratio for said second stored reference image; and determining the likelihood of a match between one of said first and second reference images and said test image on the basis of said comparison of said first and second link ratios.

12. An apparatus for storing a character comprising:
means for creating an image of said character;
means for reducing said image of said character to a skeleton image;
means for representing said skeleton image of said character in the form of a linked list comprising a plurality of entries and a plurality of pointers between said entries, organized on the basis of internal structure corresponding to a plurality of nodes, and connections between said plurality of nodes, wherein each of said plurality of entries in said linked list corresponds to one of said plurality of nodes, and each of said pointers between entries corresponds to one of said connections between nodes; and means for storing said representation of said skeleton image of said character as the representation of the internal structure of said character.

13. An apparatus for storing a character comprising:
means for creating an image of said character;
means for reducing said image of said character to a skeleton image;
means for representing said skeleton image of said character on the basis of the internal structure of said character by a descriptor corresponding to a plurality of nodes and connections between said plurality of nodes of said character, said descriptor being a reference key which is unique for a given plurality of nodes and connections between said given plurality of nodes, said unique reference key corresponding to a reference series for each node of said character, said reference series for a given node of said character being a series of integers, each integer being equal to the number of nodes having a given number of connections between nodes, connected to said given node; and
means for storing said reference key representation of said internal structure of said character as said descriptor of said character.

14. An apparatus in accordance with claim 13, wherein said means for representing said skeleton image of said character by said reference key, further comprises:
means for computing the cumulative reference series for each given node of said character, said cumulative reference series being a series of integers, each integer being equal to the number of nodes having a given number of connections between nodes connected to said given node, including nodes having less than or equal to the number of connections to said given node, and through nodes having less than the number of connections to said given node;
means for sorting said cumulative reference series for each given node into a weighted order according to the number of connections connected to each said nodes;
means for constructing a connection matrix of nodes and connections between said nodes, in said weighted order; and
means for bit mapping the connection matrix of connections between said sorted nodes to form said reference key.

15. An apparatus in accordance with claim 12, wherein said means for representing said skeleton image of said character on the basis of internal structure corresponding to a plurality of nodes, and connections between said plurality of nodes, comprises:
means for representing said connections between said plurality of nodes in the form of a link substantially represented as a line.

16. An apparatus in accordance with claim 12, wherein said means for representing said skeleton image of said character on the basis of internal structure corresponding to a plurality of nodes, and connections between said plurality of nodes, comprises:
means for representing said connections between said plurality of nodes in the form of a curve substantially represented by at least one Bezier descriptor.

17. In an image recognition system having a reference image library including a plurality of stored reference images, each of said stored reference images represented on the basis of the internal structure of respective reference characters including a plurality of respective unique reference keys corresponding to the internal structure of said respective plurality of reference characters, each of said plurality of unique reference keys being a descriptor corresponding to a given plurality of nodes and connections between said given plurality of nodes, an apparatus for screening reference images for matching with a test image comprising:
means for creating an image of said test character;
means for reducing said image of said test character to skeleton image;
means for representing said skeleton image of said test character by a reference key, said reference key being a descriptor unique for a given plurality of nodes and connections between said given plurality of nodes, said unique reference key corresponding to a reference series for each node of said character, said reference series for a given node of said character being a series of integers, each integer being equal to the number of nodes having a given number of connections between nodes, connected to said given node; and
means for comparing said unique reference key of said test character to each of said plurality of unique reference keys of said reference characters, to match one of said reference images in said reference image library to said test image.

18. An image recognition system in accordance with claim 17, wherein said means for representing said skeleton image of said test character by a reference key comprises translating a weighted matrix of nodes and connections between nodes to a binary representation of said matrix.

19. An apparatus in accordance with claim 18, wherein said means for representing said skeleton image of said test character by said reference key, further comprises:
means for computing the cumulative reference series for each given node of said test character, said cumulative reference series being a series of integers, each integer being equal to the number of nodes having a given number of connections between nodes connected to said given node, including nodes having less than or equal to the number of connections to said given node, and through nodes having less than the number of connections to said given node;
means for sorting said cumulative reference series for each given node into a weighted order according to the number of connections connected to each said nodes;
means for constructing a connection matrix of nodes and connections between said nodes, in said weighted order; and
means for bit mapping the connection matrix of connections between said sorted nodes to form said reference key.

20. In an image recognition system having a reference image library including a plurality of stored reference images, each of said stored reference images represented on the basis of the internal structure of respective reference characters including a plurality of respective unique reference keys and reference series corresponding to the internal structure of said respective plurality of reference characters, each of said plurality of reference series being a descriptor corresponding to a series of integers, each integer being equal to the number of nodes having a given number of connections between nodes in said character, an apparatus for screening reference images for matching with a test image comprising:

means for creating an image of said test character;

means for reducing said image of said test character to skeleton image;

means for representing said skeleton image of said test character by a reference key, said reference key being a descriptor unique for a given plurality of nodes and connections between said given plurality of nodes, said unique reference key corresponding to a reference series for each node of said character, said reference series for a given node of said character being a series of integers, each integer being equal to the number of nodes having a given number of connections between nodes, connected to said given node, and by a reference series for said character, said reference series for said character being a descriptor corresponding to a series of integers, each integer being equal to the number of nodes in said character having a given number of connections between nodes in said character;

means for comparing said unique reference key of said test character to each of said plurality of unique reference keys of said reference characters to match one of said reference images in said reference image library to said test image; and means for comparing said reference series of said test character to each of said plurality of said reference series of said reference characters to exclude ones of said reference images in said reference library from a match with said test image.

21. In an image recognition system having a reference image library including a plurality of stored reference images, each of said stored reference images represented on the basis of the internal structure of respective reference characters including a plurality of nodes and connections between said plurality of nodes, an apparatus for searching said stored reference images for matching with a test image comprising:

means for creating an image of said test character;

means for reducing said image of said test character to skeleton image;

means for representing said skeleton image of said test character on the basis of internal structure as a plurality of nodes and connections between said plurality of nodes; and means for computing the ratio of the number of connections between nodes in the test image to the number of connections between nodes in the reference image for at least first and second ones of said stored reference images from said reference image library to form first and second link ratios for said first and second stored references images, respectively.

22. An apparatus in accordance with claim 21, further comprising:

means for comparing said first link ratio for said first stored reference image to said second link ratio for said second stored reference image; and means for determining the likelihood of a match between one of said first and second reference images and said test image on the basis of said comparison of said first and second link ratios.

23. A method in accordance with claim 3, wherein said step of sorting said cumulative reference series for said nodes into a weighted order according to the number of connections connected to each said nodes, further comprises:

sorting said cumulative reference series into an order in which those cumulative reference series having the most nodes with most links are of greater weight, those cumulative reference series having the least nodes with least links are of lesser weight, and those cumulative reference series having equal number of nodes and an equal number of links are of equal weight; and further sorting said equal weight cumulative reference series into an order wherein the cumulative reference series having a link to a node with a higher cumulative reference series is of greater weight than a cumulative reference series having a link to a node with a lower cumulative reference series.

24. An apparatus in accordance with claim 14, wherein said means for sorting said cumulative reference series for said nodes into a weighted order according to the number of connections connected to each said nodes, further comprises:

means for sorting said cumulative reference series into an order in which those cumulative reference series having the most nodes with most links are of greater weight, those cumulative reference series having the least nodes with least links are of lesser weight, and those cumulative reference series having equal number of nodes and an equal number of links are of equal weight; and means for further sorting said equal weight cumulative reference series into an order wherein the cumulative reference series having a link to a node with a higher cumulative reference series is of greater weight than a cumulative reference series having a link to a node with a lower cumulative reference series.

25. A method in accordance with claim 8, wherein said step of sorting said cumulative reference series for said nodes into a weighted order according to the number of connections connected to each said nodes, further comprises:

sorting said cumulative reference series into an order in which those cumulative reference series having the most nodes with most links are of greater weight, those cumulative reference series having the least nodes with least links are of lesser weight, and those cumulative reference series having equal number of nodes and an equal number of links are of equal weight; and further sorting said equal weight cumulative reference series into an order wherein the cumulative reference series having a link to a node with a higher cumulative reference series is of greater weight than a cumulative reference series having a link to a node with a lower cumulative reference series.

26. An apparatus in accordance with claim 19, wherein said means for sorting said cumulative reference series for said nodes into a weighted order according to the number of connections connected to each said nodes, further comprises:

means for sorting said cumulative reference series into an order in which those cumulative reference series having the most nodes with most links are of greater weight, those cumulative reference series having the least nodes with least links are of lesser weight, and those cumulative reference series having equal number of nodes and an equal number of links are of equal weight; and means for further sorting said equal weight cumulative reference series into an order wherein the cumulative reference series having a link to a node with a higher cumulative reference series is of greater weight than a cumulative reference series having a link to a node with a lower cumulative reference series.

27. A method for storing a character comprising:
creating an image of said character;
reducing said image of said character to a skeleton image;
ordering said plurality of nodes in a first order;
reordering said plurality of nodes in a second order, wherein said second order is the same of all characters having the same number of nodes connected by the same number of connections between nodes in the same manner as said test character;
representing said skeleton image of said character on the basis of the internal structure of said character by a descriptor corresponding to a plurality of nodes and connections between said plurality of nodes of said character, wherein said descriptor is a reference key which unique for a given plurality of nodes and connections between said given plurality of nodes, said unique reference key corresponding to said second order of said plurality of nodes; and
storing said reference key representation of said internal structure of said character as said descriptor of said character.

28. In an image recognition system having a reference image library including a plurality of stored reference images, each of said stored reference images represented on the basis of the internal structure of respective reference characters including a plurality of respective unique reference keys corresponding to the internal structure of said respective plurality of reference characters, each of said plurality of unique reference keys being a descriptor corresponding to a given plurality of nodes connected by a given plurality of connections between nodes in a given manner for each reference character, a method for screening reference images for matching with a test image comprising:
creating an image of said test character;
ordering said plurality of nodes in a first order;
reordering said plurality of noes in a second order, wherein said second order is the same for all characters having the same number of nodes connected by the same number of connections between nodes in the same manner as said test character;
representing said skeleton image of said test character on the basis of the internal structure of said test character by a descriptor corresponding to a plurality of nodes and connections between said plurality of nodes of said test character, wherein said descriptor is a reference key which is unique for a given plurality of nodes and connections between said given plurality of nodes, said unique reference key corresponding to said second order of said plurality of nodes; and
comparing said unique reference key of said test character to each of said plurality of unique reference keys of said reference characters, to match one of said reference images in said reference image library to said test image.

29. An apparatus for storing a character comprising:
means for creating an image of said character;
means for reducing said image of said character to a skeleton image;
means for ordering said plurality of nodes in a first order;
means for reordering said plurality of nodes in a second order, wherein said second order is the same for all characters having the same number of nodes connected by the same number of connections between nodes in the same manner as said test character;
means for representing said skeleton image of said character on the basis of the internal structure of said character by a descriptor corresponding to a plurality of nodes and connections between said plurality of nodes of said character, wherein said descriptor is a reference key which unique for a given plurality of nodes and connections between said given plurality of nodes, said unique reference key corresponding to said second order of said plurality of nodes; and
means for storing said reference key representation of said internal structure of said character as said descriptor of said character.

30. In an image recognition system having a reference image library including a plurality of stored reference images, each of said stored reference images represented on the basis of the internal structure of respective reference characters including a plurality of respective unique reference keys corresponding to the internal structure of said respective plurality of reference characters, each of said plurality of unique reference keys being a descriptor corresponding to a given plurality of nodes connected by a given plurality of connections between nodes in a given manner for each reference character, an apparatus for screening reference images for matching with a test image comprising:
means for creating an image of said test character;
means for ordering said plurality of nodes in a first order;
means for reordering said plurality of nodes in a second order, wherein said second order is the same for all characters having he same number of nodes connected by the same number of connections between nodes in the same manner as said test character;
means for representing said skeleton image of said test character on the basis of the internal structure of said test character by a descriptor corresponding to a plurality of nodes and connections between said plurality of nodes of said test character, wherein said descriptor is a reference key which is unique for a given plurality of nodes and connections between said given plurality of nodes, said unique reference key corresponding to said second order of said plurality of nodes; and
means for comparing said unique reference key of said test character to each of said plurality of unique reference keys of said reference characters, to match one of said reference images in said reference image library to said test image.

* * * * *